United States Patent
Ito et al.

(10) Patent No.: US 6,459,938 B1
(45) Date of Patent: Oct. 1, 2002

(54) REMOTE SUPERVISORY CONTROL SYSTEM

(75) Inventors: Yoshiharu Ito, Fukuoka (JP); Shinji Sakasegawa, Mie (JP); Hajime Yabu, Mie (JP); Yuichi Yoshimura, Mie (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/344,379

(22) Filed: Jun. 25, 1999

(30) Foreign Application Priority Data

Jun. 25, 1998 (JP) ............................. 10-178359
Jun. 25, 1998 (JP) ............................. 10-179437

(51) Int. Cl.[7] .................. G05B 15/02; H05B 41/36
(52) U.S. Cl. ..................... 700/9; 700/19; 700/83; 700/286; 315/295; 315/318
(58) Field of Search ................. 315/292, 294, 315/295, 317, 318, 321; 362/233; 700/17, 19, 22, 83, 277, 9, 286, 297, 298

(56) References Cited

U.S. PATENT DOCUMENTS

| | | | |
|---|---|---|---|
| 4,418,333 A | * 11/1983 | Schwarzbach et al. | 340/3.54 |
| 5,455,761 A | * 10/1995 | Kushiro et al. | 700/22 |
| 5,646,490 A | * 7/1997 | Carson et al. | 315/292 |
| 5,866,992 A | * 2/1999 | Geiginger et al. | 315/149 |
| 5,909,087 A | * 6/1999 | Bryde et al. | 315/149 |
| 5,920,156 A | * 7/1999 | Carson et al. | 315/292 |
| 5,962,992 A | * 10/1999 | Huang et al. | 315/294 |
| 6,160,359 A | * 12/2000 | Fleischmann | 315/294 |

* cited by examiner

Primary Examiner—Leo Picard
Assistant Examiner—Paul Rodriguez
(74) Attorney, Agent, or Firm—Sughrue Mion, PLLC

(57) ABSTRACT

A control terminal 32 includes an individual address setting section 12 for setting a unique individual address, and a simultaneous control address setting section 13 for setting a simultaneous control address common to the plurality of control terminals 32. A simultaneous control address is commonly assigned to the control terminals 32 to be subjected to group control. When an UP switch Sb or a DOWN switch Sc of an operation terminal 31b for group dimming purpose is pushed, a transfer signal including the simultaneous control address is transmitted to a signal line Ls from a transfer controller 30. The respective control terminals 32 substantially simultaneously receive the transfer signal, thereby changing the intensity of illumination loads.

25 Claims, 41 Drawing Sheets

FIG. 17
PRIOR ART
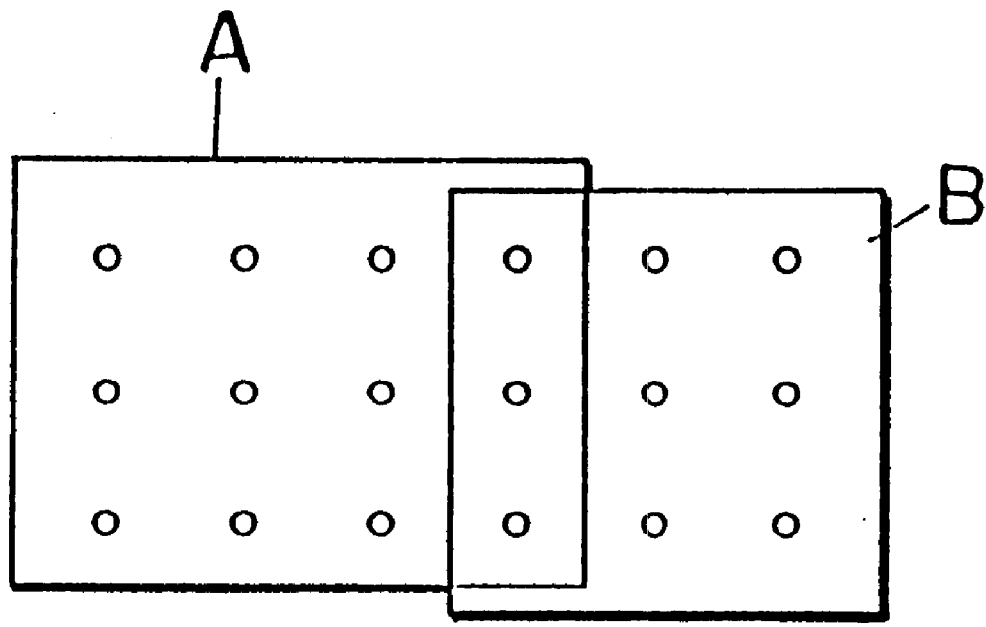
OFF – GROUP A ⬇
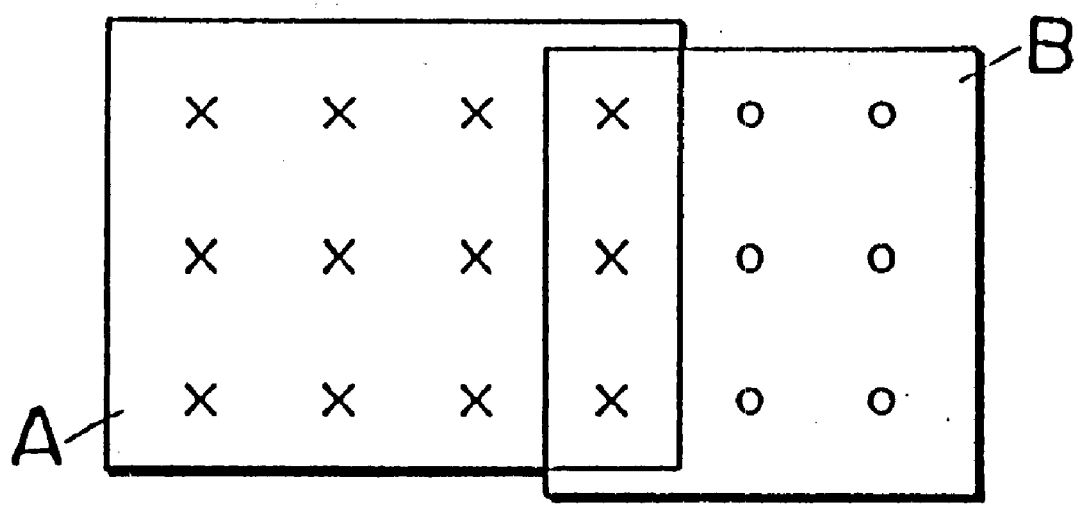

FIG. 18
PRIOR ART
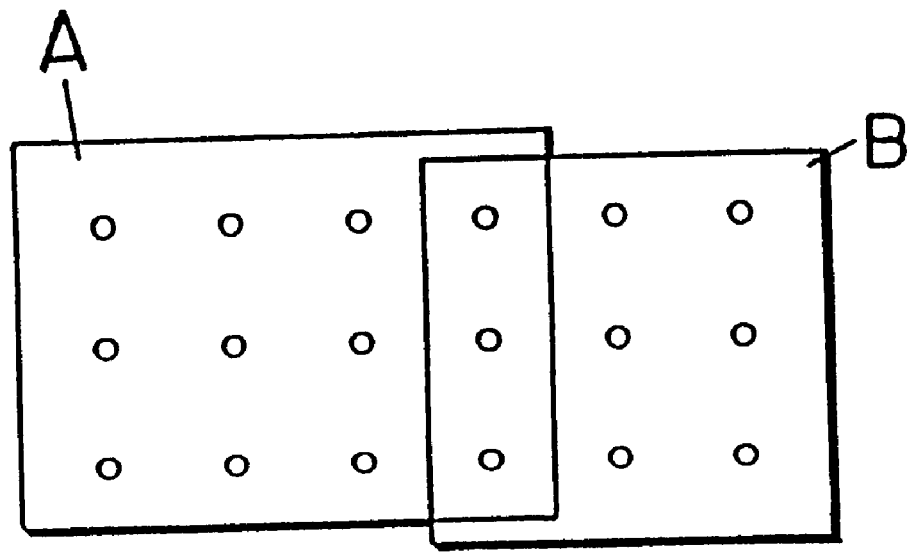
OFF – GROUP A
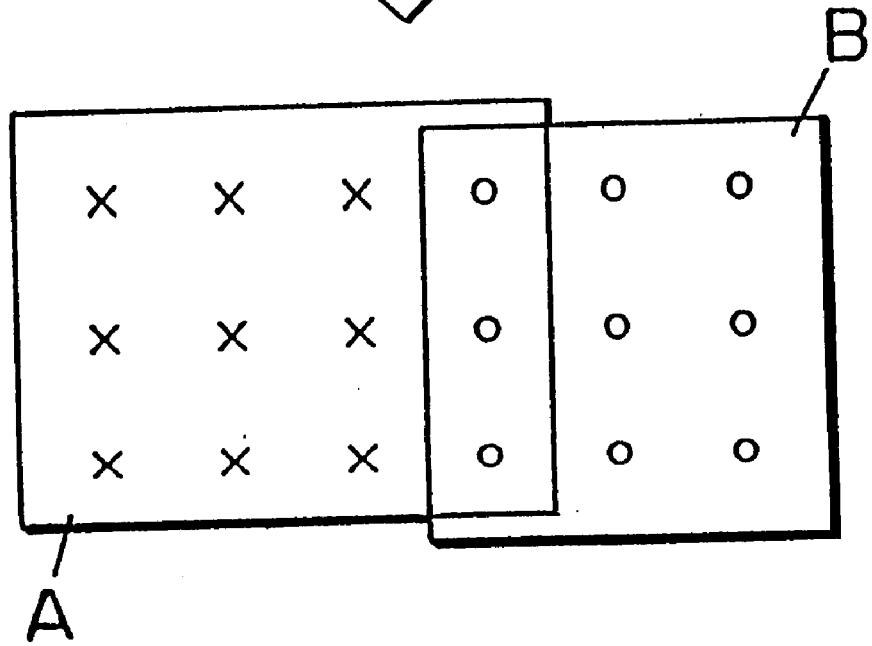

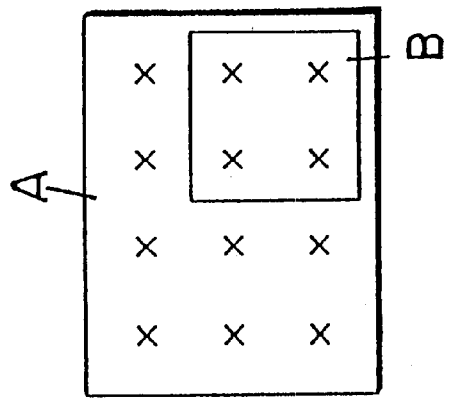
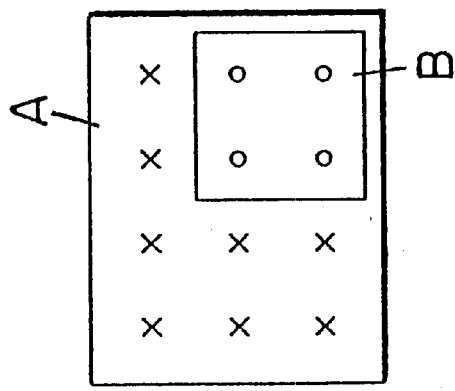
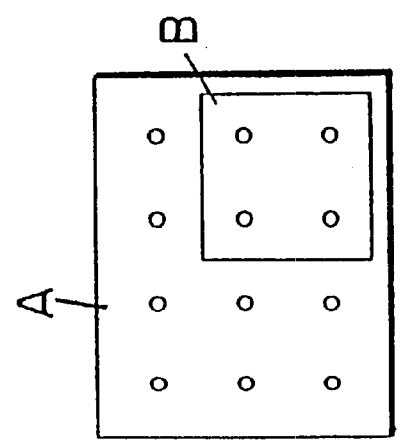
FIG. 19
PRIOR ART

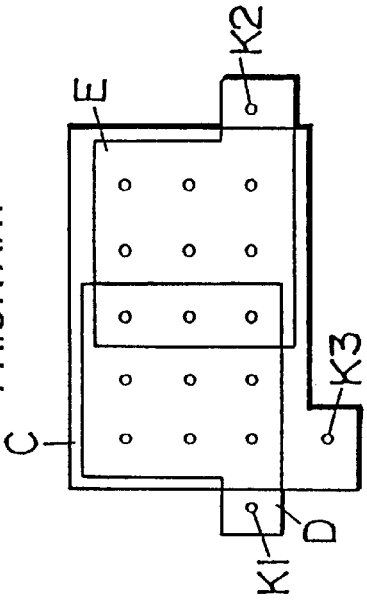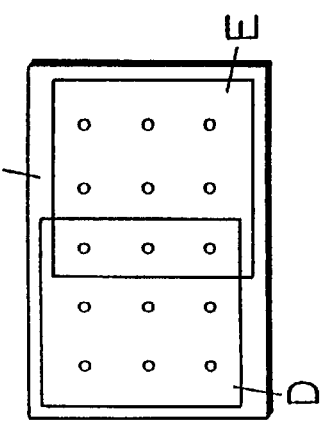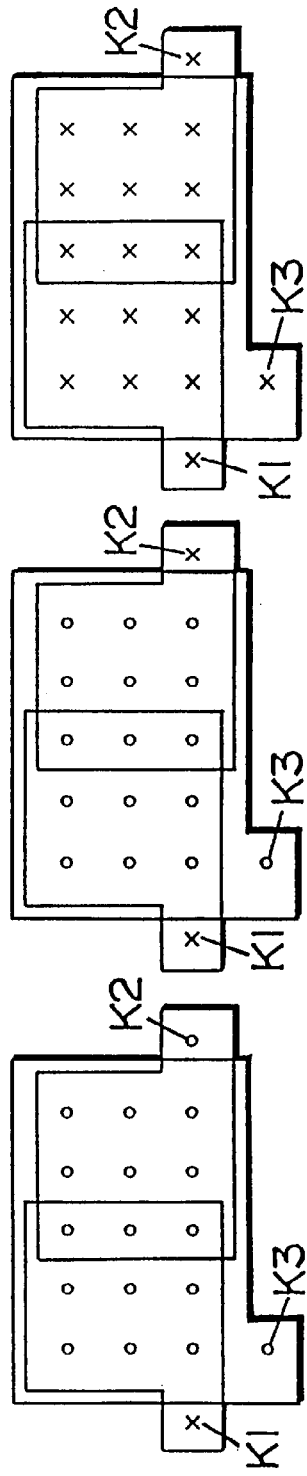
FIG. 20(a) PRIOR ART
FIG. 20(b) PRIOR ART
FIG. 20(c) PRIOR ART
FIG. 20(d) PRIOR ART
FIG. 20(e) PRIOR ART

FIG. 22

| GROUP NUMBER | DISPLAY ATTRIBUTE | CIRCUIT | OTHERS |
|---|---|---|---|
| G1 | OPERATION CONDITION DISPLAY | 1, 2, 3, 4, 5 | B11 |
| G2 | OPERATION CONDITION DISPLAY | 6, 7, 8, 9, 10 | B12 |
| G3 | SUPERVISORY CONDITION DISPLAY | 1, 2, 3, 4, 5, 6, 7, 8, 9, 10 | A1 |
| ...Gn | | | |

FIG. 23

| GROUP NUMBER | CONTROL ATTRIBUTE | CIRCUIT | OTHERS |
|---|---|---|---|
| G1 | ON PRIORITIZED CONTROL | 1, 2, 3, 4, 5 | B11 |
| G2 | ON PRIORITIZED CONTROL | 6, 7, 8, 9, 10 | B12 |
| G3 | LATER-OPERATION-PRIORITIZED CONTROL | 1, 2, 3, 4, 5, 6, 7, 8, 9, 10 | A1 |
| ...Gn | | | |

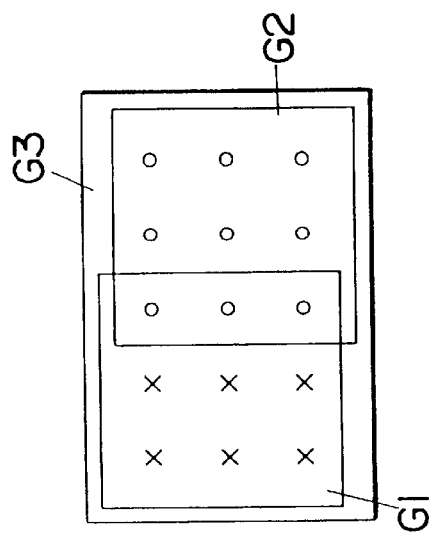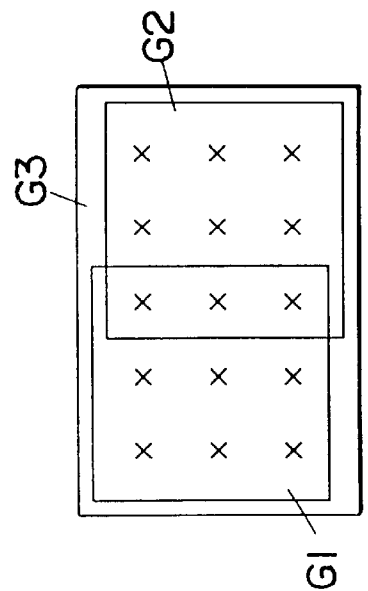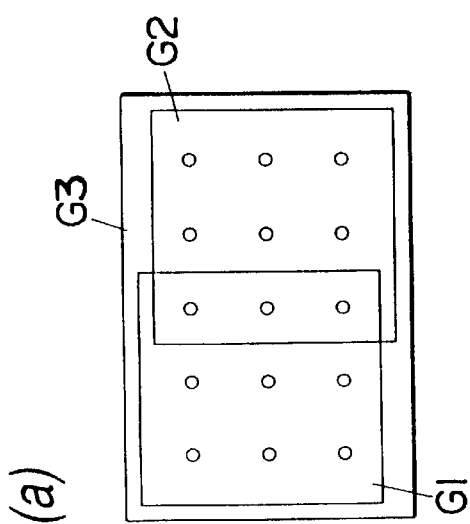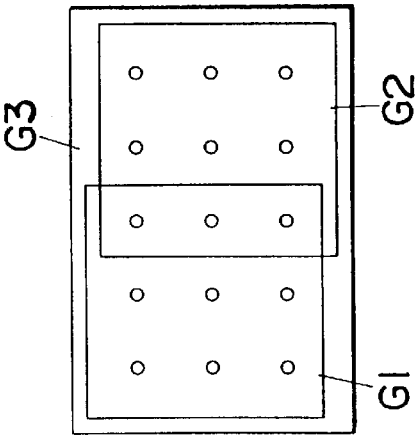
FIG. 24(a)  FIG. 24(b)

FIG. 25

|  |  |  |  |  |  |  |  |
|---|---|---|---|---|---|---|---|
| 0001 | 1000 | 0000 | 0000 | 0000 | 0000 | 0000 | 0000 | CORRESPONDING 00H ~ 1FH
| 0000 | 0000 | 0000 | 0000 | 0000 | 0000 | 0000 | 0000 | CORRESPONDING 20H ~ 3FH
| 0000 | 0000 | 0000 | 0000 | 0000 | 0000 | 0000 | 0000 | CORRESPONDING 40H ~ 5FH
| 0000 | 0000 | 0000 | 0000 | 0000 | 0000 | 0000 | 0000 | CORRESPONDING 60H ~ 7FH
| 0000 | 0000 | 0000 | 0000 | 0000 | 0000 | 0000 | 0000 | CORRESPONDING 80H ~ 9FH
| 0000 | 0000 | 0000 | 0000 | 0000 | 0000 | 0000 | 0000 | CORRESPONDING A0H ~ BFH
| 0000 | 0000 | 0000 | 0000 | 0000 | 0000 | 0000 | 0000 | CORRESPONDING C0H ~ DFH
| 0000 | 0000 | 0000 | 0000 | 0000 | 0000 | 0000 | 0000 | CORRESPONDING E0H ~ FFH

M

INCANDESCENT LAMP
(INDIVIDUAL LAMPS 256) — D3

LEVEL
+
LOAD
ON/OFF

INDIVIDUAL
(NO DIMMER CONTROL) — D3

LOAD
ON/OFF

INCANDESCENT LAMP
(DIMMER CONTROL 16) — D3

LEVEL
+
LOAD
ON/OFF

REMOTE SUPERVISORY CONTROL SYSTEM

BACKGROUND OF INVENTION

1. Field of Invention

The present invention relates to a remote supervisory control system.

2. Related Art

A remote supervisory control system having a configuration as shown in FIG. 8 has conventionally been provided. The remote supervisory control system includes a transfer controller 30, and a two-wire signal line Ls connected to the transfer controller 30. The two-wire signal line Ls is connected to a plurality of operation terminals 31 and control terminals 32 through multidrop connection. Although, in the illustrated example, the single operation terminal 31 and a single control terminal 32 are connected to the signal line Ls, in practice many operation terminals 31 and many control terminals 32 can be connected to the signal line Ls. Further, in the illustrated example, a luminaire 33 including an illumination load is connected to the control terminal 32, and the intensity of light output from the illumination load is instructed by the control terminal 32. A dimmer for controlling the power supplied to the illumination load may be incorporated into the control terminal 32 or the luminaire 33. In most cases where the illumination load is an incandescent lamp, the dimmer is incorporated into the control terminal 32. In a case where the illumination load is a discharge lamp such as a fluorescent lamp, the dimmer is incorporated into the luminaire 33.

Upon receipt of an instruction as to whether the intensity of light output from the illumination load is increased or decreased and an instruction for starting increase or decrease of the intensity of light output, the control terminal 32 changes the intensity of light output in the manner instructed. Upon receipt of an instruction for terminating the changing of light intensity, the control terminal 32 maintains the intensity of the light output at the point in time when the instruction is received. In this way, only two parameters: i.e., a point in time at which changing of intensity of light output is commenced and a point in time at which changing of intensity of light output is completed, are instructed. During the period between these two points in time, the control terminal 32 changes the intensity of light output automatically. A control terminal of this type is referred to as an autonomous dimmer terminal.

The operation terminal 31 is equipped with three push-type switches Sa to Sc. The switch Sa instructs illumination or extinction of the illumination load, and the switch Sb instructs an increase in the intensity of light output, as well as the start and stop of increase. The switch Sc instructs a decrease in the intensity of light output, as well as the start and stop of decrease. Decreasing and increasing operations are started by the user pressing the switches Sb and Sc, and these operations are stopped by the user releasing the same.

The operation terminals 31 and control terminals 32 are provided with individual addresses. Through use of the addresses, the transfer controller 30 perceives the individual operation terminals 31 and control terminals 32.

The transfer controller 30 sends through the signal line Ls a transfer signal Vs having a format shown in FIG. 9A. The transfer signal Vs is a bipolar time division multiplexed signal (of ±24V) comprising a synchronization signal SY representing the start of transmission of a signal; mode data MD representing the mode of the transfer signal Vs; address data AD for calling the operation terminals 31 and the control terminals 32 individually; control data CD for controlling the load L; checksum data CS for detecting transmission errors; and a signal return period WT which serves as a time slot for receiving a signal (monitoring data) returned from the operation terminal 31 or the control terminal 32. Data are transferred through pulse-width modulation. (see FIG. 9B). In each of the operation terminals 31 and the control terminals 32, if the address data AD carried by the transfer signal Vs which is received by way of the signal line Ls match a preset address, the control data CD are captured from the transfer signal Vs. During the signal return period WT of the transfer signal Vs, monitoring data are returned as a current mode signal (i.e., a signal which is transmitted by short-circuiting the signal line Ls through use of a tool of appropriately low impedance).

When the transfer controller 30 transmits data to a desired one of the operation terminals 31 and control terminals 32, the mode data MD of the transfer signal Vs are set to a control mode, and the address data AD of the transfer signal Vs are set to the address of the operation terminal 31 or the control terminal 32. The thus-set transfer signal Vs is sent through the signal line Ls, and the operation terminal 31 or control terminal 32 whose address matches the address data AD of the transfer signal Vs receives the control data CD. During the signal return period WT, the terminal that has received the control data returns monitoring data. On the basis of the relationship between the control data CD transmitted from the transfer controller 30 and the monitoring received during the signal return period WT, the transfer controller 30 can ascertain whether or not the control data CD have been transmitted to the desired operation terminal 31 or control terminal 32. In a case where the control terminal 32 receives the control data CD, the control terminal 32 outputs a load control signal for controlling the load L according to the control data CD. In a case where the operation terminal 31 receives the control data CD, the operation terminal 31 outputs a monitoring signal for checking and indicating the operation of the load L according to the control data CD.

The transfer controller 30 usually transmits, at given time intervals, a transfer signal Vs whose mode data MD are set to a dummy mode, and address data AD are cyclically changed (i.e., a full-time polling operation). When the operation terminal 31 attempts to send any information to the transfer controller 30, an interrupt signal such as that shown in FIG. 9C is produced in synchronization with the synchronization signal SY of the transfer signal $V_s$ of dummy mode. At this time, the operation terminal 31 sets an interrupt flag to thereby prepare for subsequent exchange of information with the transfer controller 30. Upon receipt of the interrupt signal, the transfer controller 30 sets the mode data MD of the transfer signal Vs to an interrupt polling mode and gradually increases half of the higher-order bits of the address data AD (i.e., four higher-order bits of the 8-bit address data AD). The transfer signal Vs is then transmitted. When a match exists between the four higher-order bits of the address data AD of the transfer signal Vs whose mode data MD are set to the interrupt polling mode and the four higher-order bits of the address assigned to the operation terminal 31, the operation terminal 31 that has sent the interrupt signal returns the lower-order bits of the address data AD to the transfer controller 30 during the signal return period WT. As mentioned above, since the transfer controller 30 searches for the operation terminal 31 that has generated the interrupt signal, in units of 16 terminals, the operation terminal 31 can be found in a comparatively short period of time.

Upon acquisition of the address of the operation terminal 31 that has generated the interrupt signal, the transfer controller 30 sets the mode data MD of the transfer signal Vs to a monitoring mode, and the transfer signal whose address data AD matches the thus-acquired address is sent to the signal line Ls. In response to the transfer signal Vs, the operation terminal 31 returns the information to be transmitted during the signal return period WT. Finally, the transfer controller 30 sends a signal for instructing interruption reset to the operation terminal 31 that has generated the interrupt signal, thus clearing the interruption flag set in the operation terminal 31. As mentioned above, transmission of information from the operation terminal 31 to the transfer controller 30 is completed by transmitting signals (a dummy mode signal, an interruption polling mode signal, a monitoring mode signal, and an interruption reset signal) to the operation terminal 31 from the transfer controller 30 four times. When the transfer controller 30 attempts to ascertain the operating state of a desired control terminal 32, transmission of only a transfer signal whose mode data MD is set to monitoring data will be required.

When operation data are generated as a result of actuation of any one of the switches Sa to Sc, the operation terminal 31 returns the operation data to the transfer controller 30. The transfer controller 30 transmits to the control terminal 32 a transfer signal which includes control data produced on the basis of the operation data. Upon receipt of the transfer signal, the control terminal 32 controls an illumination load. At this time, the control terminal 32 returns monitoring data to the transfer controller 30, and the thus-returned monitoring data are further transmitted to the operation terminal 31. In response to the monitoring data, the operation terminal 31 outputs a monitoring signal which is usually used for illuminating or extinguishing an operation lamp.

The operation terminal 31 shown in FIG. 8 is for dimming purposes and instructs the illumination load to output light. At a point in time when pressing of either the switches Sb or Sc is commenced and at a point in time when the switch is released, the operation terminal 31 transmits operation information to the transfer controller 30. For example, as shown in FIG. 10, an operation signal OP1 for instructing the illumination load to start increasing the intensity of light output is transmitted to the transfer controller 30. A control signal CN1 corresponding to the operation signal OP1 is transmitted to the control terminal 32. After the user releases the switch Sb, an operation signal OP2 for stopping a change in the intensity of light output is transmitted to the transfer controller 30. A control signal CN2 corresponding to the operation signal OP2 is transmitted to the control terminal 32. The operation signals OP1 and OP2 and the control signals CN1 and CN2 are transmitted by means of the transfer signals.

In this type of remote supervisory control system, correspondence between the address of the operation terminal 31 and the address of the control terminal 32 is managed by the transfer controller 30. It is possible to establish correspondence between the address of the single operation terminal 31 and the addresses of the plurality of control terminals 32, as well as correspondence between the address of the single operation terminal 31 and the address of the single operation terminal 32. If the address of the single operation terminal is arranged so as to correspond to the addresses of the plurality of control terminals 32, a plurality of illumination loads can be collectively controlled by means of a single set of switches Sa to Sc. Control of this type is called simultaneous control. Simultaneous control assumes two forms; particularly, simultaneous control for bringing a plurality of illumination loads into the same controlled state, and simultaneous control for bringing a plurality of illumination loads into their respective previously-designated controlled states.

As mentioned above, in order to effect pattern control, the correspondence between the address of the switch of the collective operation terminal and the addresses of the plurality of loads L must be registered in the transfer controller 30. A setting operation of this type is referred to as a "pattern setting operation." Hereinafter, switches for pattern control purposes provided in the operation terminal, which serves as the collective operation terminal, are referred to as "pattern switches." Further, switches for individual control purposes provided in the operation terminal are referred to as "individual switches So." A setting operation for effecting group control is referred to as a "group setting operation," and switches for group control purposes provided in the operation terminal, which serves as a collective operation terminal, are referred to as "group switches."

The intensity of light output from each illumination load can be adjusted by actuation of the switches Sa to Sc assigned to the illumination load. Demand exists for slightly increasing or decreasing the intensity of light output (i.e., illuminance) of the entire illuminated space. Such a demand can be satisfied by controlling the plurality of illumination loads through group control.

As mentioned above, each of the operation terminals 31 and each of the control terminals 32 is each assigned an individual address. Effecting group control requires only establishment of correspondence between the address of the single operation terminal 31 and the addresses of the plurality of control terminals 32. As shown in FIG. 11, operation terminals 31a are each associated with the control terminals 32 in a one-to-one relationship, and an operation terminal 31b is associated with the plurality of control terminals 32 in a one-to-many relationship. When the switch Sa of the operation terminal 31b is actuated, the operation signal OP1 is transmitted to the transfer controller 30, where a plurality of control signals CN11 to CN13 are generated sequentially. The thus-generated control signals CN11 to CN13 are further sequentially transmitted to the control terminal 32 to be controlled. Similarly, when the switch Sb of the operation terminal 31b is actuated, the operation signal OP2 is transmitted to the transfer controller 30, where a plurality of control signals CN21 to CN23 are generated sequentially. The thus-generated control signals CN21 to CN23 are further sequentially transmitted to the control terminal 32 to be controlled. Through such procedures, the plurality of illumination loads which are connected to the control terminals 32 to be subjected to group control can be controlled in a collective manner by actuation of any one of the switches Sa to Sc.

Operation information pertaining to the switches Sa to Sc of the control terminal 32 to be subjected to group control is sequentially transmitted to the respective control terminals 32. Therefore, the timing at which the operation information pertaining to the switches Sa to Sc is received differs from one control terminal 32 to another. Particularly, in a case where the number of control terminals 32 to be subjected to group control is large, the timing at which the operation information pertaining to the switches Sa to Sc is received varies significantly. For instance, the switches Sb are switched so as to increase the intensity of light output from the illumination loads. In this case, the intensity of light output from the illumination load connected to one control terminal 32 may be increased immediately after pressing of the switch Sb. However, the intensity of light output from the illumination load connected to another terminal 32 may be increased after a time lag from the time when the switch Sb is switched. The user may consider such a time lag to be strange.

In contrast, as shown in FIG. 12, there may be conceived collective control of a plurality of illumination loads through use of a single set of switches Sa to Sc by means of connecting the plurality of luminaires 33 in shunt with a single control terminal 32. Such a configuration enables collective control of the plurality of illumination loads through use of a single set of switches Sa to Sc but disables individual control of brightness of the illumination loads.

At the time when illumination loads in an extinguished state being illuminated, if the loads are suddenly illuminated under circumstances where there is low illuminance, such as at night, the user may be dazzled, thereby exerting a heavy load on the eyes.

The remote supervisory control system of this type sometimes employs a device called a selector switch. The selector switch corresponds to a single device equipped with a plurality of operation terminals, and is usually equipped with five or more operation sections. So long as the operation sections are assigned respective addresses through use of a specifically-designed address setting device, each of the operation sections can be used as any of an individual switch, a pattern switch, and a group switch. A plurality of individual switches, pattern switches, and group switches can be assembled into a single device. Accordingly, there is also provided a selector switch which can effect the pattern and group setting operations by arranging the pattern switch and group switch so as to correspond to the plurality of loads L (whereby the load L to be controlled can be specified by use of the individual switch).

As has been mentioned above, in the conventionally available selector switch, the operation sections are assigned respective addresses through use of the custom-designed address setting device. Accordingly, at the time of maintenance for assigning an address to the operation section or changing the address of the operation section, the address setting device needs to be provided separately from the selector switch, thus introducing an element of inconvenience.

Despite the fact that the selector switch is a comparatively large-scale apparatus, the selector switch has only limited functions, such as the function of operating the individual switches, the pattern switch, and the group switch; the pattern setting function; and the group setting function. The selector switch does not have any function for effecting control and setting operations pertaining to dimming, and hence the number of functions is small in relation to the amount of space occupied.

In the remote supervisory control system mixedly comprising individual switches and group switches, a method for indicating the operation of the loads L through use of an indication lamp includes an operation status display method suitable for field operation and a monitored status display method suitable for monitoring a load which has been left unextinguished (hereinafter referred to as an "unextinguished load"), from a remote location such as a monitor room of a building. According to the operation status display method, even when the status of some of the loads L within the group is changed by means of the individual switches after the loads L have been subjected to group control through use of the group switches, the status displayed on the indication lamp after group control is maintained. For example, as shown in FIG. 13, first all the loads L are deactivated, and hence all the indication lamps are also extinguished (x). When one of the loads L is activated by means of the individual switch (1), an indication lamp (1) is illuminated (0). However, the indication lamp of the group switch still remains extinguished (x). Next, all the remaining loads L are activated by means of the individual switches (2) and (3), so that the indication lamps of the individual switches (2) and (3) are illuminated (0). Since all the loads L within the group are activated, the indication lamp of the group switch is also illuminated (0). Even if only one of the loads L is deactivated by use of the individual switch (1) in this state, only the indication lamp of the individual switch (1) is extinguished (x). However, the indication lamp of the group switch still remains illuminated (0). The remaining loads L are deactivated by means of the individual switches (2) and (3), so that all the loads L are deactivated. As a result, the indication lamp of the group switch is also extinguished (x). Illumination (0) of the indication lamp depicts activation of the loads, and extinction (x) of the loads depicts deactivation of the loads.

In contrast, according to the monitored status display method, when even one of the loads L within the group is activated, the indication lamp of the group switch is illuminated (0). For example, as shown in FIG. 14, first all the loads L are deactivated, and the indication lamp of the group switch is also extinguished (x). In this state, when one of the loads L is activated by means of the individual switch (1), the indication lamp of the individual switch (1) is illuminated (0). Further, at this time, the indication lamp of the group switch is also illuminated (0). The remaining loads L are activated by means of the individual switches (2) and (3), the indication lamps of the individual switches (2) and (3) are also illuminated (0), and the indication lamp of the group switch remains illuminated (0). The remaining loads L are deactivated by means of the individual switches (2) and (3), so that all the loads L are deactivated and the indication lamp of the group switch is also extinguished (x). The monitored status display method is effective for monitoring the unextinguished load L within each area on each floor or within each partitioned compartment. So long as each area is divided into groups, the indication lamp of the group switch is illuminated even when only one of the loads L in a group is in an activated state. The indication lamp of the group is extinguished only when all the loads L are deactivated. Therefore, the unextinguished load L can be monitored from a remote location such as a monitor room. The indication of the status of the load L may be output to an external device such as a central monitor console, by way of a communications interface terminal or a contact interface terminal.

In a case where an individual switch or a group switch is actuated (or locally actuated) within each area, according to the operation status display method, the indication lamp of the group switch remains extinguished when one of the loads L, all of which are in an extinguished state, is activated by means of the individual switch (1), as show in FIG. 15. If the group switch is actuated in this state, all the loads L are activated, with the result that the displays of the indication lamps match the actual operation status. Thus, a natural operation becomes feasible.

In contrast, according to the monitored status display method, even when only one of the loads L is activated, as shown in FIG. 16, the indication lamp of the group switch is illuminated. If the group switch is activated at this time, all the loads L are deactivated. In spite of an attempt to activate all the loads L, the loads L cannot be activated unless all the loads L are deactivated and the group switch is activated again. The displays of the indication lamps do not match the actual operations, thus resulting in an unnatural operation.

If the operation terminals 31 of all the groups are set to the operation status display method, such a method is suitable for local operation but cannot be used for monitoring at the center. Even in this case, so long as the indication lamps of the operation terminals for pattern control purposes are utilized, a monitoring function may be implemented. If an attempt is made to control activation/deactivation of the loads within an area through use of a pattern, two pattern switches must be employed, thus resulting in a necessity for a large number of pattern circuits (a first problem). In contrast, if the operation terminals 31 are set to the monitored status display method, local operations become unnatural. In spite of the fact that local operations are monitored at the center through use of the multiplex transmission method, the foregoing problem cannot be solved.

In the foregoing remote supervisory control system, there may be a case where the single control terminal 32 is assigned to a plurality of groups. In such a system, as shown in FIG. 17, if a group switch of a group A is actuated, all the loads within the group A are simultaneously deactivated (x) regardless of the state of the loads. In the case of an office having a comparatively large floor space, a desirable measure may be to divide the office into several sections and to assign the sections groups. Activation or deactivation of illumination loads is controlled on a per-group basis. In such a case, if illumination loads of a certain group are deactivated, the area under the adjacent group (section) also becomes slightly dark. A conceivable measure for preventing such a decrease in luminance of the area under the adjacent group comprises assignment of illumination loads located in an overlap between sections to both groups A and B, as shown in FIG. 18. As a result, even if the illumination loads of the group A are deactivated, the illumination loads which are included in both the groups A and B are not deactivated. Such a control method is called an ON-prioritized control method, and a commonly practiced control method is called a later-operatin-prioritized control method.

However, the ON-prioritized control method involves the following problem. For example, as shown in FIG. 19, the group B comprising sections and the group A for monitoring the entire floor including the group B cannot be used simultaneously. More specifically, the loads included in the group B cannot be deactivated by actuation of the group switch corresponding to the local group B. Initially, the group switch corresponding to the entire group A is actuated, to thereby deactivate the loads which are included in the group A and do not belong to the group B. Subsequently, the group switch corresponding to the group B is actuated, to thereby deactivate the loads belonging to the group B.

As shown in FIGS. 20A to 20E, in a case where a plurality of local groups D and E are set within a large group C, each of the loads belongs to at least one of the groups C to E. In a case where all the loads are activated, no loads can be deactivated by actuation of the group switch corresponding to any of the groups C to E. To prevent such a situation, as shown in FIG. 20B, individual dummy switches K1 to K3 which do not belong to any of the groups are provided in the respective groups C to E, and each of the dummy switches K1 to K3 is deactivated when the corresponding group switch is actuated. As shown in FIGS. 20C to 20E, the indication lamp of the group switch can be extinguished (because a deactivated load exists in the group). However, dummy control circuits, which are not originally needed, must be provided in a number equal to the number of groups, thus adding to equipment cost.

In a remote supervisory control system such as that mentioned previously, various functions are implemented by combination of the transfer controller 30 with various terminals. However, in many cases, new functions are added to the transfer controller 30 and the terminal in association with improvements realized year after year. Further, a transfer controller whose functions are extended may be connectable with a newly-developed terminal having a new function. Under such circumstances, an old-type transfer controller lacking a new function may be connected to a new terminal having a new function. As things stand, the terminal is not provided with means for reliably checking the version of the function of the transfer controller. The old transfer controller may make the entire remote supervisory control system inoperative in the worst case, and in any case may not utilize a new function. Even if various data (such as group and pattern data) are set in the terminal, the data cannot be sent to the transfer controller because of a version mismatch, thus rendering the setting operation useless.

SUMMARY OF INVENTION

The present invention has been conceived in light of the foregoing problems, and one object of the present invention is to provide a remote supervisory control system capable of simultaneously activating a plurality of illumination loads to be subjected to group control without involvement of a time lag.

Another object of the present invention is to provide a remote supervisory control system capable of lessening the load exerted on eyes, which would otherwise be caused by sudden changes in the intensity of light output, and enabling elaborate dimmer control according to the environment.

The present invention has been conceived in view of the foregoing drawbacks in the related art, and the object of the present invention is to provide a remote supervisory control system which requires a comparatively small occupation space and which uses a multifunction setting operation terminal capable of offering various functions required for setting, control, and management, to thereby achieve multifunctional performance and improve cost effectiveness.

The object of the present invention is to provide a display method can be selected according to the purpose of use of the operation terminal, and system configuration is facilitated.

The object of the present invention is to provide a display method can be selected according to the purpose of use of the operation terminal, and system configuration is facilitated.

The object of the present invention is to provide a remote supervisory control system prevents problems such as faulty operation, which would otherwise be caused by a version mismatch. Thus, the present invention has an advantage of providing the ability to improve the operability of the remote supervisory control system.

To achieve the foregoing objects, according to a first aspect of the present invention, there is provided a remote supervisory control system including:

a plurality of operation terminals and control terminals which are each assigned addresses;

a signal line to which the operation terminals and control terminals are connected through multidrop connection;

a transfer controller connected to the signal line;

illumination loads connected to the respective control terminals; and an operation section provided in each of the operation terminals, wherein a transfer signal is exchanged between the transfer controller and each of the operation and control terminals by means of the time-division multiplexing method, and a transfer signal including data corresponding to the operation of the operation section of the operation terminal is transmitted to the control terminal specified by means of correspondence between the addresses set in the transfer controller, to thereby control the illumination load connected to the transfer controller, the remote supervisory control system being provided in that the correspondence includes an individual control relationship for associating one operation section with one illumination load and a simultaneous control relationship for associating one operation section with a plurality of illumination loads;

the control terminal includes an individual address setting section for setting a unique, individual address to each of the plurality of control terminals, and a simultaneous control address setting section for setting a simultaneous control address which is commonly assigned to a plurality of control terminals; and each of the control terminals is provided with a terminal processing section, which controls the intensity of the illumination load to a dimmer level instructed by the operation section of the operation terminal when the terminal processing section is instructed to use the individual address by means of the transfer signal, and the address data included in the transfer signal match the individual address set in the individual address setting section; or when the terminal processing section is instructed to use the simultaneous control address by means of the transfer signal, and the address data included in the transfer signal match the simultaneous control address set in the simultaneous control address setting section. Each of the control terminals is assigned a simultaneous control address in addition to the individual address, and the simultaneous control address is commonly assigned to a plurality of control terminals. Therefore, the control terminals assigned the same simultaneous control address substantially simultaneously receive the same transfer signal, thus enabling control of the intensity of the illumination loads at substantially the same time. Thus, the remote supervisory control system according to the present invention yields the advantage of having the ability to change the intensity of a plurality of grouped illumination loads without involvement of a time lag. Further, use of the individual address enables individual control of the illumination loads. Although the illumination loads are controlled individually, the intensity of the illumination loads is changed simultaneously when the illumination loads are grouped, thus preventing occurrence of a time lag, which the user would consider strange.

According to a second aspect of the present invention, the remote supervisory control system as defined in the first aspect is further previded in that the simultaneous control address setting section can set a plurality of simultaneous control addresses. As a result, a single illumination load can be shared among a plurality of groups. For example, in a case where luminaries to be subjected to group control are changed depending on whether or not a room provided with a plurality of luminaries is partitioned into compartments, a single luminaries belongs to a group defined when the room is partitioned and to another group defined when the room is not partitioned. The remote supervisory control system can readily set each of the luminaries into groups in an overlapping manner.

According to a third aspect of the present invention, the remote supervisory control system as defined in the first or second aspect is further provided in that the transfer controller sets a simultaneous control address in the simultaneous control address setting section of each of the control terminals by way of the signal line. The simultaneous control address can be assigned to each of the control terminals through use of the signal line. Accordingly, when a simultaneous control address is assigned to each of the control terminals, the user does not have to go to each of the control terminals, thus facilitating an operation for assigning a simultaneous control address to the control terminals.

According to a fourth aspect of the present invention, the remote supervisory control system as defined in the third aspect is further provided in that the transferring controller sets into the simultaneous control address setting section of any of the control terminals, in a case where the individual address of the control terminal is changed, a new simultaneous control address obtained on the basis of the after-change individual address. Even when there arises a necessity for setting a new simultaneous control address as a result of changing of the individual addresses of the respective control terminals, the user does not have to go to each of the control terminals, thus facilitating an operation for assigning a simultaneous control address to the control terminals.

According to a fifth aspect of the present invention, the remote supervisory control system as defined in the third aspect is further provided in that the transfer controller comprises means for checking whether or not the simultaneous control address transmitted to the control terminal matches the simultaneous control address which is set in the simultaneous control address setting section of the control terminal and which is returned from the control terminal by means of the transfer signal. The remote supervisory control system can prevent transmission of an incorrect simultaneous control address to the control terminals, which would otherwise be caused by noise.

According to a sixth aspect of the present invention, the remote supervisory control system as defined in the third aspect is further provided in that the transfer controller comprises means for checking the simultaneous control address set in the simultaneous control address setting section of each of the control terminals when the system is activated, as well as for setting a correct simultaneous control address into the control terminal whose simultaneous control address differs from the simultaneous control to be set. For example, even if the remote supervisory control system is shut down (for example, during a power outage) before completion of the simultaneous control address being assigned to the control terminals, a correct simultaneous control address is assigned to the respective control terminals when the remote supervisory control system is activated, thereby enabling group dimmer operations as intended.

According to a seventh aspect of the present invention, the remote supervisory control system as defined in any one of the first to sixth aspects is further provided in that the controller terminal comprises a display section for indicating the dimmer level of the illumination load; and the transfer controller sequentially polls all the operation and control terminals, to thereby cause each of the control terminals to return monitoring data pertaining to the actual dimmer level of the illumination load; updates the dimmer level to be indicated on the display section of the operation terminal on the basis of the thus-returned monitoring data; and polls the respective control terminals—which are associated with the operation section of the operation terminal by means of simultaneous control when the transfer controller receives the transfer signal from the operation terminal—in preference to the other control terminals which are not associated with the operation section by means of simultaneous control. Even when the plurality of control terminals are simultaneously dimmed through use of the simultaneous control address, appearance of an indication on the display section of each of the operation terminals is prevented from lagging behind actual changing of the intensity of the illumination loads, thus realizing an indication on the display section without involvement of a time lag, which would otherwise occur and be considered strange by the user.

According to an eighth aspect of the present invention, the remote supervisory control system as defined in the first aspect is further provided in that the transfer controller transmits to the control terminals assigned an identical simultaneous control address a time for fading an illumination load, and, when receiving fade start control data by means of the transfer signal including the simultaneous control address, the terminal processing section of each of the control terminals fades the intensity of the illumination load within the fade time. In the plurality of groups of illumination loads to be subjected to simultaneous control, the intensity of the illumination load can be changed gradually, thereby mitigating a load on the eyes, which would otherwise be caused by a sharp change in the intensity of light. Further, elaborate control of intensity of illumination according to the environment can be effected.

According to a ninth aspect of the present invention, the remote supervisory control system as defined in the eighth aspect is further provided in that the transfer controller can transmit the fade time which varies according to the simultaneous control address. Elaborate control of illumination can be effected for a plurality of groups of illumination loads to be subjected to simultaneous control such that the intensity of illumination of a certain group is changed quickly and such that the intensity of illumination of another group is changed slowly.

According to a tenth aspect of the present invention, there is provided a remote supervisory control system including a plurality of operation terminals and control terminals which are each assigned addresses;

a signal line to which the operation terminals and control terminals are connected through multidrop connection;

a transfer controller connected to the signal line;

illumination loads connected to the respective control terminals; and an operation section provided in each of the operation terminals, wherein a transfer signal is exchanged between the transfer controller and each of the operation and control terminals by means of the time-division multiplexing method, and a transfer signal including data corresponding to the operation of the operation section of the operation terminal is transmitted to the control terminal specified through correspondence between the addresses set in the transfer controller, to thereby control the illumination load connected to the transfer controller, the remote supervisory control system being provided in that the correspondence includes at least an individual control relationship for associating one operation section with one illumination load;

the control terminal includes an individual address setting section for setting a unique individual address to each of the plurality of control terminals;

the transfer controller transmits fade start control data to the control terminal by means of the transfer signal, after having transmitted to the control terminal data pertaining to a target dimmer level and a time required to fade the intensity of light to the target dimmer level; and the terminal processing section of each of the control terminals calculates the rate of dimming required for fading the intensity of the illumination load to the target dimmer level within the fade time, and fades the intensity of the illumination load to the target dimmer level according to the rate of dimming when receiving the fade start control data. Since the intensity of the illumination loads can be changed gradually, exertion of a load on the eyes is prevented, which would otherwise be caused by a sharp change in the intensity of illumination, and elaborate control of illumination according to the environment can be effected.

According to an eleventh aspect of the present invention, the remote supervisory control system as defined in the tenth aspect is further provided in that the transfer controller can transmit the fade time which varies according to each control terminal. For a plurality of illumination loads, elaborate control of illumination can be effected such that the intensity of certain illumination loads is changed quickly and such that the intensity of other illumination loads is changed slowly.

According to a twelfth aspect of the present invention, the remote supervisory control system as defined in the tenth aspect is further provided in that the correspondence includes a simultaneous control relationship for associating one operation section with a plurality of illumination loads;

the control terminal includes a simultaneous control address setting section for setting a simultaneous control address which is commonly assigned to the plurality of control terminals;

the transfer controller transmits, to the plurality of control terminals assigned a simultaneous control address, data pertaining to a target dimmer level and a time required for fading the intensity of light to the target dimmer level and transmits fade start control data to the respective control terminals by means of the transfer signal which includes the address data as the simultaneous control address; and the terminal processing section of each of the control terminals calculates the rate of dimming required for fading the intensity of the illumination load to the target dimmer level within the fade time and fades the intensity of the illumination load to the target dimmer level according to the rate of dimming when the terminal processing section is instructed to use the simultaneous control address by means of the transfer signal, when the address data included in the transfer signal match the simultaneous control address set in the simultaneous control address setting section, and when the terminal processing section receives the fade start control data. There can be effected pattern control, wherein a plurality of control terminals can be simultaneously subjected to fade control. The intensity of the illumination loads can be changed gradually, and hence elaborate pattern control can be effected according to the environment.

According to a thirteenth aspect of the present invention, the remote supervisory control system as defined in the twelfth aspect is further provided in that the transfer controller can transmit the fade time which varies according to each control terminal. Elaborate pattern control can be effected according to the environment by changing the fade time in units comprising a plurality of patterns.

According to a fourteenth aspect of the present invention, the remote supervisory control system as defined in the first aspect is further provided in that the operation terminal includes a display section for indicating the operation status of the associated load;

the transfer controller transmitting control data for switching an indication on the display section of the operation terminal according to the operation state of the load acquired from the control terminal; and the transfer controller being equipped with display method switching means for selectively switching the display method of the display section provided for each operation section of the operation terminal. Therefore, a display method can be selected according to the purpose of use of the operation terminal, and system configuration is facilitated.

According to a fifteenth aspect of the present invention, the remote supervisory control system as defined in the fourteenth aspect is provided in that the transfer controller exchanges with an external device a signal for setting and checking a display method for the display section. Therefore, a display method according to the purpose of use of the operation terminal can be selected, and system configuration is facilitated.

According to a sixteenth aspect of the present invention, the remote supervisory control system as defined in the fourteenth aspect is further provided in that the remote supervisory control system comprises control method switching means for selectively switching a load control method according to the procedures of operation of the operation section of the plurality of operation terminals. Therefore, a display method can be selected according to the purpose of use of the operation terminal, and system configuration is facilitated.

According to a seventeenth aspect of the present invention, the remote supervisory control system as defined in the sixteenth aspect is provided in that the control method includes an ON-prioritized control method wherein, if loads are shared between operation sections switches and a load is activated by at least one of the switches, deactivation of a load by another switch is invalidated, and a later-operation-prioritized control method for controlling a load by prioritizing a switch which is actuated later. Only the loads shared between the plurality of switches assigned the ON-prioritized control method are excluded from deactivating action of another switch, with the result that an easy-to-use system configuration can be readily realized.

According to a eighteenth aspect of the present invention, the remote supervisory control system as defined in the seventeenth aspect is further provided in that the transfer controller exchanges with an external device a signal for setting and checking the control method. By selection of a control method suitable for the purpose of use of the operation terminal, system configuration is facilitated.

According to a nineteenth aspect of the present invention, the remote supervisory control system as defined in the eighteenth aspect is further provided in that version information storage means, for storing version information pertaining to functions of the controller and the terminals, are provided with the transfer controller and the plurality of terminals; and the transfer controller or the terminal acquires the version information stored in the version information storage means of the transfer controller or another terminal, by way of the transfer signal, to thereby prevent problems such as faulty operation, which would otherwise be caused by a version mismatch. Thus, the present invention has an advantage of providing the ability to improve the operability of the remote supervisory control system.

According to a twentieth aspect of the present invention, the remote supervisory control system as defined in the first aspect is further provided in that each of the operation terminals has an individual address unique to the terminal and a simultaneous control address commonly assigned to a plurality of operation terminals; and the operation terminal connected to a load controls the load when the address data included in the transfer signal match the individual address or when the address data included in the transfer signal match the simultaneous control address.

Each of the terminals has the simultaneous control address in addition to the individual address, and the simultaneous control address is commonly assigned to a plurality of terminals. Hence, the terminals assigned the same simultaneous control address receive the same transfer signal substantially simultaneously and can control the loads at substantially the same timing. Therefore, the present invention has an advantage of providing the ability to operate a plurality of grouped loads without involvement of a time lag. Further, if the individual address is used, the loads can be individually controlled. Therefore, if individual loads are desired to be grouped while being controlled, they are controlled simultaneously, to thereby prevent occurrence of a time lag, which the user would consider strange.

According to a twenty-first aspect of the present invention, the remote supervisory control system as defined in the twentieth aspect is provided in that the operation terminal is provided with address setting memory, in which bit positions are associated with single addresses. An address flag is set in any of the bit positions of the address setting memory, and the address corresponding to the bit position is used as the address of the operation terminal. When a plurality of addresses are set, the memory capacity can be reduced, thus enabling cost reduction. Further, the time required for setting addresses can be shortened.

According to a twenty-second aspect of the present invention, the remote supervisory control system as defined in the twenty-first aspect is provided in that, the load is an illumination load, and upon receipt of data corresponding to the actuation of a switch related to group control, the transfer controller sequentially transmits a transfer signal including a target luminance level of each of the illumination loads associated with group control and an individual address. Subsequently, the transfer controller transmits a transfer signal including a simultaneous control address and control data for instructing the illumination load to start performing a control operation. As a result, the operation terminals assigned the same simultaneous control address receive the same transfer signal substantially simultaneously and start controlling the illumination loads at substantially the same timing, thereby preventing occurrence of a time lag, which the user would consider strange.

According to a twenty-third aspect of the present invention, the remote supervisory control system as defined in the twenty-second aspect is provided in that the terminal processing section provided in the operation terminal having the switches prohibits transmission of a transfer signal including the data corresponding to the actuation of the switch when the address data included in the transfer signal match the simultaneous control address. Therefore, a desired switch can be prohibited from controlling a load.

According to a twenty-fourth aspect of the present invention, the remote supervisory control system as defined in the first aspect is provided in that said operation terminal includes: a setting operation terminal which is connected to the signal line and which includes the operation section and the display section; wherein the setting operation terminal having:

a display capable of indicating characters and graphics, a transparent touch panel superimposed on the screen of the display, and a control section which can select between a setting mode in which there is set processing corresponding to the operation of an operation section assigned to the touch panel in association with contents of the display, and an operation mode in which the processing is performed in response to the operation of the operation section, and the processing of the control section comprises at least a function of using the operation section as a switch, a function of setting a portion of the correspondence, and a function of ascertaining the correspondence.

According to a twenty-fifth aspect of the present invention, the remote supervisory control system as defined in the twenty-fourth aspect is provided in that a mount piece having a mount section whose mount pitches are the same as those of a mount frame to which there can be attached a wiring accessory equal in size to an integral multiple of the dimensions of a large-square string wiring accessory; and at least a box mount hole, as an attachment section, into which there can be inserted a box screw capable of being screwed into a switch box of the wiring accessory.

According to a twenty-sixth aspect of the present invention, the remote supervisory control system as defined in the twenty-fifth aspect is further provided in that the control section has a function of assigning, in the setting mode, to the operation section an individual address equivalent to the address of the switch corresponding to the address of the load in a one-to-one correspondence, and a function of activating or deactivating the load in the operation mode by means of the user operating the operation section assigned the individual address.

According to a twenty-seventh aspect of the present invention, the remote supervisory control system as defined in the twenty-sixth aspect is further provided in that the control section has a function of assigning, in the setting mode, to the operation section a group address equivalent to the addresses of the switches corresponding to the addresses of the plurality of loads in a one-to-many correspondence, and a function of bringing the plurality of loads into the same state; activated or deactivated, in the operation mode by means of the user operating the operation section assigned the group address.

BRIEF DESCRIPTION OF THE DRAWINGS

FIG. 17 is a descriptive view for showing an example of a display indicated on the display unit of the remote supervisory control system of FIG. 13;

FIG. 18 is a descriptive view for showing an example of a display indicated on the display unit of the remote supervisory control system of FIG. 13;

FIG. 19 is a descriptive view for showing an example of a display indicated on the display unit of the remote supervisory control system of FIG. 13;

FIGS. 20(a)–20(e) are descriptive views for showing an example of a display indicated on the display unit of the remote supervisory control system of FIG. 13;

FIG. 22 is a data table according to which the remote supervisory control system shown in FIG. 21 operates;

FIG. 23 is a modified data table according to which the remote supervisory control system shown in FIG. 2 operates;

FIGS. 24(a)–24(b) are is a descriptive views showing the control procedures according to which the remote supervisory control system shown in FIG. 23 operates;

FIG. 25 is a descriptive view showing an address in bit map format of a sixth embodiment of the present invention;

DETAILED DESCRIPTION OF PREFERRED EMBODIMENTS

First Embodiment

Figure 1:
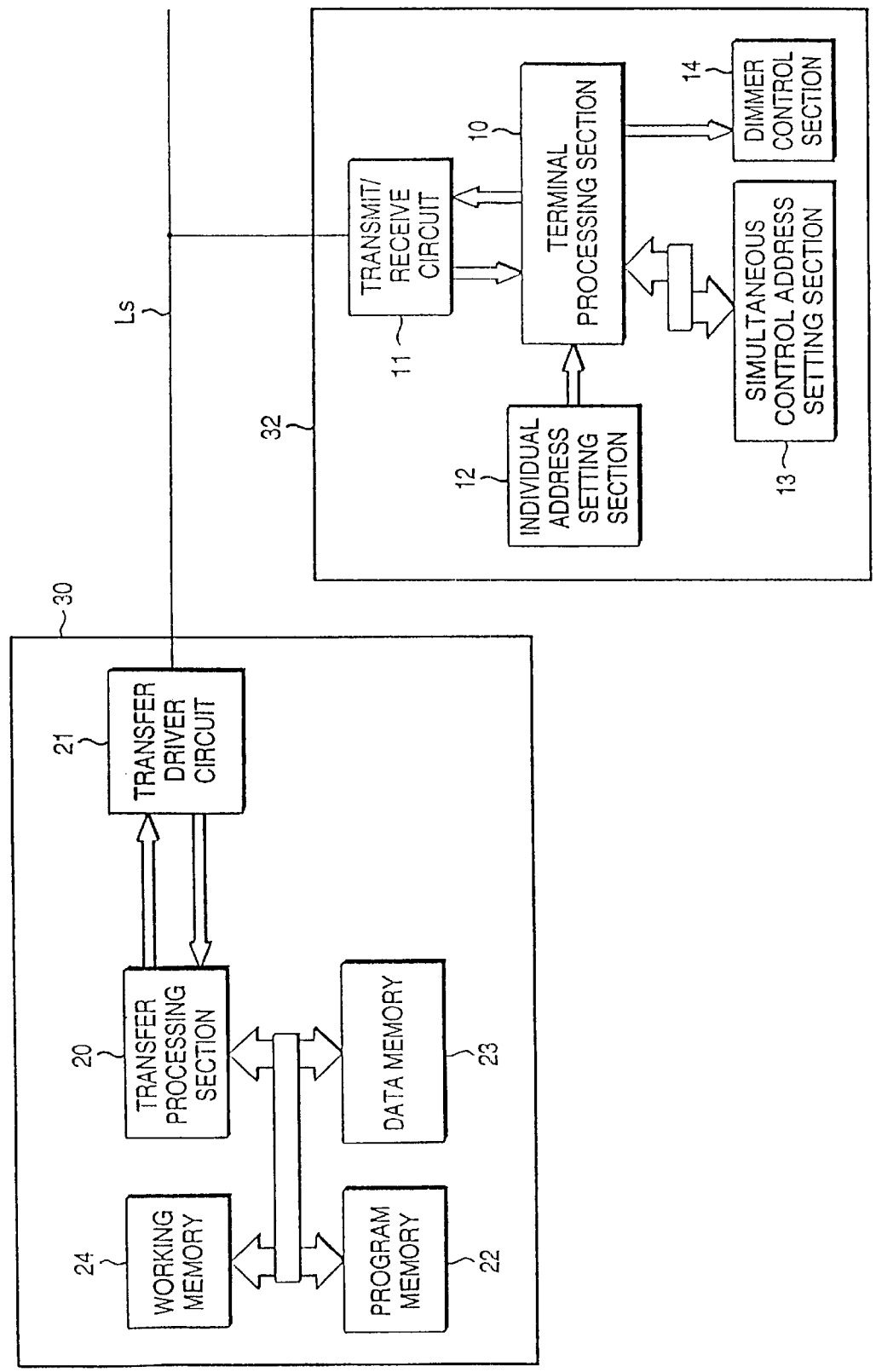
FIG. 1 is a block diagram showing the principal elements of a remote supervisory control system according to a first embodiment of the present invention.

FIG. 1 shows a remote supervisory control system according to a first embodiment of the present invention. FIG. 1 shows a transfer controller 30 and control terminals 32.

The transfer controller 30 comprises a transfer processing section 20, which includes a microprocessor. The transfer processing section 20 is connected to a signal line Ls by way of a transfer driver circuit 21. The operation of the transfer processing section 20 is defined by a program stored in program flash memory 22, which includes ROM. Correspondence between the terminals is stored in rewritable data memory 23 in the form of a table. Desirably, the data memory 23 comprises nonvolatile memory such as EEPROM. The data which are exchanged between the transfer controller 30 and the terminal during the operation of the transfer controller 30 are stored in working memory 24 comprising, for example, RAM.

The control terminals 32 are for dimming purposes, and each of the control terminals 32 is connected to a luminaire 33 (see FIG. 2), thereby controlling the intensity of light output from an illumination load provided in the luminaire 33. Consequently, the control terminal 32 according to the embodiments will be hereinafter referred to as a "dimmer terminal." In the case of an incandescent lamp being used as an illumination load, a dimmer including a triode AC switch (TRIAC) is incorporated in the dimmer terminal 32. In the case of a luminescent lamp being used as an illumination load, a dimmer incorporated in the luminaire is controlled by outputting dimmer data. Specifically, if the luminaire 33 includes an incandescent lamp, a dimmer control section 14 shown in FIG. 1 is provided with a dimmer. In contrast, if the luminaire 33 includes a fluorescent lamp, the dimmer control section 14 has a function of generating dimmer data.

As has been described in connection with the related art, the dimmer terminals 32 are connected to the transfer controller 30 by way of the two-wire Ls, and a transfer signal is transmitted between the transfer controller 30 and the dimmer terminals 32 by means of the time-division multiplex transmission method. Each of the dimmer terminals 32 comprises a terminal processing section 10, which includes a microcomputer. The terminal processing section 10 is connected to the signal line Ls by way of a transmit/receive circuit 11. The transmit/receive circuit 11 receives a bipolar transfer signal to be transmitted over the signal line Ls and depolarizes the thus-received signal (or subjects the signal to full-wave rectification). The thus-rectified signal is transmitted to a terminal processing section 10. Further, the dimmer terminal 32 is also equipped with a power circuit for extracting power from the transfer signal that is transmitted over the signal line Ls. The signal returned to the transfer controller 30 from the terminal processing section 10 is converted into a current-mode signal by means of the transmit/receive circuit 11, and the current-mode signal is sent to the signal line Ls.

The dimmer terminal 32 is provided with an individual address setting section 12 and a simultaneous control address setting section 13. The simultaneous control address setting section 13 comprises nonvolatile memory such as EEPROM, and the individual address setting section 12 comprises a dip switch or nonvolatile memory. An individual address set in the individual address setting section 12 is unique to the corresponding individual dimmer terminal 32. Individual addresses of the dimmer terminals 32 connected to the signal line Ls are set in such a way as to avoid an overlap. In contrast, a single simultaneous control address is commonly set in the simultaneous control address setting sections 13 of the respective dimmer terminals 32 connected to the signal line Ls. Only one individual address is set in the individual address setting section 12, but a plurality of simultaneous control addresses can be set in the simultaneous address setting section 13.

On the basis of the mode data included in the transfer signal transmitted over the signal line Ls, the terminal processing section 10 selects as the address of the dimmer terminal 32 either the individual address or the simultaneous control address. In a case where the mode data are set to an individual mode, if a match exists between the address data included in the transfer signal and the individual address set in the individual address setting section 12, the terminal processing section 10 controls the illumination loads by way of the dimmer control section 14. In a case where the mode data are set in a group control mode, if a match exists between the address data included in the transfer signal and the simultaneous control address, the terminal processing section 10 controls the illumination load by way of the dimmer control section 14.

As mentioned above, the dimmer terminal 32 has two types of addresses; i.e., the individual address and the simultaneous control address. When pattern control (i.e., group control) is effected, target luminance level instructions are sequentially sent to the dimmer terminals 32 which are the objects of pattern control. Subsequently, an instruction for starting a dimmer operation is sent to the dimmer terminals 32 through use of the simultaneous address; namely, the plurality of dimmer terminals 32 assigned the same simultaneous control address receive a dimmer start instruction substantially simultaneously, thus controlling the illumination loads without involvement of a time lag. More specifically, according to the present embodiment, the plurality of dimmer terminals 32 can receive a signal transfer signal through use of the simultaneous control address.

Figure 2:
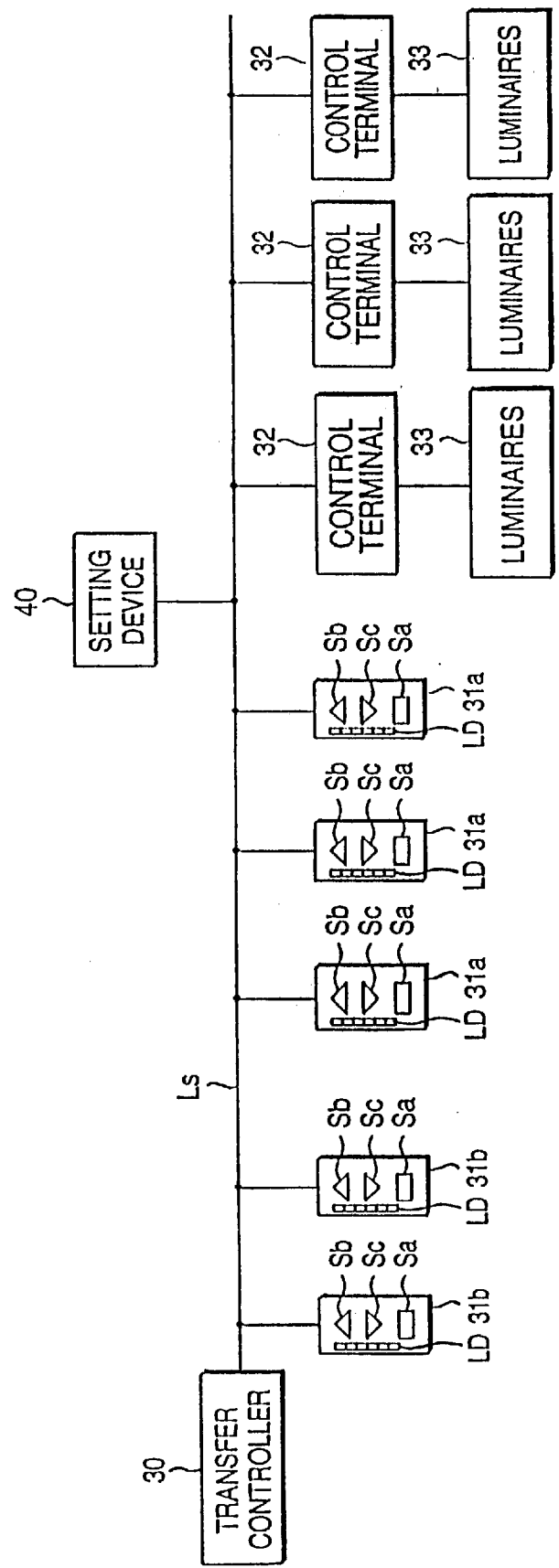
FIG. 2 is a diagram schematically showing an example of use of the remote supervisory control system.

As shown in FIG. 2, the plurality of dimmer terminals 32 (three terminals in FIG. 2) are connected to the transfer controller 30 by way of the signal line Ls, through multidrop connection. Operation terminals 31a and 31b are connected to the signal line Ls, wherein each of the operation terminals 31a is associated with a single illumination load (as mentioned previously, the luminaire 33 comprises illumination loads) in a one-to-one relationship, and each of the operation terminals 31b is associated with a plurality of illumination loads. Each of the operation terminals 31a and 32b comprises an on/off switch Sa for instructing an illumination load to be illuminated or extinguished; an UP switch Sb for instructing the illumination load to increase the intensity of light output therefrom; a DOWN switch Sc for instructing the illumination load to decrease the intensity of light; and a display section LD which comprises a plurality of light-emitting diodes aligned in a single file and indicates the intensity (the dimmer state) of light output from a corresponding illumination load by means of the number of illuminated light-emitting diodes. Although not shown in the drawings, a display terminal for indicating the operating status of the illumination loads on a per-group basis is connected to the signal line Ls, as required, in order to intensively monitor the operating status of the illumination loads in a monitoring room. The operation terminal 31a associated with a single illumination load is called an "individual dimmer switch." The operation terminal 31b associated with a plurality of illumination loads is called a "pattern dimmer switch".

When any one of the switches Sa to Sc of one of the individual dimmer switches 31a is actuated, the transfer controller 30 transmits operation information pertaining to the thus-pushed switch to the single dimmer terminal 32 previously associated with the switch 31a in a preset relationship. The on/off switch Sa instructs activation or deactivation of the illumination load. If either the UP switch Sb or the DOWN switch Sc is actuated while the illumination load is in an activated state, the intensity of light output from the illumination load is adjusted accordingly. For example, if the DOWN switch Sc is pressed, the dimmer terminal 32 is instructed to start decreasing the intensity of light. When the DOWN switch Sc is released, the dimmer terminal 32 is instructed to stop decreasing the intensity of light.

The UP switch Sb and the DOWN switch Sc instruct the dimmer terminal 32 by means of the transfer signal and through use of two parameters; namely, a point in time at which pressing of the switch is commenced and a point in time at which the switch is released. Upon receipt of the transfer signal which is output as a result of the user pressing either the UP switch Sb or the DOWN switch Sc, the dimmer terminal 32 changes the intensity of light output from the illumination load at a given rate in association with lapse of time, from the time changing of light intensity is started until the time changing of light intensity is stopped. In practice, the intensity of the light output from the illumination load is changed stepwise. The amount of change in light intensity per step and the rate of change of light intensity per second are set in such a way that the light output from the illumination load appears to be changing continuously.

Figure 3:
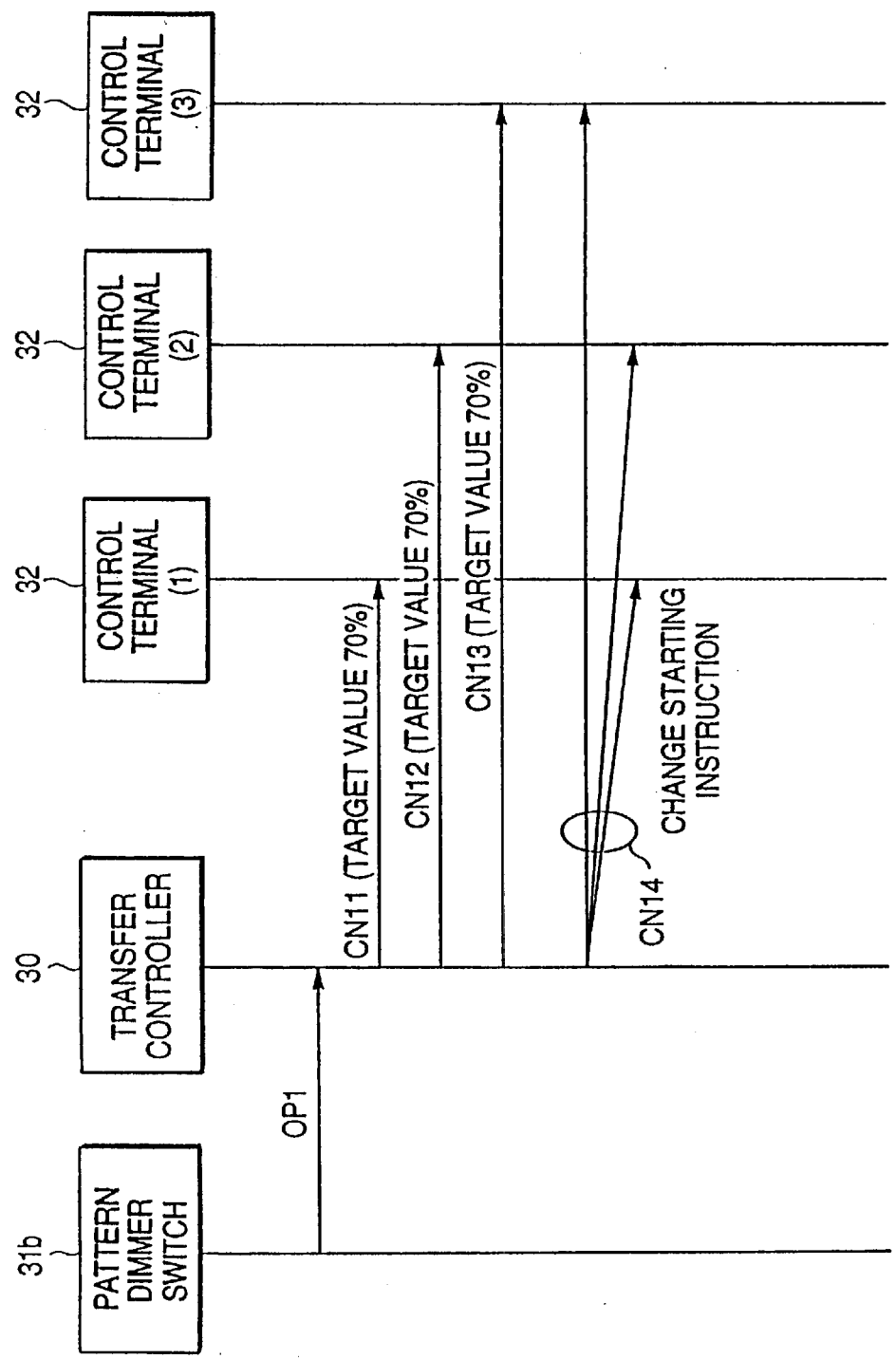
FIG. 3 is a descriptive view showing control procedures according to which the remote supervisory control system shown in FIG. 2 operates.

When the switch Sa of the pattern dimmer switch 31b is actuated, the transfer signal is transmitted to the respective dimmer terminals 32 belonging to the group, in a manner such as that shown in FIG. 3. In the configuration of the remote supervisory control system shown in FIG. 3, the pattern dimmer switch 31b is assigned to the same simultaneous control address assigned to the dimmer terminals 32(1), 32(2), and 32(3).

When the switch Sd of the pattern dimmer switch 31b is pushed, an operation signal OPi for instructing control of light intensity is transmitted to the transfer controller 30. The transfer controller 30 sequentially transmits to the dimmer terminals 32(1), 32(2), and 32(3) control signals CN11, CN12, and CN13, respectively, each of which includes a target luminance (dimmer) level as control data. More specifically, the control signal CN11 comprises the individual address of the dimmer terminal 32(1) as address data and also comprises the target luminance level of the illumination load connected to the dimmer terminal 32(1) as control data. Each of the dimmer terminals 32 stores the target luminance level. After having sequentially transmitted the control signals CN11, CN12, and CN13 through the signal line Ls, the transfer controller 30 transmits a transfer signal, which is assigned the simultaneous control address (i.e., the control signal CN14), through the signal line Ls in a group control mode. The dimmer terminals 32(1), 32(2), and 32(3) receive the control signal CN14 substantially simultaneously. As a result, the dimmer terminals 32(1), 32(2), and 32(3) substantially simultaneously start dimming the intensity of the illumination nodes. Through such procedures, the operation information is substantially simultaneously transmitted from the pattern dimmer switch 31b to each of the dimmer terminals 32 without involvement of a time lag, regardless of the number of the dimmer terminals 32. The operation signal OP1 and the control signals CN11 to CN14 are transfer signals.

So long as a plurality of simultaneous control addresses are assigned to a single dimmer terminal 32, the dimmer terminal 32 can belong to different groups. For example, a conference room or a presentation room may be used as a single room or used while being partitioned into a plurality of compartments. In such a case, the range of the illumination loads to be subjected to group control is changed. The illumination loads included in one group must be also be joined to another group. If the individual dimmer terminal 32 can be assigned only one simultaneous control address, the dimmer terminal 32 can be included in only one group. The remote supervisory control system according to the present embodiment enables the individual dimmer terminal 32 to belong to several groups. Even if a individual dimmer terminal is registered in a plurality of groups in an overlapping manner, no problems arise, thereby enabling dynamic and easy setting of group control.

As mentioned above, since a plurality of simultaneous control addresses can be assigned to an individual dimmer terminal 32, each dimmer terminal 32 can be included in several different groups. For example, a conference room or a presentation room may be used as a single room or used while being partitioned into a plurality of compartments. In such a case, the range of the illumination loads to be subjected to group control is changed. The illumination loads included in a single group must be separated into different groups. If the individual dimmer terminal 32 can be assigned only one simultaneous control address, the dimmer terminal 32 can be included in only one group. The remote supervisory control system according to the first embodiment enables the individual dimmer terminal 32 to belong to several groups. Even if a individual dimmer terminal is registered in a plurality of groups in an overlapping manner, no problems arise, thereby enabling dynamic and easy setting of group control.

Group data representing the groups to which the dimmer terminal 32 to be subjected to group control belongs are stored in the data memory 23 of the transfer controller 30. The group data may be set by the transfer controller 30 or by means of a transfer signal transmitted from a group setting device by way of the signal line Ls. For example, if the group of the dimmer terminals 32 is changed (i.e., the group data are changed) as a result of a change in the layout of the room, the simultaneous control address must again be assigned to the dimmer terminals 32. Assigning a simultaneous control address to the respective dimmer terminals 32 is achieved by a method of transmitting a simultaneous control address to the dimmer terminals 32 by way of the signal line Ls, or by a method of transmitting a simultaneous control address to the dimmer terminals 32 by way of another transmission line. According to the latter method, a simultaneous control address is prepared by a setting device provided separately from the remote supervisory control system, and the simultaneous control address is transmitted to the dimmer terminals 32 through use of an optical wireless signal or a connection line connected to the dimmer terminals 32. In contrast, according to the former method, a simultaneous control address is transmitted to the dimmer terminals 32 from the transfer controller 30 by way of the signal line Ls.

When setting or changing the dimmer terminals 32 to be subjected to group control, the transfer controller 30 detects the simultaneous control addresses that are currently used and assigns an available simultaneous control address to the respective dimmer terminals 32. In other words, the remote supervisory control system is brought into a state in which the system enables setting of group control (i.e., the system is activated in a group setting mode). If instructions (imparted from the outside by a manufacturer) for associating the pattern dimmer switches 31b with illumination loads (the dimmer terminals 32) are provided, an available simultaneous control address is automatically calculated, and the thus-calculated simultaneous control address is transmitted to—in the form of an address setting signal—and registered in the respective dimmer terminals 32.

An available simultaneous control address is automatically selected through use of the foregoing transfer controller 30, and the thus-selected address is registered into the respective dimmer terminals 32. Consequently, group control can be set without requiring awareness of the simultaneous control address. Further, so long as the dimmer terminals 32 which are to be assigned the simultaneous control address are selected, the transfer controller 30 performs an operation for assigning the simultaneous control address to the respective dimmer terminals 32. Hence, in comparison with the operation for assigning a simultaneous control address to the respective dimmer terminals 32, the operation is facilitated.

Even in a case where the number of dimmer terminals 32 is increased in association with extension of the remote supervisory control system or where the individual addresses of the existing dimmer terminals 32 are changed, a simultaneous control address must be assigned to the additionally-provided dimmer terminals 32 or the dimmer terminals 32 whose individual addresses are changed. To this end, the additionally-provided dimmer terminals 32 or the dimmer terminals 32 whose individual addresses are changed inform the transfer controller 30 of addition of the dimmer terminals or change of the individual addresses by issuing an interrupt signal during a full-time polling operation. The transfer controller 30 transmits a simultaneous control address to all the dimmer terminals 32 by means of the address setting signal, to thereby assign the simultaneous control address to the dimmer terminals 32. A simultaneous control address available for the dimmer terminals 32 that have informed the transfer controller 30 is determined through the foregoing processing operation, and the thus-determined simultaneous control address is registered.

As mentioned above, in a case where the individual addresses are assigned to new dimmer terminals 32 or the individual addresses assigned to the dimmer terminals 32 are changed, the transfer controller 30 automatically determines a simultaneous control address corresponding to the group to which the dimmer terminals 32 belong and assigns the thus-determined simultaneous control address to the dimmer terminals 32 through use of the transfer signal, thus greatly facilitating the operation for setting a simultaneous control address.

As mentioned above, in a case where the simultaneous control address is assigned to the dimmer terminals 32 by means of the transfer signal, in practice the simultaneous control address may not be correctly transmitted to the dimmer terminals 32 and another different simultaneous control address may be set to the dimmer terminals 32 under the influence of noise entering the signal line Ls. In this case, as a matter of course, a group dimmer operation differing from an intended operation may be performed.

In the present embodiment, this problem is prevented by setting a simultaneous control address according to procedures which will be described below.

The transfer controller 30 assigns a simultaneous control address to the dimmer terminals 32 in conjunction with identification data pertaining to the simultaneous control address. The identification data correspond to checksum data which are formed by summation of the individual addresses of the respective dimmer terminals 32 at a point in time when a simultaneous control address is set and the simultaneous control address includes 16 data sets, each data set comprising 8 bits. Before assigning a simultaneous control address to the dimmer terminals 32, the transfer controller 30 performs a polling operation and requests the respective dimmer terminals 32 to return their identification data that had been most recently set through use of the transfer signal, thereby acquiring the checksum data comprising the individual addresses—that had been assigned to the respective dimmer terminals most recently and that are included in the identification data—and the simultaneous control data that had been set most recently. The thus-acquired checksum data (i.e., the identification data) are compared with the identification data stored in the data memory 23. If a match exists between the identification data stored in the data memory 23 and the thus-acquired identification data; i.e., if the simultaneous control address corresponding to a certain individual address is identical with the simultaneous control address which is to be set, there is no need to re-assign the simultaneous control address to the dimmer terminals 32. For this reason, assignment of the simultaneous control address is not carried out. Only when a difference exists between the identification data stored in the data memory 23 and the acquired identification data, a simultaneous control address must be assigned to the dimmer terminals 32. In such a case, a simultaneous control address is transmitted to and assigned to the dimmer terminals 32 by use of a transfer signal, thereby assuring assignment of simultaneous control data by means of the transfer signal. After checking of simultaneous control data and assignment of the simultaneous control data to all the terminals, a checksum pertaining to all the transmitted data sets is exchanged, thereby improving reliability of simultaneous control data.

If the remote supervisory system is shut down before the transfer controller 30 has finished assigning a simultaneous control address to the dimmer terminals 32, in practice the simultaneous control data which should be activated may not match the simultaneous control address assigned to the respective dimmer terminals 32. As a matter of course, a group dimmer operation differing from an intended group dimmer operation is performed. Such a faulty operation can be prevented, so long as the transfer controller 30 checks, upon turn-on, the simultaneous control address assigned to the dimmer terminals 32 which are connected to the signal line Ls. If the simultaneous control address differs from an address which should be assigned to the dimmer terminals 32, the transfer controller 30 re-assigns a correct simultaneous control address to the dimmer terminals 32 through use of the transfer signal. Alternatively, during the polling operation which is usually performed by the transfer controller 30, the transfer controller 30 may check the simultaneous control address.

On the basis of the light output data returned from the dimmer terminals 32 within the group by means of the polling operation performed by the transfer controller 30, the display of the display section LD of each of the group dimmer switches 31b is changed. Actual emission of light from the illumination loads within the group lags behind the appearance of an indication on the display section LD of the group dimmer switch 31b. The user may consider such a time lag to be strange.

While the light output from the illumination loads within the group is being changed, the transfer controller 30 refers to a table of the group data stored in the data memory 23 and polls the individual dimmer terminals 32 belonging to the group in preference to other terminals. If the dimmer terminals 32 to be subjected to group control are polled in a prioritized manner, the dimmer terminals 32 return data pertaining to the light output from the illumination loads within the group. As a result, there is prevented a time lag between actual illumination of the illumination loads and the appearance of an indication on the display section LD of the group dimmer switch 31b, thus enabling indication of a display without involvement of a time lag, which would otherwise occur and be considered strange by the user.

Second Embodiment

In a case where a luminaire is illuminated in a room at night, if the intensity of light of the luminaire increases instantaneously, a heavy load is exerted on the eyes. A second embodiment is provided by providing the dimmer terminal 32 for individual control purpose with a fade function for gradually increasing the intensity of the light output from the illumination loads at the time of actuation of the on/off switch Sa of the individual dimmer switch 31a. The remote supervisory control system according to the present embodiment is equal in basic configuration to the remote supervisory control system according to the first embodiment, and hence its explanation and illustration are omitted here.

Data which are registered beforehand in the data memory 23 of the transfer controller 30 pertain to an extent (i.e., a target dimmer level) to which the illumination loads of the corresponding dimmer terminal 32 are illuminated at the time of actuation of the on/off switch Sa of the individual dimmer switch 31a. The dimmer level data may be set by means of the individual dimmer switch 31a or by means of a pattern setting device, which will be described later.

Figure 4:
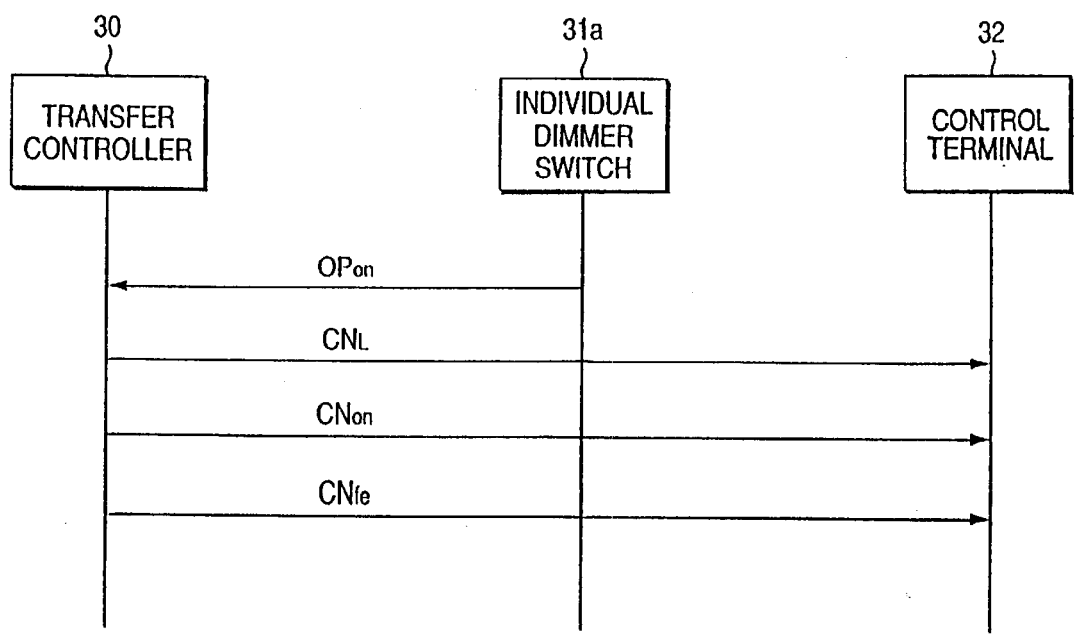
FIG. 4 is a descriptive view showing control procedures according to a second embodiment of the present invention.

The operation of individual control according to the second embodiment will now be described by reference to an example shown in FIG. 4. In this example, the intensity of the illumination load of the dimmer terminal 32 is increased to a target dimmer level of 60% (a target dimmer level of 100% corresponds to maximum illumination of the illumination loads) within three seconds (this period of time is called "fade time")by means of the individual dimmer switch 31a. In the system shown in FIG. 4, the individual address of the individual dimmer switch 31a is associated with the individual address of the dimmer terminal 32.

When the on/off switch Sa of the individual dimmer switch 31a is pressed, the individual dimmer switch 31a transmits to the transfer controller 30 an operation signal OPon representing that the on/off switch Sa is pressed. The transfer controller 30 transmits a level signal $CN_L$ representing a preset target dimmer level (of 60%) to the dimmer terminal 32 associated with the individual address of the individual dimmer switch 31a that has transmitted the operation signal OPon. Subsequently, the transfer controller 30 also transmits to the dimmer terminal 32 an ON signal CNon for activating the illumination load at a dimmer level of 0%. The target dimmer level received by the dimmer terminal 32 is stored in memory, and upon receipt of the ON signal CNon the dimmer terminal 32 activates the illumination load at a dimmer level of 0%.

The transfer controller 30 transmits to the dimmer terminal 32 a fade start signal CNfe including a fade time (=three seconds). Upon receipt of the fade start signal CNfe, the dimmer terminal 32 calculates the rate of dimming required for increasing the intensity of the illumination load from a dimmer level of 0% to a target dimmer level (of 60%) within three seconds. According to the thus-calculated rate of dimming, the dimmer terminal 32 performs a so-called fade-in operation, to thereby gradually increase the intensity of the illumination load.

Figure 5:
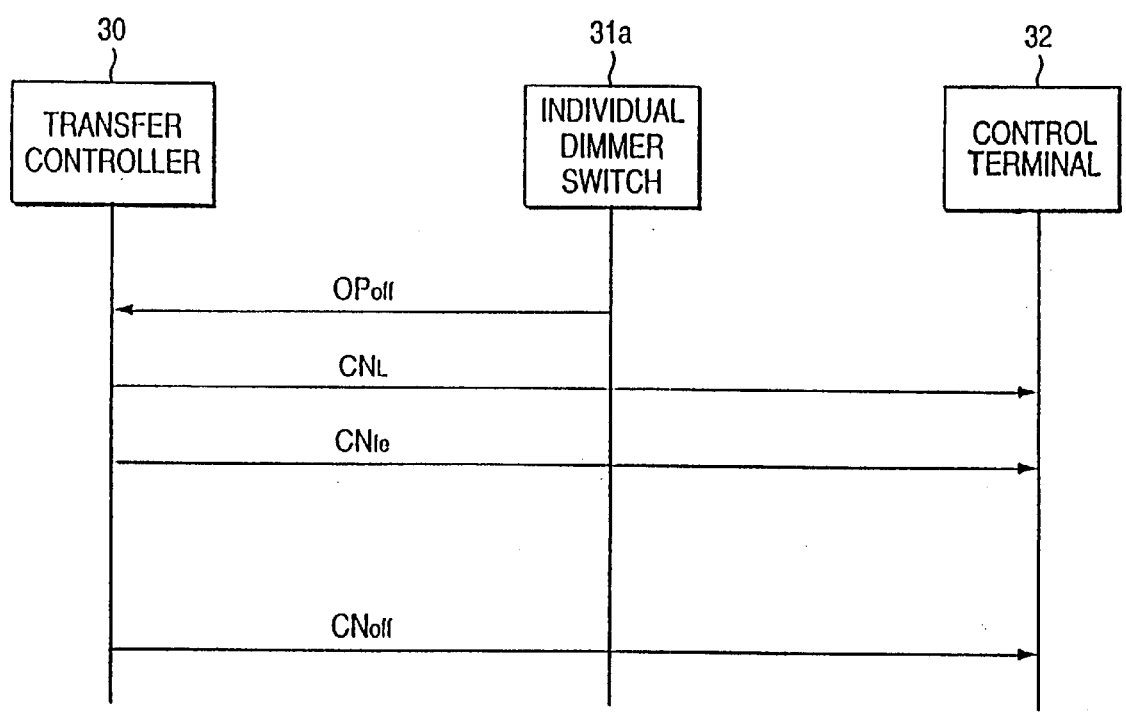
FIG. 5 is a descriptive view showing the control procedures according to which a remote supervisory control system shown in FIG. 4 operates.

Extinction of the illumination load illuminated at the target dimmer level will now be described by reference to FIG. 5.

When the on/off switch Sa of the individual dimmer switch 31a is pushed while the illumination load is illuminated at the target dimmer level (of 60%), the individual dimmer switch 31a transmits to the transfer controller 30 an operation signal OPoff representing that the on/off switch Sa is pushed. The transfer controller 30 transmits a level signal $CN_L$ representing a target dimmer level (of 0%) to the dimmer terminal 32 associated with the individual address of the individual dimmer switch 31a that has transmitted the operation signal OPoff. The target dimmer level received by the dimmer terminal 32 is stored in memory.

Next, the transfer controller 30 transmits to the dimmer terminal 32 the fade start signal CNfe including a fade time (of three seconds). Upon receipt of the fade start signal CNfe, the dimmer terminal 32 calculates the rate of dimming required for decreasing the intensity of the illumination load from the target dimmer level of 60% to a dimmer level of 0% within three seconds. According to the thus-calculated rate of dimming, the dimmer terminal 32 performs a so-called fade-out operation, to thereby gradually decrease the dimmer level of the illumination load. Simultaneous with transmission of the fade start signal CNfe, the transfer controller 30 starts counting the fade time. At a point in time when the transfer controller 30 has finished counting the fade time, an OFF signal CNoff for deactivating the illumination load is transmitted to the dimmer terminal 32. The dimmer terminal 32 that has received the OFF signal CNoff deactivates the illumination load.

As mentioned above, through the pushing action of the on/off switch Sa of the individual dimmer switch 31a, the corresponding dimmer terminal 32 gradually changes the dimmer level of the illumination load at the rate of dimming calculated from the target dimmer level and the fade time. Accordingly, the intensity of light output from the illumination load is gradually changed, to thereby mitigate the load exerted on the eyes due to dazzle, as well as to enable elaborate control of illumination according to the environment.

The user may desire to gradually change the dimmer level of the illumination load in a certain location but to quickly change the dimmer level of the illumination load placed in another location. To this end, the fade time can be arbitrarily set from one illumination load to another, thereby enabling elaborate control of illumination according to the environment.

Third Embodiment

Of the luminaires arranged over a wide area such as a conference room, the luminance of only the luminaires located in a place where, for example, the light of an overhead projector (OHP) is projected is decreased until it becomes lower than the luminance of the luminaires located in the other locations within the room. In such a case, pattern control is effected to thereby realize desired illumination by collectively controlling a plurality of illumination loads. Even during such pattern control, if the intensity of light output from the illumination loads is changed suddenly, the occupants of the room are dazzled, thus exerting a heavy load on the eyes. In the third embodiment, such a problem is prevented by application of a fade function to the pattern control.

At the time of realization of the fade function during pattern control, consideration must be given to the point that the light output from the plurality of illumination loads to be subjected to pattern control must start or stop increasing simultaneously. In the pattern control performed by the conventional remote supervisory control system, the transfer controller—which has received an operation signal from the operation terminals for pattern control purposes—refers to a pattern table having patterns registered therein and sequentially transmits control data to the respective dimmer terminals. As a result, a time lag arises in the timing at which the dimmer terminals start or stop changing the intensity of light output from the illumination loads.

The present embodiment solves such a problem by performing pattern control according to the following procedures.

Figure 6:
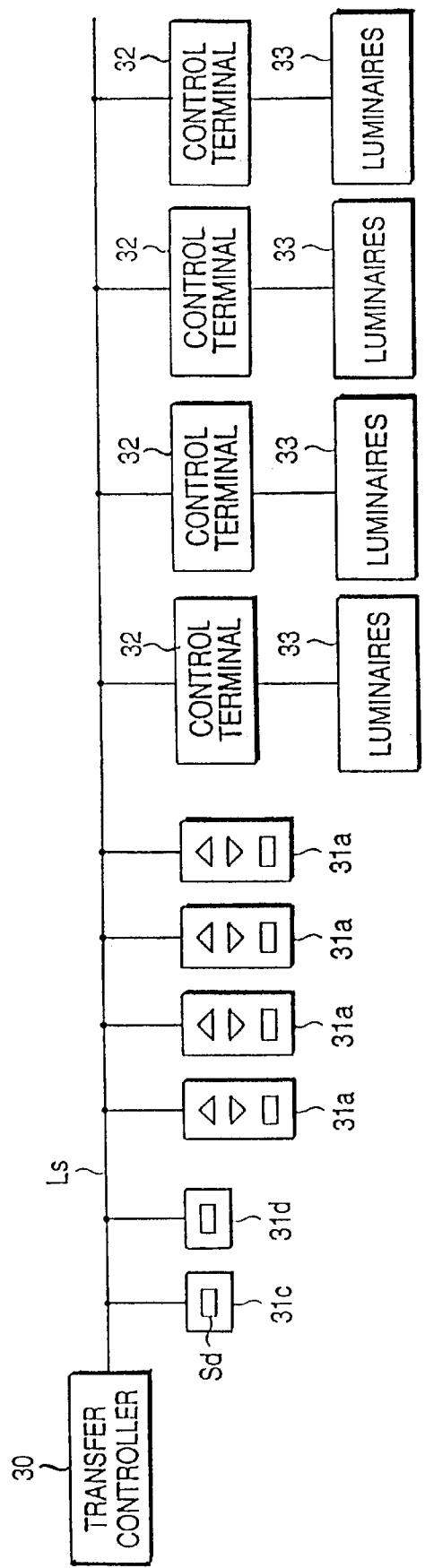
FIG. 6 is a diagram schematically showing an example of use of a remote supervisory control system according to a third embodiment of the present invention.

FIG. 6 shows the configuration of a remote supervisory control system according to the third embodiment. The system differs from the system according to the first embodiment only in that an operation terminal for pattern control use (hereinafter referred to as a "pattern switch") 31c and an operation terminal (hereinafter referred to as a "group switch") 31d for collectively activating or deactivating the illumination loads within the group are connected to the transfer controller 30 by way of the signal line Ls. Pattern data are stored in the data memory 23 of the transfer controller 30 beforehand. The pattern data comprise individual addresses of the respective dimmer terminals 32 which control the illumination loads to be subjected to pattern control; target dimmer levels of the respective dimmer terminals 32; a fade time; and a simultaneous control address commonly assigned to the respective dimmer terminals 32.

Figure 7:
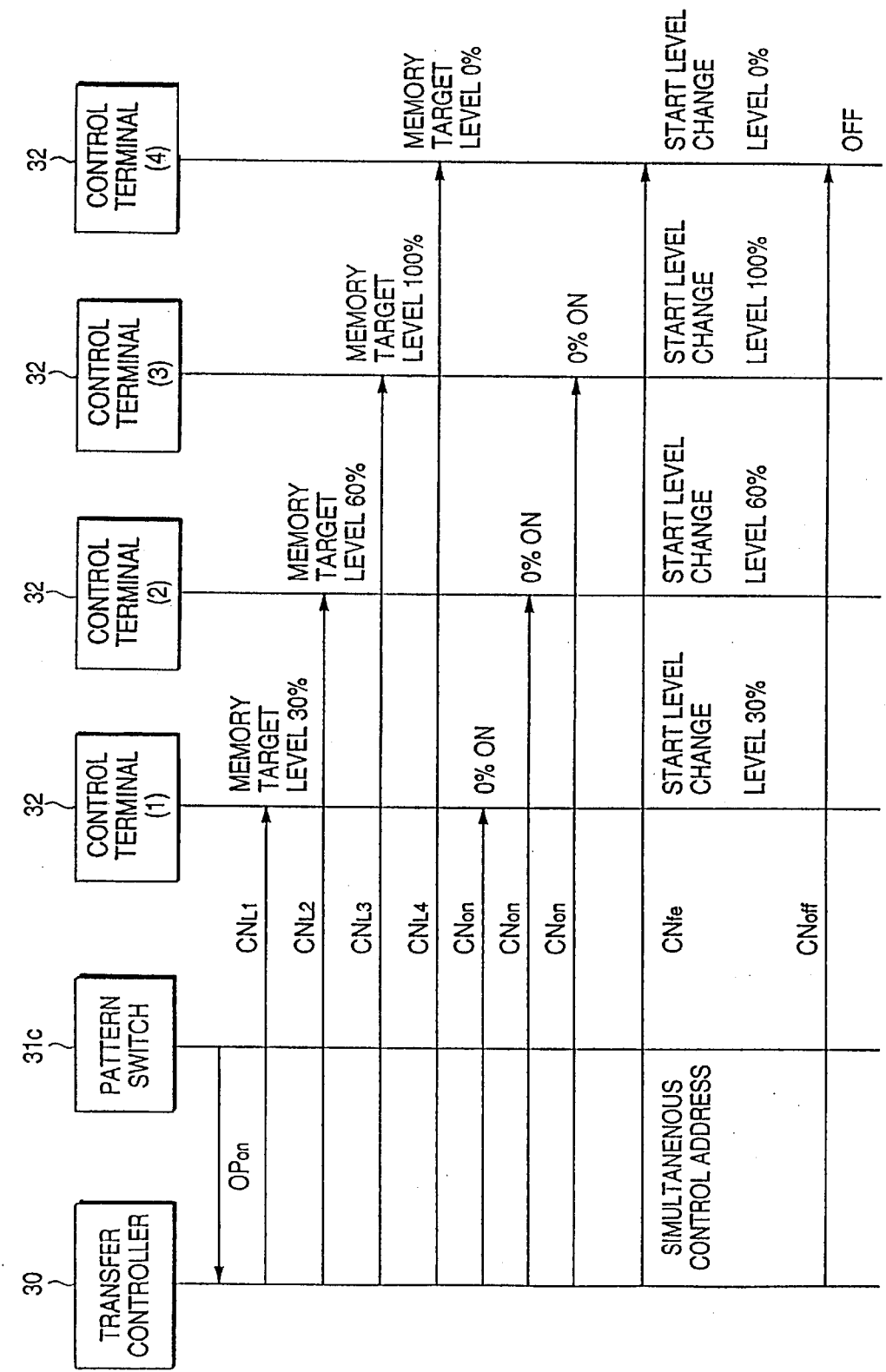
FIG. 7 is a descriptive view showing the control procedures according to which the remote supervisory control system shown in FIG. 6 operates.
Figure 8:
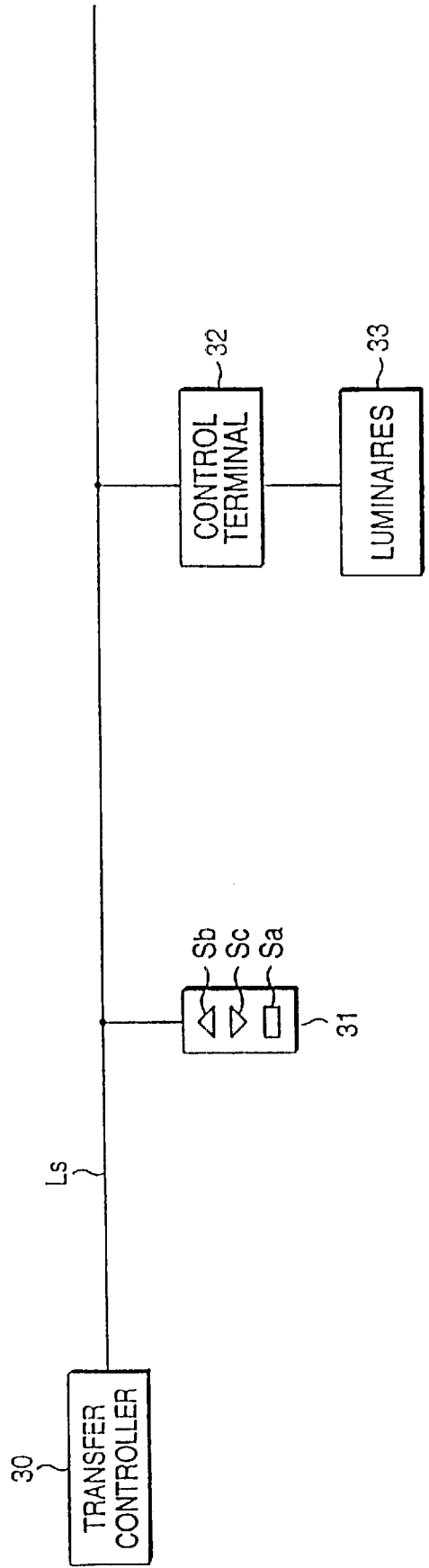
FIG. 8 is a diagram schematically showing the configuration of a conventional remote supervisory control system.
Figures 9A, 9B, 9C:
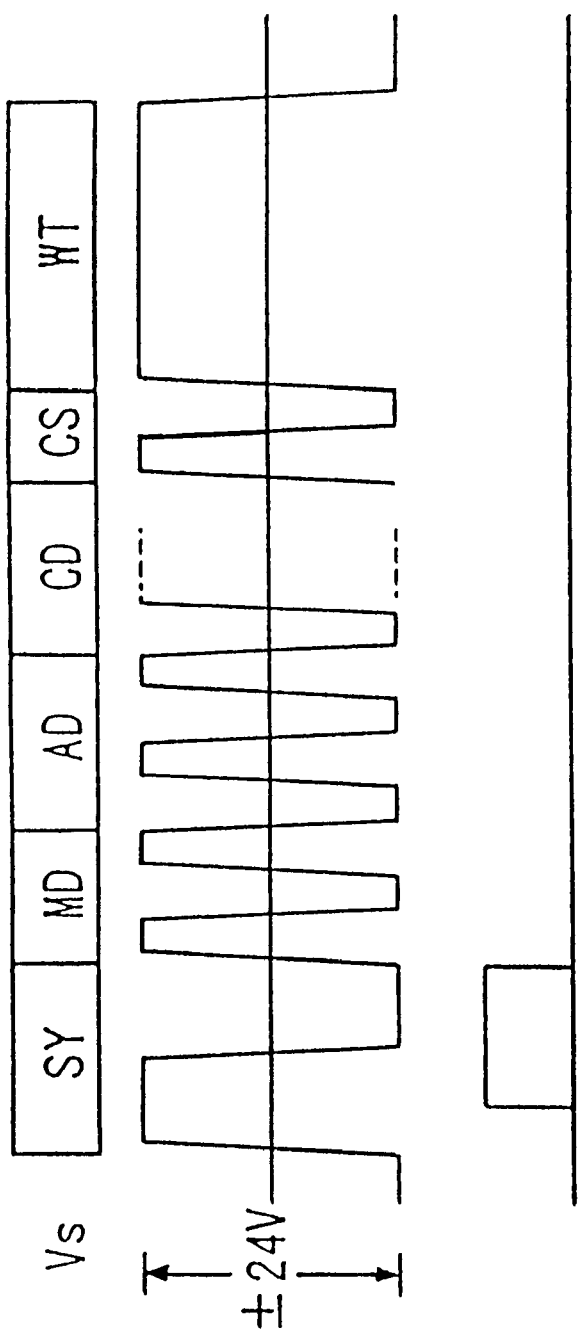
FIGS. 9(a)–9(c) are is a descriptive views showing the operation of the remote supervisory control system.
Figure 10:
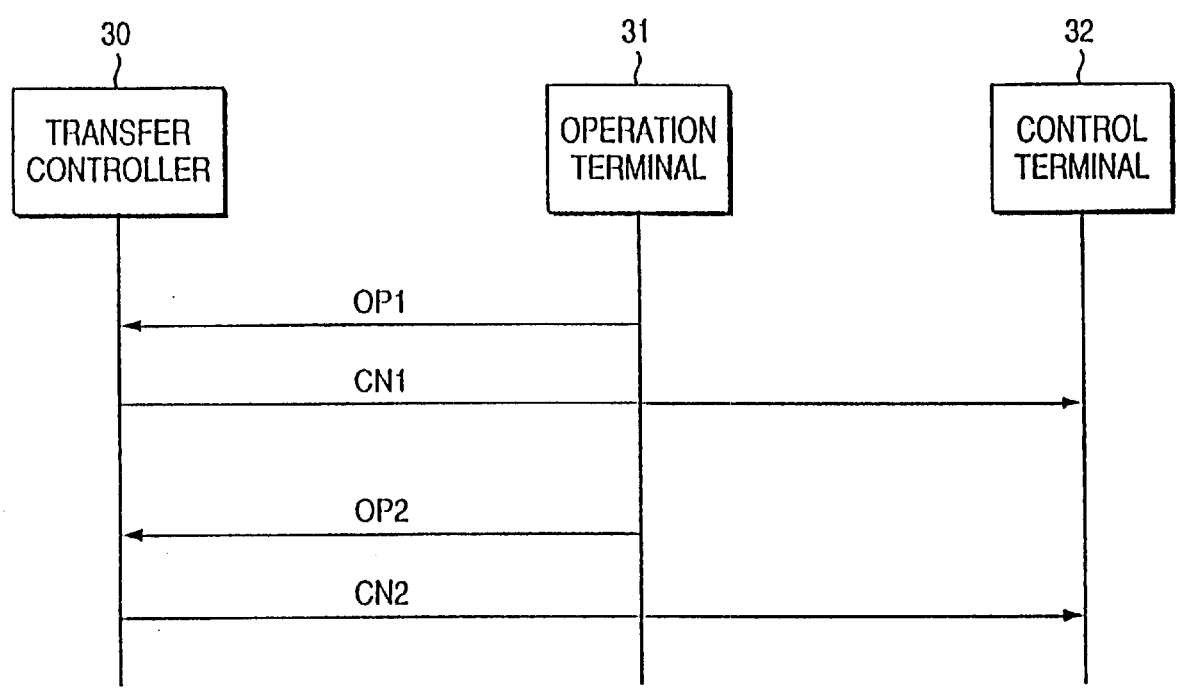
FIG. 10 is a descriptive view showing the control procedures according to which the remote supervisory control system shown in FIG. 8 operates.
Figure 11:
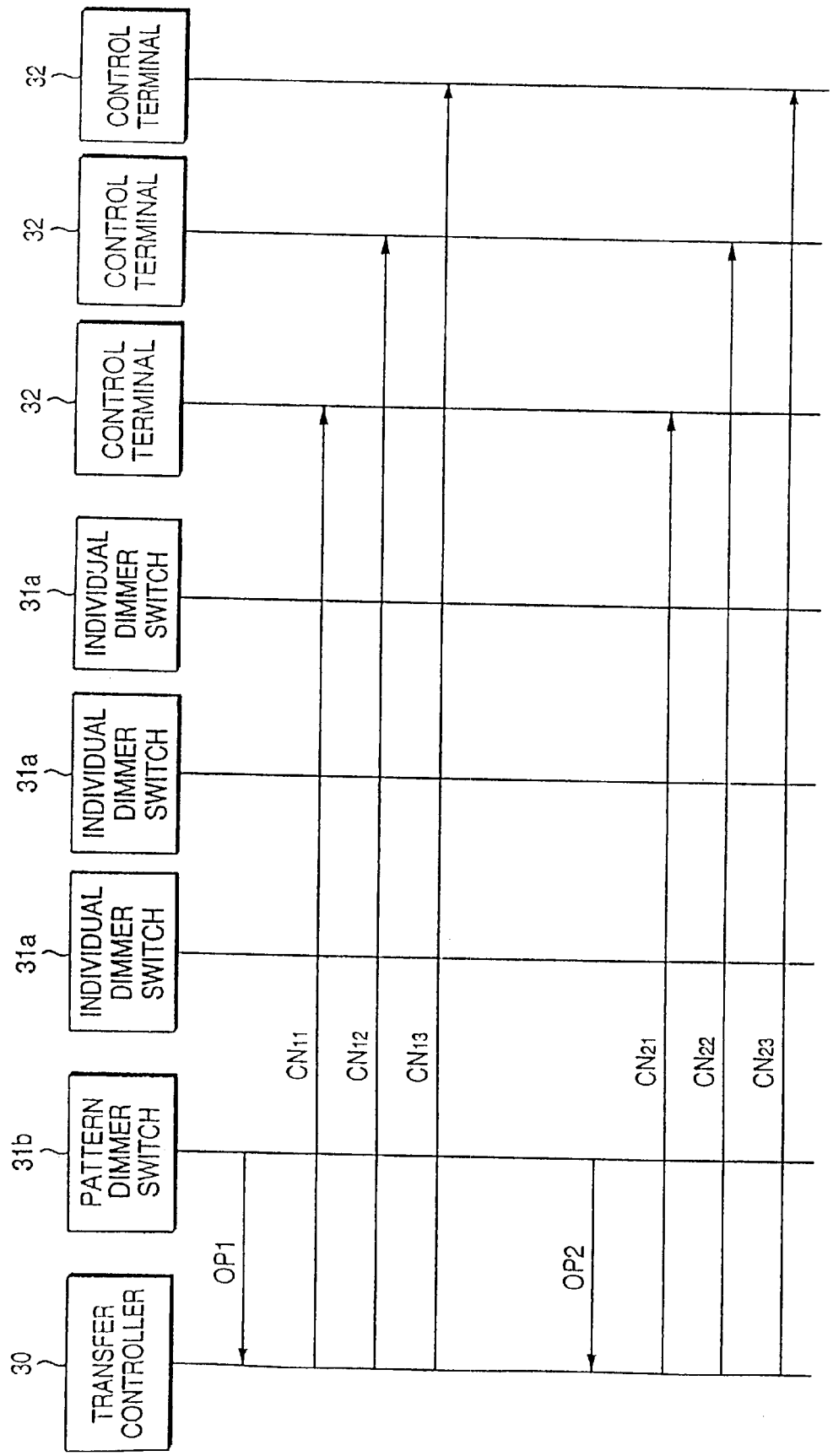
FIG. 11 is a descriptive view the procedures according to which the remote supervisory control system shown in FIG. 6 performs group control.
Figure 12:
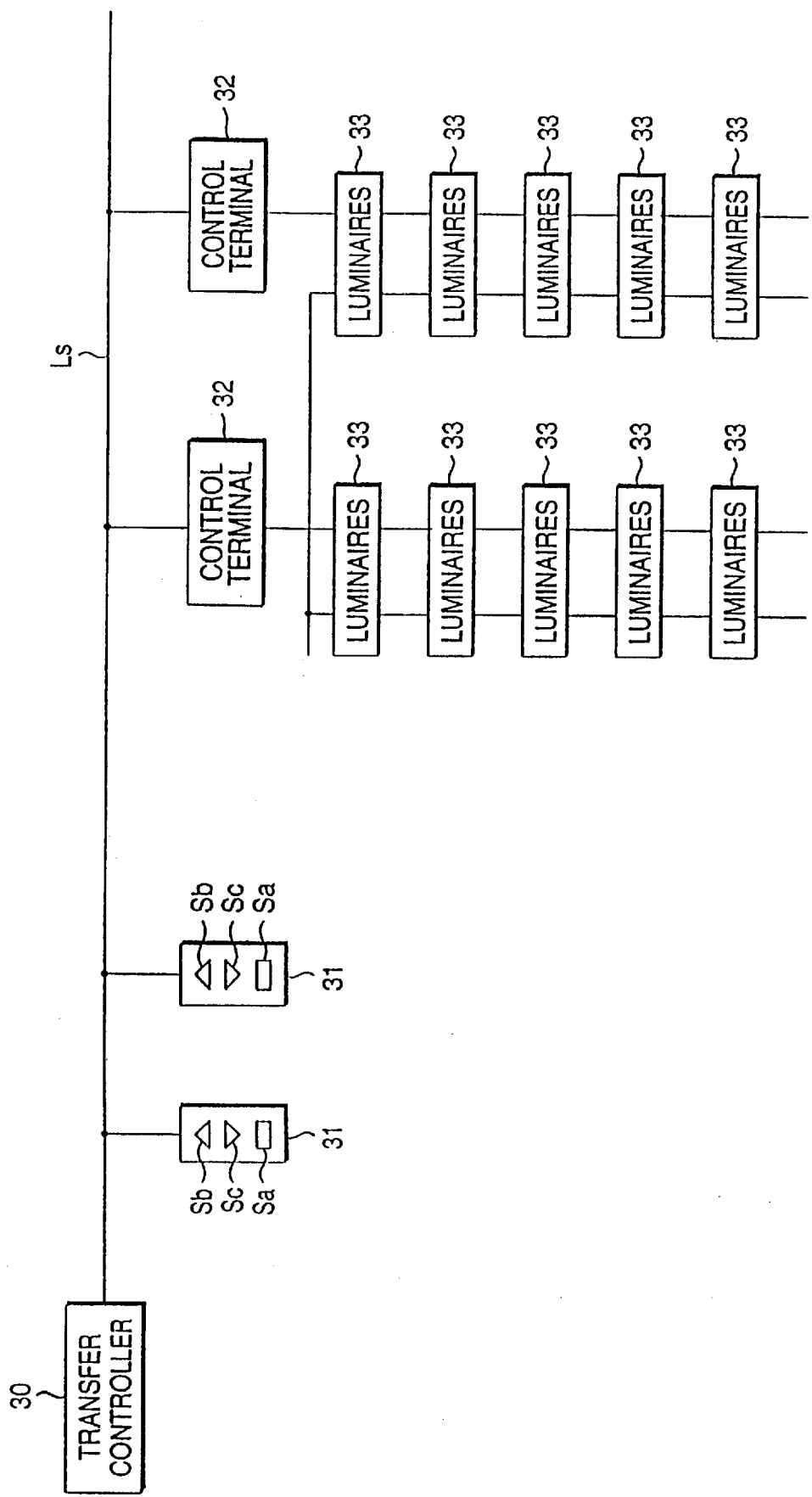
FIG. 12 is a diagram schematically showing another example of configuration of the remote supervisory control system.
Figure 13:
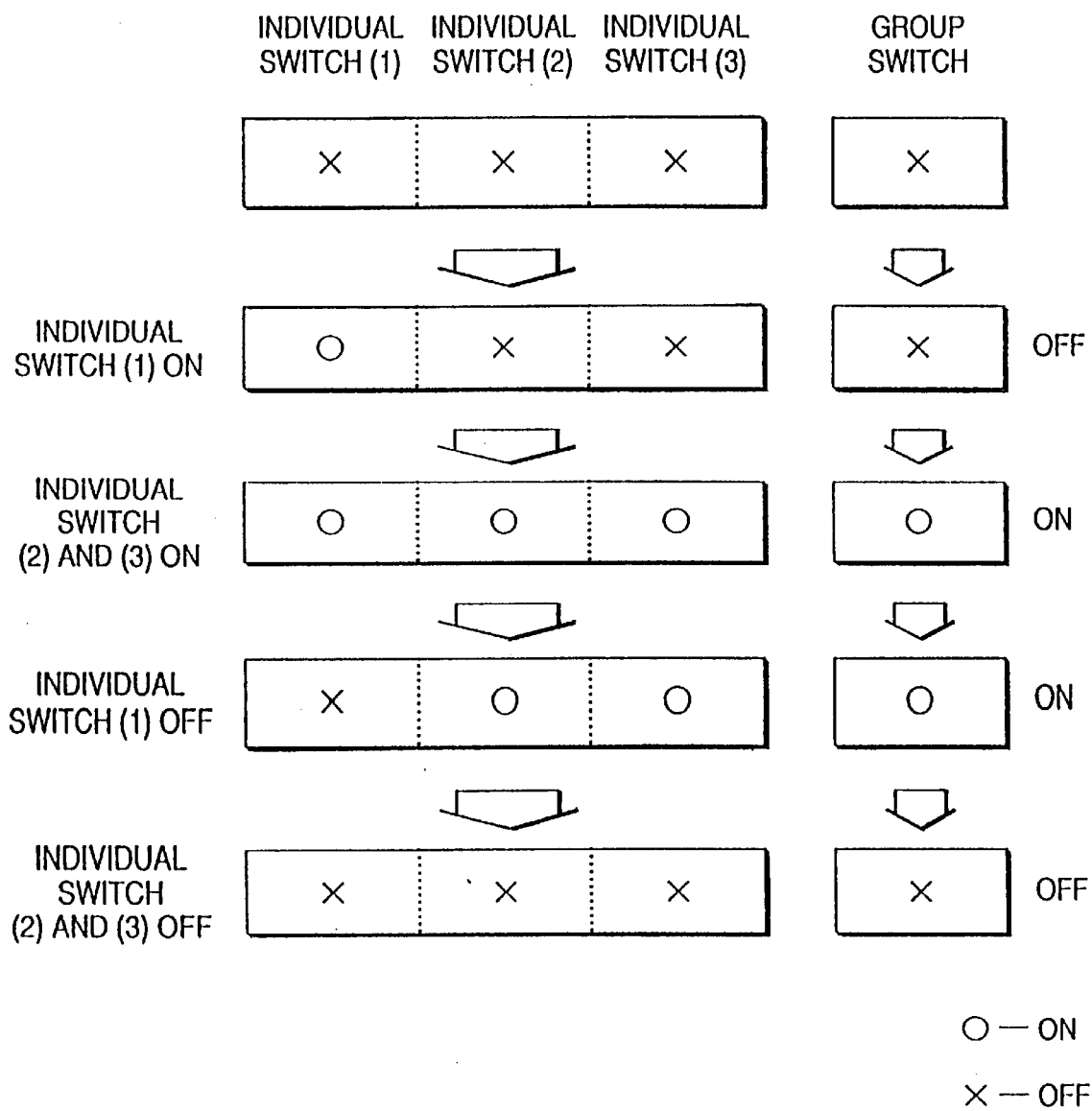
FIG. 13 is a block diagram showing a conventional remote supervisory control system.
Figure 14:
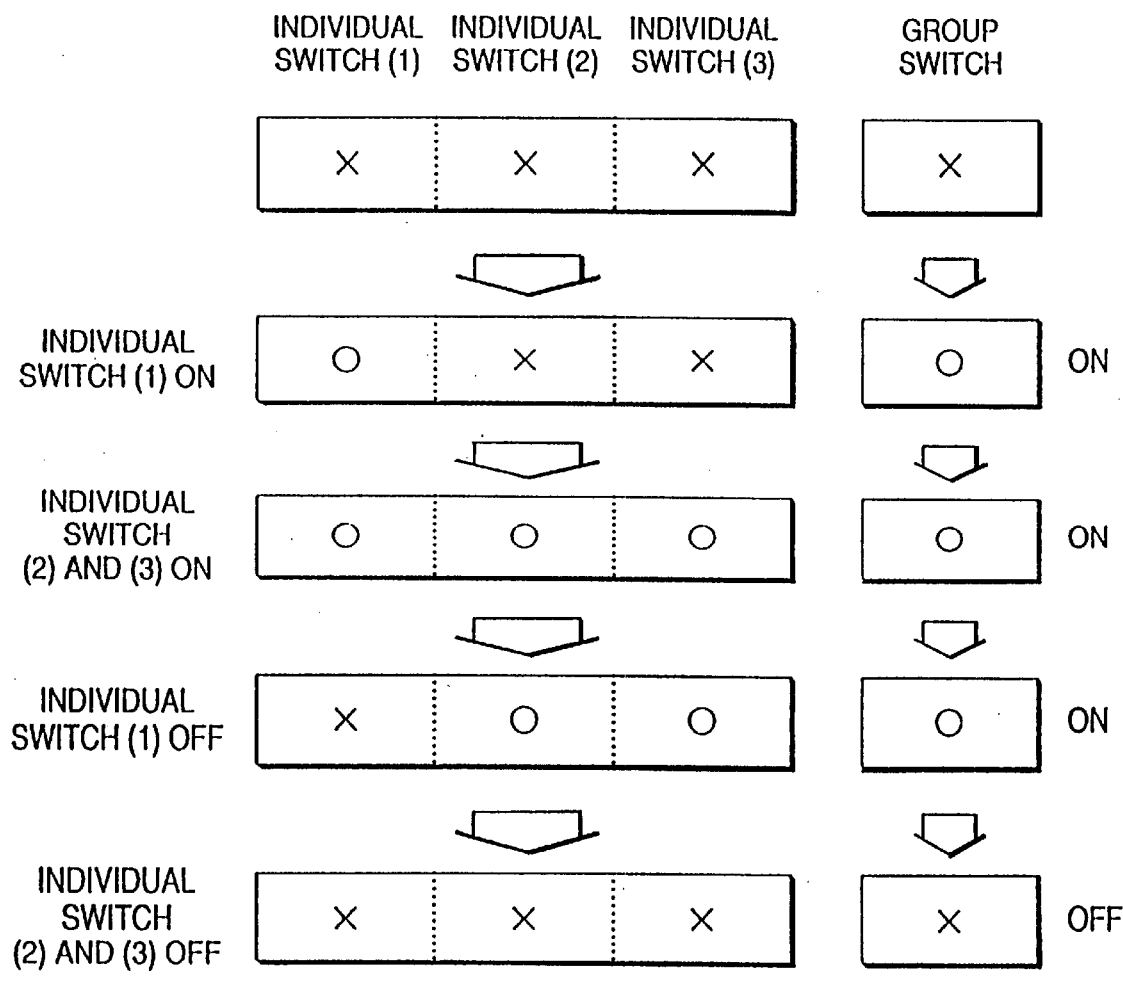
FIG. 14 is an example of a transmission signal used in the system in FIG. 13.

The pattern control operation of the remote supervisory control system according to the third embodiment will be described by reference to an example shown in FIG. 7. In this example, the illumination loads of dimmer terminals 32(1) to 32(4) are increased to their respective target dimmer levels within a fade time of six seconds by means of the pattern switch 31c: namely, the illumination load of the dimmer terminal 32(1) is increased to a target dimmer level of 30%; the illumination load of the dimmer terminal 32(2) is increased to a target dimmer level of 60%; the illumination load of the dimmer terminal 32(3) is increased to a target dimmer level of 100%; and the illumination load of the dimmer terminal 32(4) is increased to a target dimmer level of 0%. In the system configuration shown in FIG. 7, the individual addresses of the pattern switch 31c are associated with the simultaneous control address of the dimmer terminals 32(1) to 32(4).

When the switch Sd of the pattern switch 31c is pushed, the pattern switch 31c transmits an operation signal OPon to the transfer controller 30. After referring to the pattern table stored in the data memory 23, the transfer controller 30 sequentially transmits signals $CN_{L1}$ to $CN_{L4}$—representing the respective preset target dimmer levels—to the respective dimmer terminals 32(1) to 32(4) which are assigned the simultaneous control address corresponding to the individual address of the pattern switch 31c that has transmitted the signal OPon, by means of the transfer signal which handles individual addresses as address data. Next, the transfer controller 30 sequentially transmits the ON signal CNon for activating the illumination loads at a dimmer level of 0%, by means of the same transfer signal which handles individual addresses as address data. The target dimmer levels received by the respective dimmer terminals 32(1) to 32(4) are stored in memory. At a point in time when the dimmer terminals 32(1) to 32(4) receive the ON signal, the dimmer terminals activate the illumination loads at a dimmer level of 0%.

Subsequently, the transfer controller 30 transmits the fade start signal CNfe including a fade time (of six seconds) to the respective dimmer terminals 32(1) to 32(4), by means of the transfer signal which handles the simultaneous control address as address data. As a result, the respective dimmer terminals 32(1) to 32(4) can receive the fade start signal CNfe substantially simultaneously. Upon receipt of the fade start signal CNfe, the dimmer terminals 32(1) to 32(4) each calculate the rate of dimming required for increasing the intensity of the illumination load to the respective target dimmer level within six seconds from a dimmer level of 0%, and increase the intensity of the illumination loads according to the calculated rate of dimming (i.e., the fade-in operation). Simultaneous with transmission of the fade start signal CNfe, the transfer controller 30 starts counting the fade time. At a point in time when the transfer controller 30 has finished counting the fade time, the OFF signal CNoff for deactivating the illumination loads is transmitted to the dimmer terminal 32(4) whose target dimmer level is set to 0%. The dimmer terminal 32(4) that has received the OFF signal CNoff deactivates the illumination load.

As mentioned above, through the pushing action of the switch Sd of the pattern switch 31c, each of the corresponding dimmer terminals 32(1) to 32(4) calculate the rate of dimming from the target dimmer levels and the fade time. Upon receipt, from the transfer controller 30, of the fade start signal CNfe which handles the address data as a simultaneous control address, the dimmer terminals 32(1) to 32(4) gradually change the intensity of the illumination loads in unison to their respective target dimmer levels. As a result of simultaneously changing of the intensity of the illumination loads to be subjected to pattern control, natural pattern control can be effected. Further, gradual change in the intensity of light enables mitigation of a burden exerted on the eyes due to dazzle and enables elaborate control of illumination according to the environment.

The user may desire to gradually change the dimmer level of the illumination load in a certain location but to quickly change the dimmer level of the illumination load placed in another location. To this end, the fade time can be arbitrarily set from one illumination load to another, thereby enabling elaborate control of illumination according to the environment.

FIG. 22 shows one example of a data table stored in the data memory 23. Group numbers G1 to Gn are assigned to the areas A1 to A3 and the sections B1 to B35 of FIG. 21, respectively. Numbers corresponding to the plurality of luminaires belonging to the groups assigned the group numbers are registered in the column labeled "Circuit." The numerals such as "1," "2," or like numerals registered in the column "Circuit" correspond to the addresses of the control terminals 32 for controlling the illumination loads. The column entitled "Display Attribute" represents a display method employed by the indication lamp of the operation terminal 31 and the display terminal. In the present embodiment, the display method can be selectively switched according to the groups, and the thus-switched display method can be stored in the data memory 23. For example, as shown in FIG. 22, the operation status display method is selected for the groups G1 and G2, and the monitored state display method is selected for the group G3. The thus-selected methods are set in the data table.

Fourth Embodiment

Figure 21:
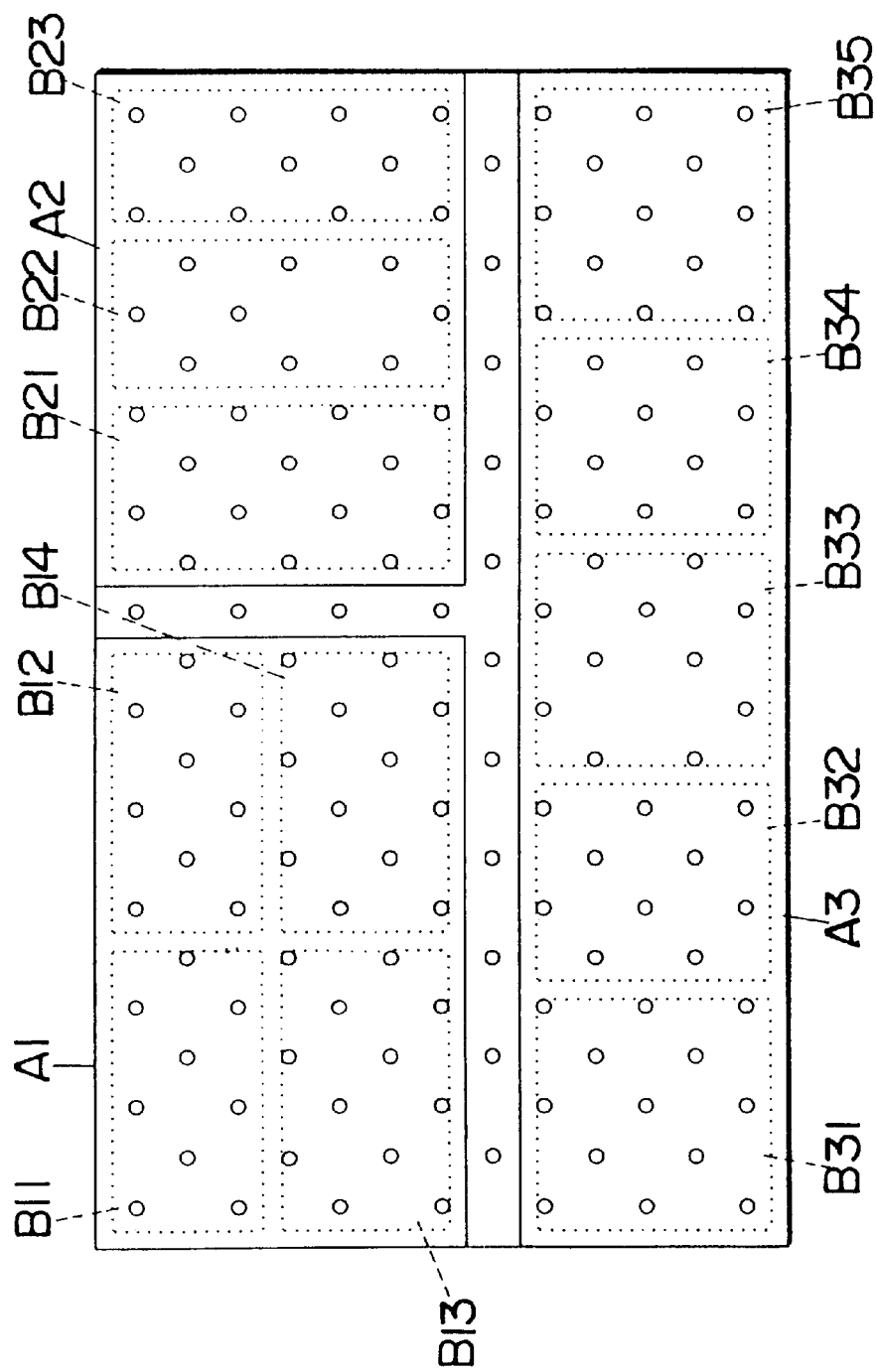
FIG. 21 is a descriptive view showing the control procedures according to which the remote supervisory control system shown in FIG. 2 operates.

As shown in FIG. 21, a plurality of luminaires (indicated by O) are mounted on the ceiling of a story in an office building. The story is divided into a plurality of sections (corresponding to spaces assigned to departments and sections of a corporation and a shared spaced such as a corridor). A plurality of illumination loads (or luminaires) provided in each section are controlled in a grouped manner. The living space of the story exclusive of the corridor is roughly divided into three areas A1 to A3. The areas A1 to A3 are further divided into a plurality of sections; namely, the area A1 is divided into four sections B11 to B14; the area A2 is divided into three sections B21 to B23; and the area A3 is divided into five sections B31 to B35.

FIG. 22 shows one example of a data table stored in the data memory 23. Group numbers G1 to Gn are assigned to the areas A1 to A3 and the sections B11 to B35, respectively. Numbers corresponding to the plurality of luminaires belonging to the groups assigned the group numbers are registered in box "Object Circuit." The numerals such as "1," "2," or like numerals registered in the column "Object Circuit" correspond to the addresses of the control terminals 32 for controlling the illumination loads. The column entitled "Display Attribute" represents a display method employed by the indication lamp of the operation terminal 31 and the display terminal. In the present embodiment, the display method can be selectively switched according to the groups, and the thus-switched display method can be stored in the data memory 23. For example, as shown in FIG. 22, the operation status display method is selected for the groups G1 and G2, and the monitored state display method is selected for the group G3. The thus-selected methods are set in the data table.

The switches Sa to Sc of each of the operation terminals 31 are associated with the respective groups G1 to Gn. When one of the switches Sa to Sc is actuated, the transfer controller 30 refers to the data table registered in the data memory 23. In order to illuminate or extinguish the illumination loads associated with the group numbers G1 to Gn, the transfer controller 30 transmits control data to the control terminal 32. So long as the status of the illumination loads is returned to the transfer controller 30 from the control terminals 32, the transfer controller 30 refers to the data table stored in the data memory 23. According to the display method corresponding to the display attribute of the group, the transfer controller 30 sends data for instructing illumination/extinction to the operation terminals 31 and the display terminal. As a result, the indication lamps of the respective operation terminals 31 and the indication lamp of the display terminal display the status of the illumination loads according to the display methods.

The conventional remote supervisory control system can set the display method to either the operation status display method or the monitored status display method. However, according to the present embodiment, the display method can be selectively changed in units comprising a plurality of groups in a single system and stored in the data memory 23 of the transfer controller 30. As a result, the display method can be selected according to the object of use of the switches Sa to Sc of each of the operation terminals 31. In the foregoing example, a group of luminaires, such as those in section B11, are locally illuminated or extinguished. In this case, the operation status display method is employed. For areas A1 to A3 which must be intensively monitored in connection with unextinguished illumination luminaires 33 at the center monitoring room, the monitored status display method can be employed. Since a display method can be selected according to the purpose of use within a single system, the remote supervisory control system has an advantage of simplification of a system configuration. If the same areas A1 to A3 and the section B11 are monitored and controlled by means of pattern control, two circuits; i.e., a circuit for activating the illumination loads and a circuit for deactivating the illumination loads, are required. In contrast, if the monitored status display method such as that described in connection with the first embodiment is employed, the method may be implemented in the form of a single circuit, thus minimizing the number of circuits to be controlled.

Various setting operations, such as the assignment of the group number G1 to Gn and the setting of a display attribute, are performed by the setting device 40. More specifically, the setting device 40 is connected to the signal line Ls, and setting data (such as data pertaining to the assignment group numbers G1 to Gn and setting of a display attribute) are prepared. The thus-prepared setting data are transmitted to the transfer controller 30 by way of the signal line Ls. Upon receipt of the setting data, the transfer controller 30 registers the setting data into the data table stored in the data memory 23. Alternatively, the setting operations may be performed by use of a so-called selector switch having the function of an operation terminal. Further, data may be directly checked or set in the transfer controller 30 by means of a personal computer without use of the signal line Ls. Under any of the methods, setting and checking of the data can be effected in the field, and hence the method can be flexibly subjected to a change in system configuration after construction. Further, the display method can be set and checked by use of the setting device 40 or a selector switch. Therefore, the user can readily set the display method. In conjunction with setting of circuits of the operation terminals 31 which are subjected to pattern and group control operations, the user can also freely assign the display method, thus enabling the setting of the display method.

Fifth Embodiment

The remote supervisory control system according to the fifth embodiment is substantially identical in structure to the remote supervisory control system according to the fourth embodiment, and hence identical portions are omitted from the drawings and explanations. An explanation will be given of only a configuration and operation characterizing the second embodiment.

The fifth embodiment is characterized by that the ON-prioritized control method and the later-operation-prioritized control method, both of which are described in connection with the prior art, can be set in the data memory 23 of the transfer controller 30 for each group.

FIG. 23 shows one example of a data table stored in the data memory 23. In this embodiment also, group numbers G1 to Gn are assigned to the areas A1 to A3 and the sections B11 to B35 shown in FIG. 21, respectively. One of the columns set for the group numbers G1 to G35 is entitled "Control Attribute." A control method can be selectively switched between the ON-prioritized control method and the later-operation-prioritized control method, for each group. For example, as shown in FIG. 23, the ON-prioritized control method is selected for the G1 and G2 groups, and the later-operation-prioritized control method is selected for the group G3. The thus-selected control methods are set in the data table.

As shown in FIG. 24 (A), areas of group numbers G1 and G2 are set for the ON-prioritized control method, and the area of group number G3 is set for the later-operation-prioritized control method. When a switch associated with group number G1 is actuated while all the illumination loads are illuminated (illumination is depicted by O), the illumination loads provided in the area of group G1 are extinguished (extinction is depicted by x). However, the illumination loads located in an overlap between the area of group G1 and the area of group G2 are excluded from the objects of deactivation and remain illuminated. Although all the illumination loads provided in the area of group G1 are included in the area of group G3, the group G3 is set to the later-operation-prioritized control method. Hence, the illumination loads provided in the area of group G1 can be extinguished by actuation of a switch associated with group G1 which is set to the ON-prioritized control method. Further, as shown in FIG. 24(B), a switch associated with group G3 is actuated while all the illumination loads are illuminated, and illumination loads belonging to group numbers G1 and G2 are extinguished regardless of the state of the illumination loads, because group G3 is set to the later-operation-prioritized control method.

In the conventional remote supervisory control system, the control method can be set to either the ON-prioritized control method or the later-operation-prioritized control method. However, according to the present embodiment, the control method can be selectively changed in units comprising a plurality of groups within a single system and stored in the data memory 23 of the transfer controller 30. As a result, the control method can be selected according to the object of use of the switches S1 to S3 of each of the operation terminals 31. In the foregoing example, a group of luminaires, such as those in section B11, are locally illuminated or extinguished. In this case, the ON-prioritized method is adopted. The later-operation-prioritized control method can be employed for areas A1 to A3, which must be intensively monitored at the center monitoring room, in terms of unextinguished illumination luminaires 33. Since the control method can be selected according to the purpose of use within a single system, the remote supervisory control system has an advantage of simplifying system configuration.

In the second embodiment, only the illumination loads associated with a plurality of switches which are set to the ON-prioritized control method (in the above example, the illumination loads registered in the overlap between the area of group number G1 and the area of group number G2) are excluded from the deactivating action of another switch. Therefore, ON-prioritized function becomes effective only in the overlap between groups (G1 and G2). Illumination loads belonging to another group (G3) which is not set to the ON-prioritized control method are not excluded from the deactivating action of another switch. Accordingly, no problems arise, even if individual illumination loads desired to be subjected to ON-prioritized control belong to another later-operation-prioritized control group. As a result, a dummy control terminal such as that described in connection with the prior art is not required to be provided in each of the groups.

Assignment of group numbers G1 . . . Gn and various setting operations such as setting of a display attribute are performed by use of the setting device 40. Alternatively, the setting operations may be performed by use of a so-called selector switch having the function of an operation terminal. Further, data may be directly checked or set in the transfer controller 30 by means of a personal computer, without use of the signal line Ls. Under any of the methods, setting and checking of the data can be effected in the field, and hence the method can be flexibly adapted to a change in the system configuration after construction. Further, the display method can be set and checked by use of the setting device 40 or the selector switch. Therefore, the user can readily set the display method. In conjunction with setting of circuits of the operation terminals 31 which are subjected to group control, the user can also freely assign the display method, thus enabling the setting of the display according to actual use.

The selection and setting of a control attribute according to the fifth embodiment may be carried out in combination with the selection and setting of a display method described in connection with the fourth embodiment. For example, local operation groups (G1 and G2) are assigned the later-operation-prioritized control method and the operation status display method. Loads placed in an overlap between local groups are assigned the ON-prioritized control method and the operation status-display method. A group (G3) including loads whose operation states are monitored by the center is assigned the later-operation-prioritized control method and the monitored status display method. As a result, the convenience of the remote supervisory control system can be improved greatly.

Sixth Embodiment

In the present embodiment, a plurality of simultaneous control addresses are assigned to one dimmer terminal 32. In the conventional remote supervisory control system, an address is stored as data comprising several words. Accordingly, Creating a terminal which is assigned a plurality of addresses requires memory whose capacity is at least an integral multiple of the number of addresses, which in turn renders the terminal large and adds to cost. Further, setting of an address consumes much time. For example, provided that setting of one address involves 8 bits of data, if physical addresses are 00H to FFH, setting of 256 addresses involves 2048 bits of data. Further, in a case where a plurality of addresses (N addresses) are assigned to a terminal and the addresses are associated with circuits (1) to (N), respectively, the following control as shown in FIG. 6 will be required. Specifically, upon receipt of a transfer signal, the terminal determines whether or not the address data included in the transfer signal match the address of the circuit (1). Only when a match exists between the addresses, processing to be executed at the time of address matching is performed. If no match exists between the addresses, a determination is made as to whether or not the address data and the address of the circuit (2) match. Only when a match exists, processing to be executed at the time of address matching is performed. If no match exists, a determination is made as to whether or not a match exists between the address data and the address of circuit (N). Only when a match exists, processing to be executed at the time of address matching is performed. A maximum of N determination are made. Since a determination as to address matching consumes much time, the transfer rate must be decreased or the number of circuits must be reduced.

To solve this type of problem, the dimmer terminal 32 is provided with address setting memory M, wherein the position of each bit is associated with a single address, as shown in FIG. 25. An address flag is set in any of the bit positions of the address setting memory M, and the address corresponding to the bit position is taken as the address of the dimmer terminal 32. FIG. 25 shows 32×8 bit map memory. Respective bits in the first row are associated with OOH-1FH in order from the left; respective bits in the second row are associated with 20H-3FH in order from the left; respective bits in the third row are associated with 40H-5FH in order from the left; respective bits in the fourth row are associated with 60H-7FH in order from the left; respective bits in the fifth row are associated with 80H-9FH in order from the left; respective bits in the sixth row are associated with A0H-BFH in order from the left; respective bits in the seventh row are associated with C0H-DFT in order from the left; and respective bits in the eighth row are associated with E0H-FFH in order from the left. In the example shown in FIG. 25, presence or absence of an address flag is determined on the basis of whether each bit is 0 or 1. Address flags are set in 03H and 04H (bit data at the bit positions corresponding to 03H and 04H assume a value of 1). More specifically, 256 addresses can be set through use of 256 bits of data. The amount of data required by the system according to the present invention can be reduced to one-eighth the amount of data required by the conventional system; that is, the amount of data can be reduced from 2048 bits to 256 bits. Accordingly, the memory capacity can be reduced, which in turn results in cost reduction. Further, the amount of data required for setting an address can be reduced, and hence the time consumed for setting an address can be shortened.

As mentioned above, an address is set in a bit map format. In order to determine a match between addresses, the terminal processing section 10 is provided with means for calculating a bit map address (a bit position corresponding to address data included in the received transfer signal) from the address data. When the bit position on the bit map corresponding to the address data is 1 (i.e., when an address flag is set), processing to be executed at the time of address matching is performed. In contrast, if the bit position is 0, there can be performed an operation for receiving the next transfer signal. Regardless of the number of preset addresses, a determination as to a match between addresses can be completed through a single operation. An inexpensive low-speed device having a plurality of addresses may be used for the terminal processing section 10. The number of circuits is prevented from being limited by a transfer rate, and a transfer rate can be increased inexpensively.

Seventh Embodiment

Figure 26:
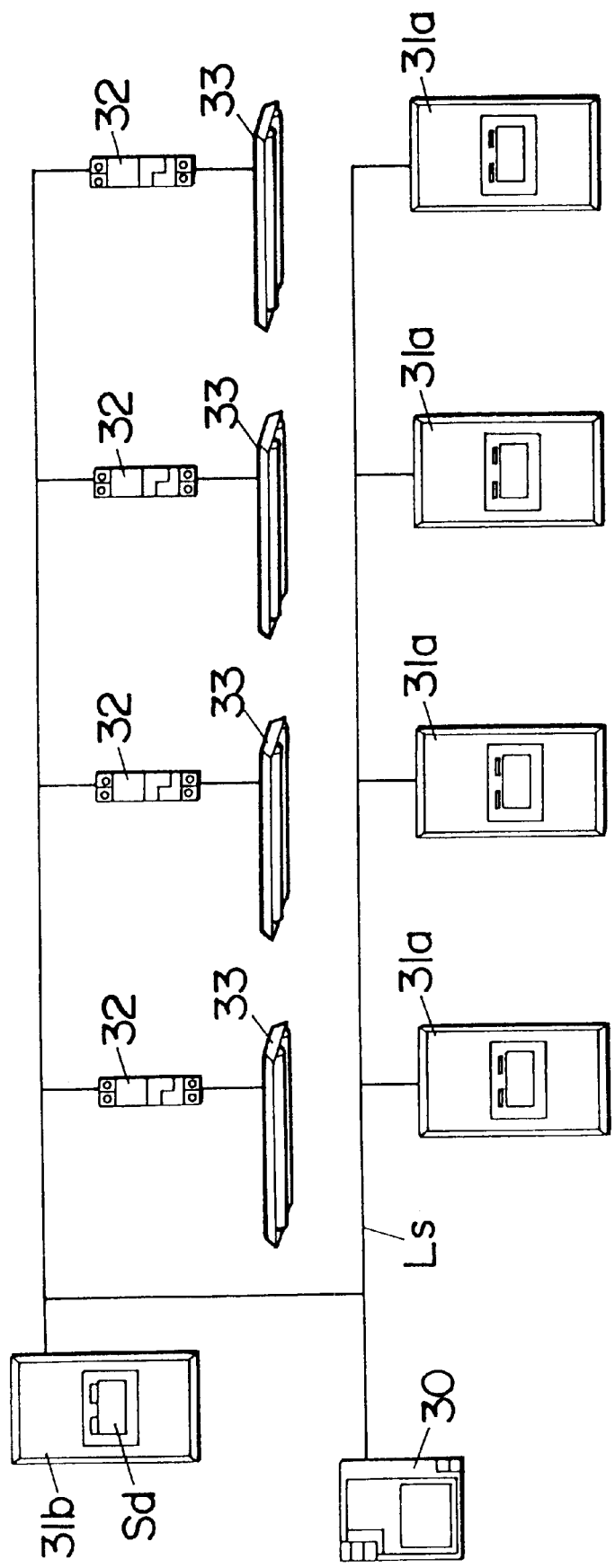
FIG. 26 is a descriptive view showing a seventh embodiment of the present invention.
Figure 27:
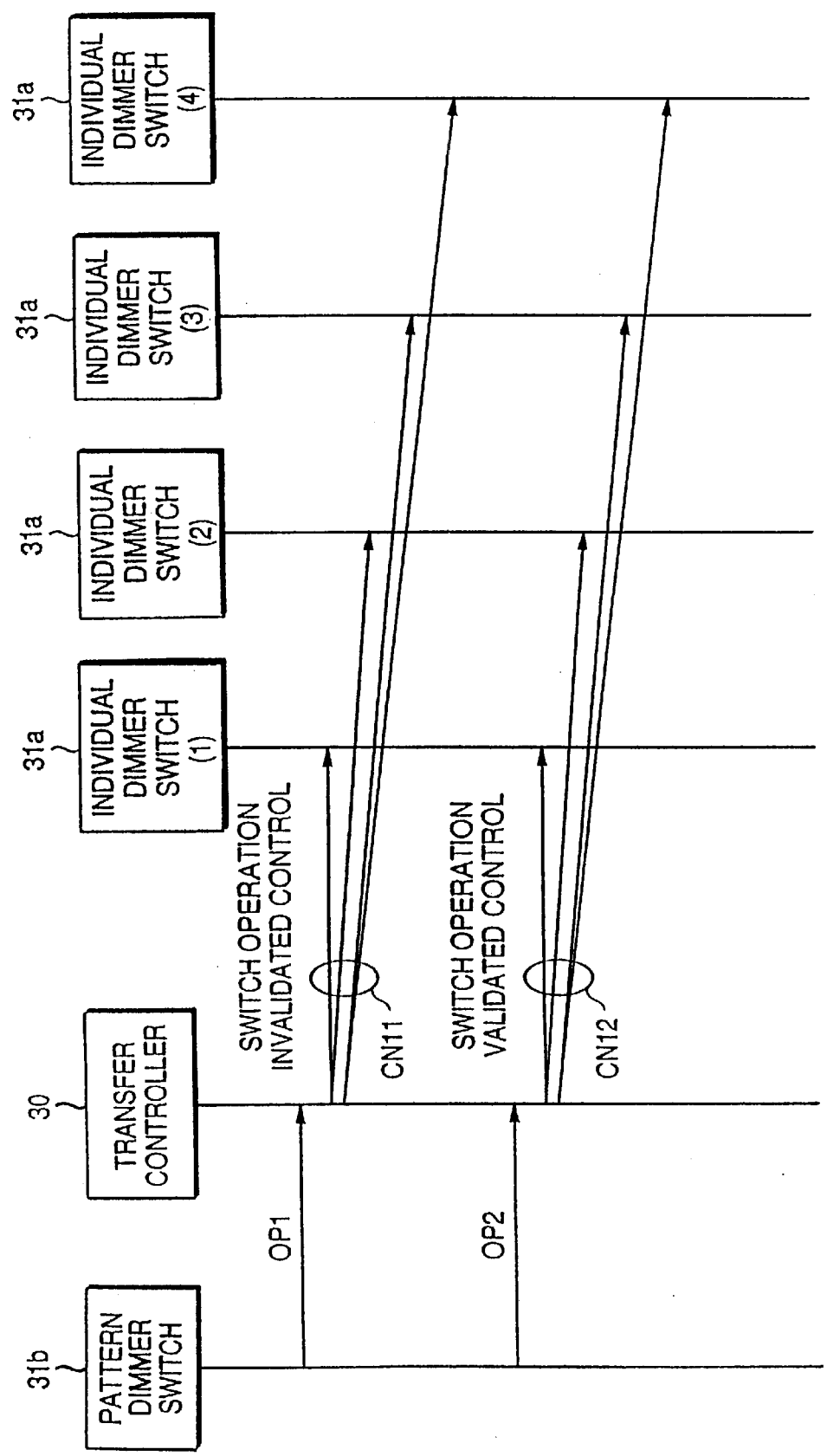
FIG. 27 is a descriptive view showing an operation proceeding in FIG. 26.

A remote supervisory control system according to a seventh embodiment (see FIGS. 26 and 27) is essentially identical in configuration with that according to the sixth embodiment. An explanation will be given of only a difference between the remote supervisory control systems.

According to the third embodiment, a pattern dimmer switch 31b is associated with individual dimmer switches 31a(1) to 31a(4), and the same simultaneous control address is assigned to the individual dimmer switches 31a(1) to 31a(4). When the switch Sd of the pattern dimmer switch 31b is pushed, an operation signal OP1 for prohibiting actuation of a switch is transmitted to the transfer controller 30 from the pattern dimmer switch 31b. The transfer controller 30 transmits through the signal line Ls a control signal CN11 (transfer signal) which includes a simultaneous control address common to the individual dimmer switches 31a(1) to 31a(4) and contains data for prohibiting interruption associated with actuation of the switch Sd. The individual dimmer switches 31a(1) to 3a(4) receive the control signal CN11 substantially simultaneously. Subsequently, even if the switch Se is pressed, the illumination loads are not controlled.

Subsequently, the switch Sd of the pattern dimmer switch 31b is pushed again, so that an operation signal OP2 representing that the actuation of the switch is effective is transmitted to the transfer controller 30 from the pattern dimmer switch 31b. The transfer controller 30 sends to the signal line Ls a control signal CN12 (transfer signal) which includes a simultaneous control address common to the individual dimmer switches 31a(1) to 31a(4) and which makes valid an interrupt associated with actuation of the switch Se. The individual dimmer switches 31a(1) to 31a(4) receive the control signal CN12 substantially simultaneously and thereafter can control the illumination loads by actuation of the switch Sd. Specifically, the pattern dimmer switch 31b according to the third embodiment is provided for locking (prohibiting) the actuation of the other individual dimmer switches 31a(1) to 31a(4). By pushing only the switch Sd of the pattern dimmer switch 31b, the individual dimmer switches 31a(1) to 31a(4) are prohibited from controlling the illumination loads.

Eighth Embodiment

A remote supervisory control system according to an eighth embodiment is substantially identical in configuration to that according to the six embodiment. An explanation will be given of only a difference between the remote supervisory control systems. In the fourth embodiment, a ventilation fan L is connected as a load to the control terminal 32.

Figure 28:
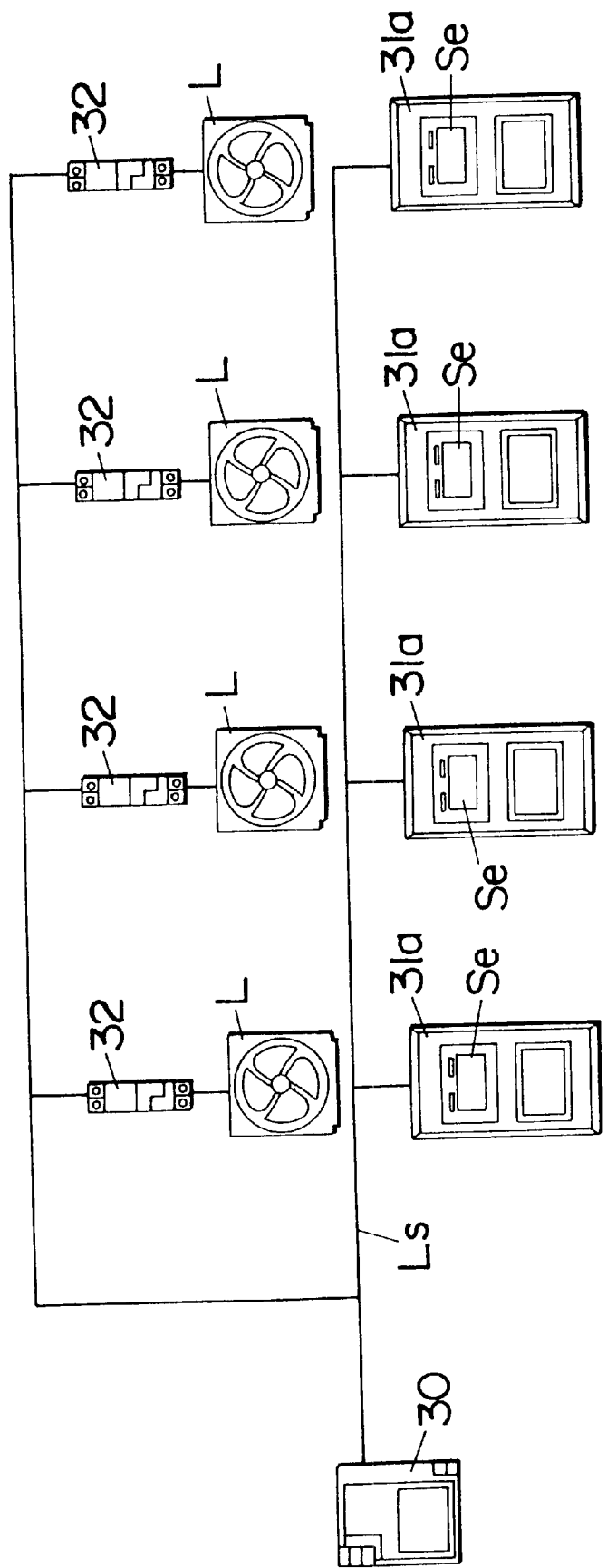
FIG. 28 is a descriptive view showing an eighth embodiment of the present invention.
Figure 29:
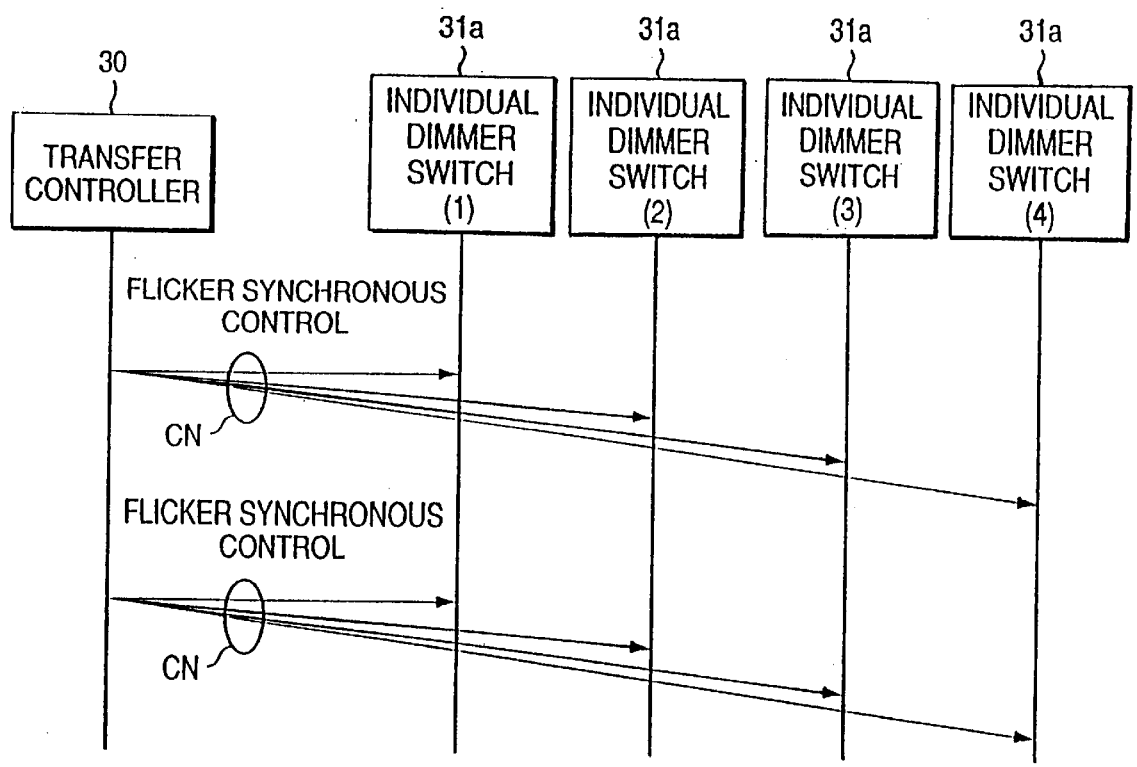
FIG. 29 is a descriptive view showing an operation proceeding in FIG. 28.

In the fourth embodiment, a common simultaneous control address is assigned to individual dimmer switches 31a(1) to 31a(4) shown in FIG. 28. As shown in FIG. 29, a transfer controller 30 uses a control signal CN including the simultaneous address as a synchronous signal for use with operation display lamps of the individual dimmer switches 31a(1) to 31a(4). According to the fourth embodiment, the operation display lamps can flicker at the same cycle, and hence the operation (activation) status of the load L can be checked (perceived).

Ninth Embodiments

Figure 31:
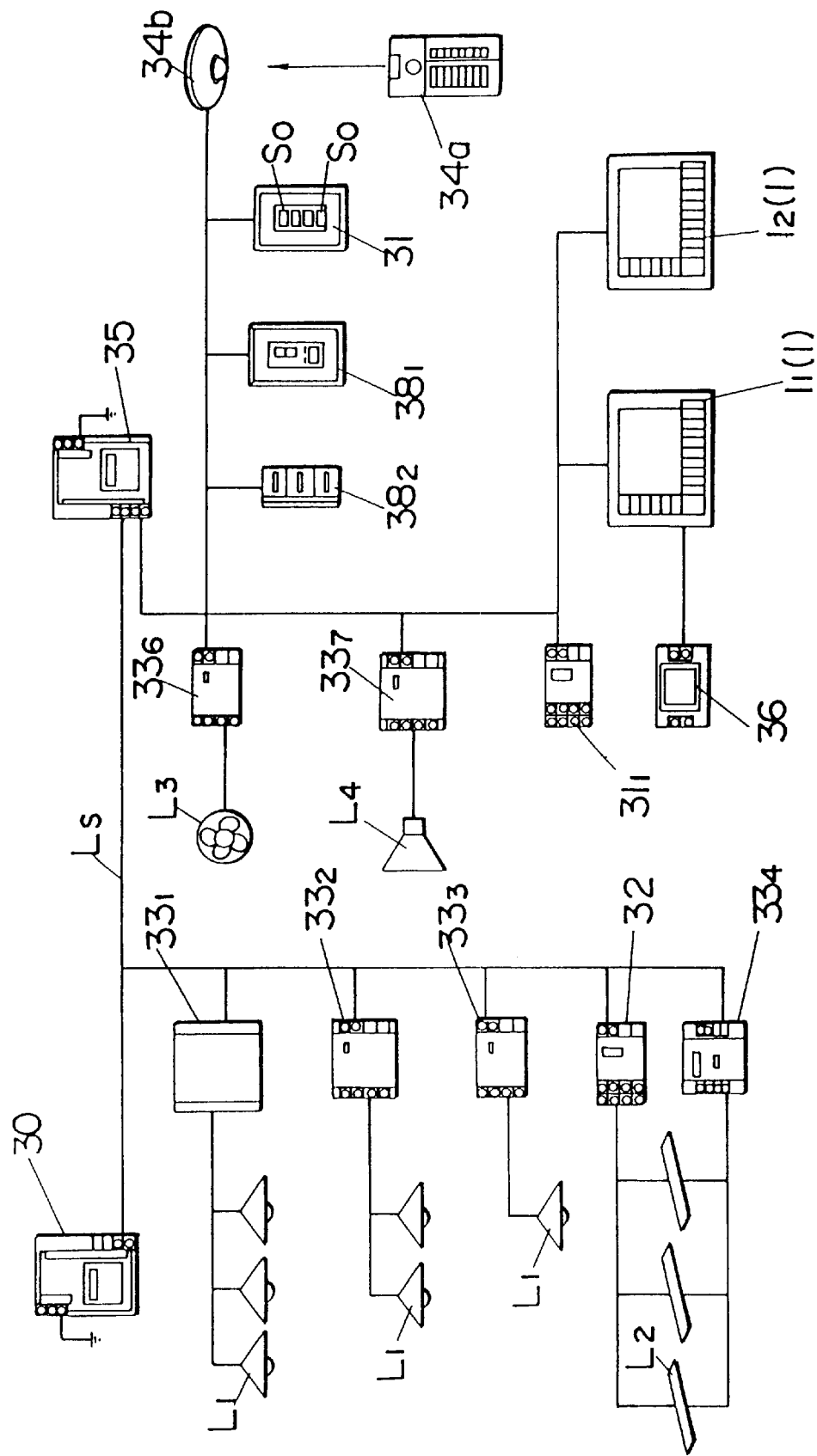
FIG. 31 is a block diagram showing an example of configuration of the remote supervisory control system.

FIG. 31 shows an example configuration of a remote supervisory control system according to a ninth embodiment of the present invention.

Throughout the specification, "up," "down," "right," "left," "front," "back," and like expressions are used herein to designate constituent elements of the present invention when they are oriented in the direction in which they are intended to be used. The illustrated remote supervisory control system primarily differs in configuration from a remote supervisory control system described in the first to eighth embodiments in that the system comprises setting operation terminals $1_1$ and $1_2$. However, the systems are identical in that addresses of operation terminals and addresses of control terminals are arranged so as to correspond to one another and that a correspondence table defining the correspondence is registered in a transfer controller 30. The correspondence table representing the correspondence between addresses is set in the transfer controller 30 through use of the setting operation terminal 1. If the addresses of the operation terminals and the addresses of the control terminals, which correspond to one another, are set to identical values, the correspondence between the addresses can be readily understood. In this sense, the concept of "channel" is used to designate an address. The address of the operation terminal and the address of the control terminal, which correspond to each other in a one-to-one relationship, are set to the same channel. In one channel (address), four loads L can be controlled by designation of a load number. For example, "0" channel enables control of four loads L assigned load numbers "1" to "4." The load L assigned load number "1" of channel "0" is expressed by "0–1." Thus, the channel and the load number, both being thus set, are used in a pair, whereby the operation terminal and the control terminal can be arranged so as to correspond to each other.

In the present invention, the remote supervisory control system comprises incandescent lamps $L_1$; fluorescent lamps $L_2$, each having an inverter lighting device; a fan coil $L_3$ of an air conditioner; and a speaker $L_4$. The incandescent lamps $L_1$ are controlled by means of dimmer control terminals $33_1$, to $33_3$ (1500 W, 800 W, and 500 W) whose capacities correspond to the number of lamps. The fluorescent lamps $L_2$ are controlled by a control terminal 32 having a relay for controlling illumination and extinction and by a dimmer control terminal $33_4$ for controlling a light output. The dimmer control terminal $33_4$ delivers 0-volt to 10-volt voltage signals to the lighting devices, and the lighting devices change the intensity of light emitted from the fluorescent lamps $L_2$ by means of the voltage signals. A control terminal $33_6$ for use with a fan coil controls the speed of operation of the fan coil $L_3$ in three steps. The volume of the speaker $L_4$ is controlled by a control terminal $33_7$ for volume control purpose. Other electrically-powered appliances, such as a powered curtain, a powered screen, and a ventilation fan, may be connected as other loads to the remote supervisory control system.

The remote supervisory control system comprises, as operation terminals, a control terminal 31 having a switch So identical in configuration to the switch in the first to eighth embodiments; dimmer operation terminals $38_1$ and $38_2$; and an operation terminal (one type of monitoring terminal) $31_1$ for contact input use which permits connection of various sensors for producing contact outputs. An operation terminal may be constructed even by providing an operation section with a wireless transmitter 34*a* and using the wireless transmitter 34*a* in combination with a wireless receiver 34*b*. The two dimmer operation terminals $38_1$ and $38_2$ essentially differ from each other in terms of the dimensions and structure of an operation section. The dimmer operation terminal $38_1$ comprises a comparatively small push-button handle, and the dimmer operation terminal $38_2$ comprises a comparatively large piano-handle-type handle whose one side is pivotally supported. The dimmer operation terminals $38_1$ and $38_2$ are identical in basic operation. As shown in the drawing, in order to extend a signal line Ls, a relay (amplifier) 35 is connected to the signal line Ls, to thereby enable transmission of a transfer signal without involving attenuation. In the illustrated example, two setting operation terminals $1_1$ and $1_2$ are connected to the relay 35. The setting operation terminal $1_1$ provides a color display, and the setting operation terminal $1_2$ provides a monochrome display. The color display setting operation terminal $1_1$ is supplied with 24-volt ac power from a remote control transformer (which will be described later) 36. The color display and the monochrome display are almost the same in terms of substantial functions, and hence both the operation terminals $1_1$ and $1_2$ are referred to as "setting operation terminals 1" without drawing a distinction between them.

Procedures for setting correspondence data will now be described. The setting procedures can be divided into three phases: a pre-processing phase during which transmission of correspondence data is commenced; a transmission processing phase during which correspondence data are actually transmitted; and a post-processing phase during which transmission of the correspondence data is completed. Upon starting operations, the transfer controller 30 sets its transmission status to "NO TRANSMISSION" representing that corresponding data are not transmitted. In other words, the transfer controller 30 enters the same operation mode as that of the conventional transfer controller in which the loads L are controlled. Unless an interrupt signal is generated, a determination is made as to whether or not data transmission is being carried out. If data transmission is not being carried out, the transfer controller 30 performs a full-time polling operation, wherein a transfer signal of dummy mode is repeatedly produced.

In the pre-processing phase, if an attempt is made to transmit correspondence data to the transfer controller 30, the terminal generates an interrupt signal. Hence, the interrupt signal is detected. Upon detection of the interrupt signal, the transfer controller 30 specifies the terminal that has issued the interrupt signal and determines the interrupt request. This processing is the same as that performed when the loads L are controlled. At the time of transmission of correspondence data, the setting operation terminal 1 sends a data transfer request to the transfer controller 30. In order to represent that correspondence data are being transmitted, the transmission status of the transfer controller 30 is set to "TRANSMISSION IN PROGRESS." If no data transfer request is sent from the setting operation terminal 1, this indicates ordinary control of the loads L, and hence the transfer controller 30 controls the loads L according to the request.

Signals are exchanged between the transfer controller 30 and the setting operation terminal 1 in the following manner. More specifically, the setting operation terminal 1 issues an interrupt signal. In response to this interrupt signal, the transfer controller 30 sets an interrupt flag so as to perform an interruption polling operation and wait for a return of the address of the setting operation terminal 1. Upon receipt of the address of the setting operation terminal 1, the transfer controller 30 monitors a request from the setting operation terminal 1. In response to the monitoring of a request by the transfer controller 30, the setting operation terminal 1 makes a request to the transfer controller 30 for receiving correspondence data. Upon receipt of the request, the transfer controller 30 clears the interrupt flag. Further, in order to enable exchange of correspondence data, the transfer controller 30 ensures 256 bytes of address region for storing the correspondence data. 256 bytes are taken as a unit and called one page; therefore, one page of address region is ensured. When one page of address region is ensured in this way, the address region ensured for registration of correspondence data is reported to the setting operation terminal 1, and the setting operation terminal 1 is requested to start transmitting correspondence data. After having made the request to the setting operation terminal 1 for transmitting correspondence data, the transfer controller 30 monitors the state of transmission of correspondence data from the setting operation terminal 1. When a notice that transmission of correspondence data is possible (i.e., a notice of "TRANSMISSION IN PROGRESS")is returned from the setting operation terminal 1, the transfer controller 30 enters the transmission processing phase.

During the transmission processing phase, the setting operation terminal 1 transmits correspondence data to the transfer controller 30. If the correspondence data are too large in volume to be sent through one transmission, only a portion of the correspondence data is transmitted. If the transfer of the correspondence data has not yet been completed, the setting operation terminal 1 again issues an interrupt signal so as to repeat the foregoing processing operations, thereby continuing the transmission of the correspondence data.

More specifically, the transfer controller 30 monitors the volume of the correspondence data transmitted from the setting operation terminal 1 and causes the setting operation terminal 1 to return a byte counter signal. Subsequently, the transfer controller 30 monitors the correspondence data and causes the setting operation terminal 1 to transmit correspondence data in the number of bytes specified by the byte counter signal. Here, not all the correspondence data are transmitted at one time, but the correspondence data are divided into a plurality of data segments. Transmission of the correspondence data from the setting operation terminal 1 to the transfer controller 3 is repeated until transmission of correspondence data in the number of bytes specified by the byte counter signal is completed. Finally, the transfer controller 30 requests the setting operation terminal 1 to send a checksum pertaining to the correspondence data. Upon receipt of the checksum, the transfer controller 30 determines whether or not transmission errors have occurred. The correspondence data comprise pattern numbers used for distinguishing patterns to be subjected to pattern control, or group numbers used for distinguishing groups to be subjected to group control; the address of the load L to be controlled; and the nature of control. According to the contents of the correspondence data which are transmitted to the transfer controller 30 from the setting operation terminal 1 while being divided, the correspondence table pertaining to pattern control or group control is registered in the transfer controller 30.

A post-processing operation is an operation for setting the transmission status of the transfer controller 30 to "NO TRANSMISSION." After completion of setting of the correspondence data, the transfer controller 30 monitors the state of transfer of the setting operation terminal 1 and ascertains completion of data transmission. Subsequently, a data transmission completion instruction is sent, to thereby inform the setting operation terminal 1 of completion of all the processing operations pertaining to transmission of the correspondence data.

Under such procedures, during an idle time in which the load L can be controlled and control data for the load L have not yet been generated, the correspondence data for pattern or group control purposes can be transmitted to the transfer controller 30 from the setting operation terminal 1.

As mentioned above, in the embodiment, the correspondence data are transmitted at different times to the transfer controller 30 from the setting operation terminal 1 while being separated into segments. The reason for this is that transmitting correspondence data of the same volume at one time requires a longer transmission time, thereby raising the possibility of occurrence of a period of time during which the load L cannot be controlled. So long as the correspondence data are transmitted while remaining in a divided state by utilization of an idle time which is not used for controlling the load L, the correspondence data can be transmitted without introducing a period of time during which the load L cannot be controlled. In order to transmit the correspondence data while they are in a divided state, the transfer controller 30 retains data pertaining to a transmission status. By means of data representing "TRANSMISSION IN PROGRESS" and data representing "NO TRANSMISSION," the transfer controller 30 can ascertain whether or not untransmitted correspondence data segments still remain. Consequently, if the transfer controller 30 is requested to control the load L during the period in which the transmission status is "TRANSMISSION IN PROGRESS," the transfer controller 30 controls the load L in preference to transmission of correspondence data. After completion of control of the load L, the transmission of the correspondence data is resumed, thereby enabling transmission of correspondence data without impeding control of the load L.

Figure 30:
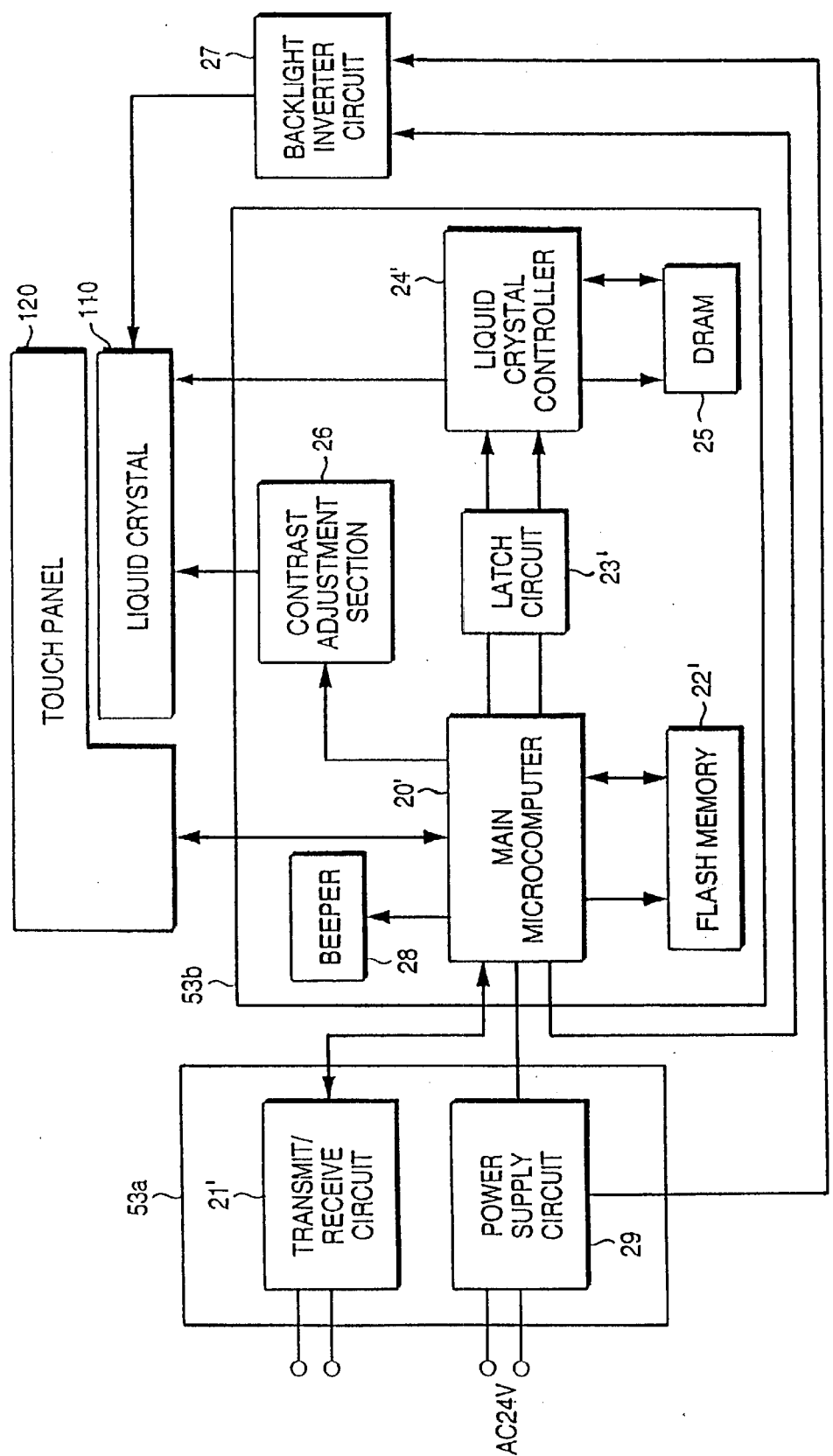
FIG. 30 is a block diagram showing a setting operation terminal used in a remote supervisory control system according to an embodiment of the present invention.

Next, the configuration of the setting operation terminal 1 will be described. As shown in FIG. 30, the setting operation terminal 1 comprises a liquid crystal section 110 which is formed into a single piece from a liquid crystal display and a backlight attached to the liquid crystal display; and a transparent touch panel 120 which is superimposed on the screen of the liquid crystal section 110. A liquid crystal display comprising a matrix of pixels is used for the liquid crystal section 110, wherein graphics are displayed by combination of pixels. The touch panel 120 comprises a transparent sheet member and a plurality of contacts which are formed from transparent electrodes and are arranged on the sheet member. The touch panel 120 is of a resistance-pressure-sensitive type and outputs a location where a finger or like member touches the sheet member.

The setting operation terminal 1 comprises a transmit/receive circuit 21' which is connected to the signal line Ls connected to the transfer controller 30 and which exchanges a transfer signal. The transmit/receive circuit 21' is connected to a main microcomputer 20' shared between a transmission processing section and a control section. The main microcomputer 20' operates according to a program and data, both of which are written in flash memory 22'. Function data for determining addresses and functions of terminals are written into at least a portion of the flash memory 22'. Further, data available for the remote supervisory control system, such as various messages and symbols, are also stored in the flash memory 22'.

The main microcomputer 20' transfers to a liquid crystal controller 24' data for instructing the contents of a display on the liquid crystal section 110, by way of a latch circuit 23'. Through use of data registered in DRAM 25 in advance, the liquid crystal controller 24' indicates predetermined information at a predetermined location of the liquid crystal section 110. As will be described later, the contents of the DRAM 25 can be set by the user. Specifically, the user can set contents through use of the touch panel 120 by setting the main microcomputer 20' to a setting mode, and the thus-set contents are stored in the DRAM 25. The main microcomputer 20' is set to an operation mode, and the touch panel 120 is operated, whereby information to be displayed on the liquid crystal section 110 is set through use of the data stored in the DRAM 25. The contrast of the liquid crystal section 110 and the brightness of the backlight are adjusted by controlling a contrast adjustment section 26 and a backlight inverter circuit 27, by way of the main microcomputer 20'. Further, a beeper 28 is connected to the main microcomputer 20'. In the event that the user touches a predetermined region of the touch panel 120 or performs a faulty operation, the beeper 28 is activated, to thereby inform the user of acceptance of an input or a faulty operation. Desirably, different sounds are set for a faulty operation and acceptance of an input, respectively.

The setting operation terminal 1 comprises a backlight and hence requires comparatively high power. For this reason, internal power of the setting operation terminal 1 is not supplied from the signal line Ls, and the setting operation terminal 1 is supplied with AC 24V which is rectified and stabilized by a power supply circuit 29. The AC 24V supplied to the power supply circuit 29 is supplied from a remote control transformer disposed in a distribution panel along with the transfer controller 30. This remote control transformer has conventionally been provided for feeding power to a remote control relay which can be activated or reactivated not by means of a transfer signal, but by means of another switch. The AC 24V output from the remote control transformer is supplied to the setting operation terminal 1, thus eliminating a need to supply power to the setting operation terminal directly from commercial power such as ac 100V. Since 5-volt, 12-volt, and 20-volt voltages used as internal power are lower than 24 volts, desired voltages can be obtained through use of a simple configuration, such as a required number of voltage stabilization circuits.

Figure 32:
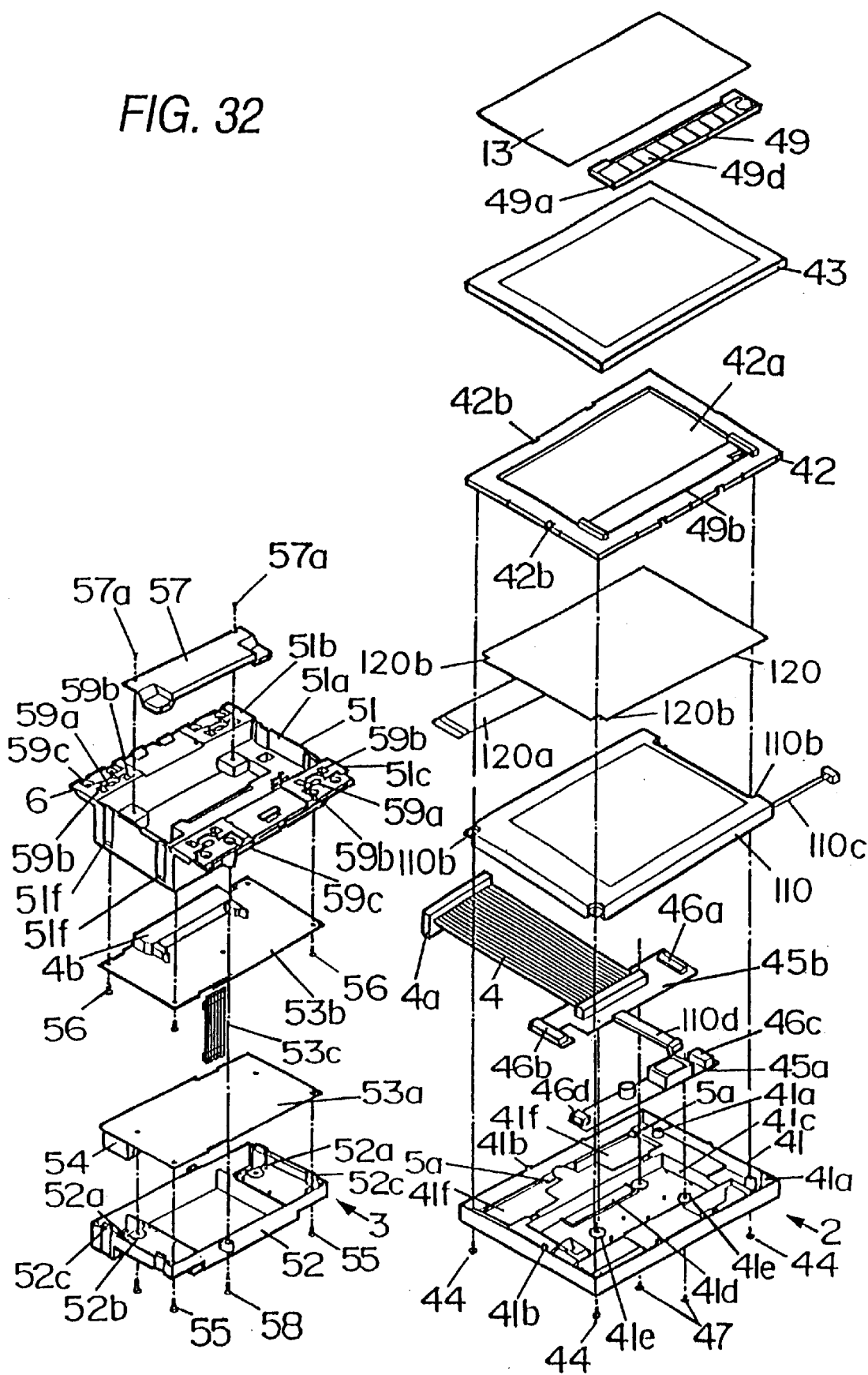
FIG. 32 is an exploded perspective view showing the setting operation terminal used in the remote supervisory control system.

The foregoing setting operation terminal 1 has a configuration shown in FIG. 32. Specifically, the setting operation terminal 1 is constituted by removably connecting together an operation display unit 2 having the liquid crystal section 110 and the touch panel 120, and a main unit 3 for accommodating other circuits.

The operation display unit 2 comprises a front body 41 whose front surface (i.e., the upper surface shown in FIG. 3) is opened; the panel-shaped liquid crystal section 110 to be set on bosses 41a provided in upright positions on the interior bottom surface of the body 41; and the sheet-like touch panel 120 laid on the front-side surface of the liquid crystal section 110. A rectangular-frame-shaped intermediate plate 42 is superimposed on the front side of the touch panel 120. A display region of the liquid crystal section 110 becomes exposed by way of a window 42a formed in the intermediate plate 42. Further, a rectangular decorated plate 43 is laid on the front surface of the intermediate plate 42. The front body 41, the intermediate plate 42, and the decorated plate 43 are formed from insulating synthetic resin. Further, the touch panel 120 is activated when pressed by a finger or other member. A replaceable transparent protective sheet 13 is labeled to the surface of the touch panel 120, thus preventing fingerprints from being left on the touch panel 120. If the protective sheet 13 is stained by fingerprints or dust, the touch panel 120 can be readily maintained by replacement of the protective sheet 13.

The front body 41 and the intermediate plate 42 are connected together by screw-engaging countersunk head screws 44—inserted through the bosses 41a from behind the body 41—with the intermediate plate 42. Six lift-prevention tabs 41b are projectingly formed along the front peripheral wall surface of the front body 41. Each of the lift-prevention tabs 41b is formed so as to have a greater width toward its tip end. The lift-prevention tabs 41b are engaged with notches 42b formed in the periphery of the intermediate plate 42. As a result of the lift-prevention tabs 41b engaging with the notches 42b, lifting of the intermediate plate 42 from the front body 41 can be prevented, thus preventing occurrence of a clearance between the front body 41 and the intermediate plate 42, which would otherwise be caused by warpage of the intermediate plate 42. The lift-prevention tabs 41b and the notches 42b are arranged in an asymmetrical manner, thereby preventing faulty assembly of the front body 41 and the intermediate plate 42.

The box mount holes 59a are formed in the mount pieces 51b and 51c at the same pitches as those at which holes are formed in a triple frame which is produced by arranging side by side three mount frames for use in mounting a large-angle string wiring accessory as defined by Japanese Industrial Standards (JIS). Further, the main unit 3 has dimensions equivalent to those of a triple module which is produced by arranging side by side three 3-module wiring accessories. Consequently, the main unit 3 can be mounted by use of members for mounting wiring accessories, thereby eliminating a necessity for newly manufacturing custom-designed mounting members or requiring minimal training in a mounting method.

As mentioned above, the remote supervisory control system using the setting operation terminal 1 comprises various loads, such as the incandescent lamps $L_1$, the fluorescent lamps $L_2$, the fan coil $L_3$, and the speaker $L_4$, and enables dimming of the incandescent lamps $L_1$ and the fluorescent lamps $L_2$ and adjustment of outputs of the fan coil $L_3$ and the speaker $L_4$, as well as activation or deactivation of the loads. An operation section and a control section are required for effecting control of such loads. In the setting operation terminal 1, the liquid crystal section 110 acts as a display section, and the operation section is formed by combination of graphics and characters indicated on the liquid crystal section 110 and the touch panel 120.

If data pertaining to the display and operation sections of all the loads to be controlled are displayed on a single screen of the liquid crystal section 110, the liquid crystal section 110 is required to have a large screen, thus rendering the setting operation terminal 1 expensive and bulky. To prevent this problem, the volume of data to be displayed per screen of the liquid crystal section 110 is made comparatively low, and data pertaining to the display and operation sections of the plurality of loads can be indicated on the liquid crystal display section 110 by means of switching a screen display. Specifically, interpretation of the nature of operation of the touch panel 120 is changed in association with the screen display appearing on the liquid crystal section 110.

Figure 33:
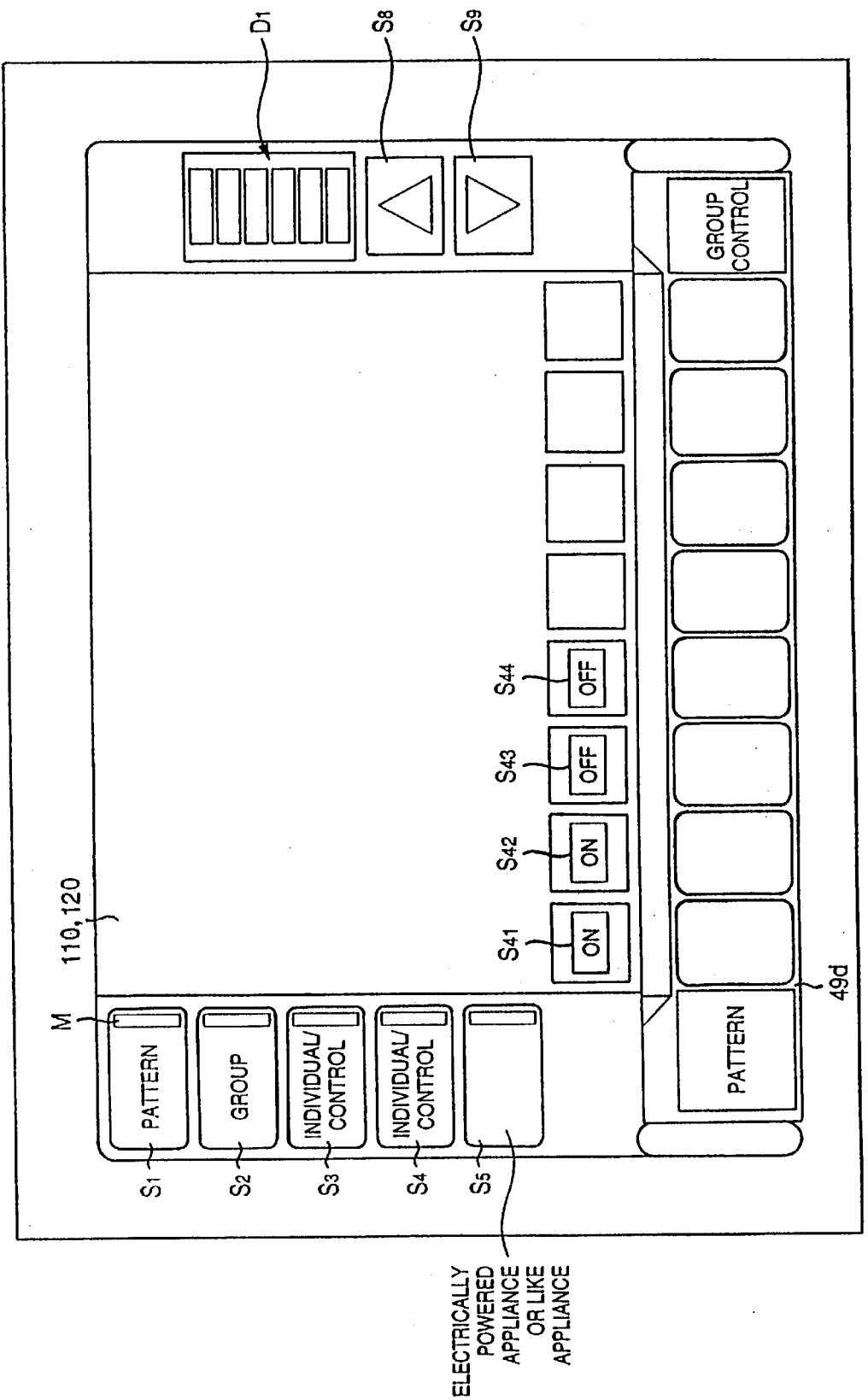
FIG. 33 is a descriptive view for showing an example of a display indicated on the display unit of the remote supervisory control system.

As shown in FIG. 33, five buttons $S_1$ to $S_5$ for switching screens are indicated on the left column on the screen of the liquid crystal section 110. These buttons $S_1$ to $S_5$ are indicated at all times, without regard to switching between screens. The buttons $S_1$ to $S_5$ are assigned, in order from the top, to pattern control (pattern), group control (group), luminaire control (dimmer/individual), luminaire control (dimmer/individual), and powered-curtain/fan coil unit control (electrically-powered appliances or like appliances). When any of the regions on the touch panel 120 corresponding to the buttons $S_1$ to $S_5$ is touched (pressed), a screen display is switched to a screen corresponding to the thus-selected control. Mark M is indicated to the side of the selected one of the buttons $S_1$ to $S_5$, thereby informing the user of which of the screens is currently selected. The reason why two buttons $S_3$ and $S_4$ are assigned to luminaire control is that the luminaires are provided in greater number than are any other loads to be controlled.

Figure 34:
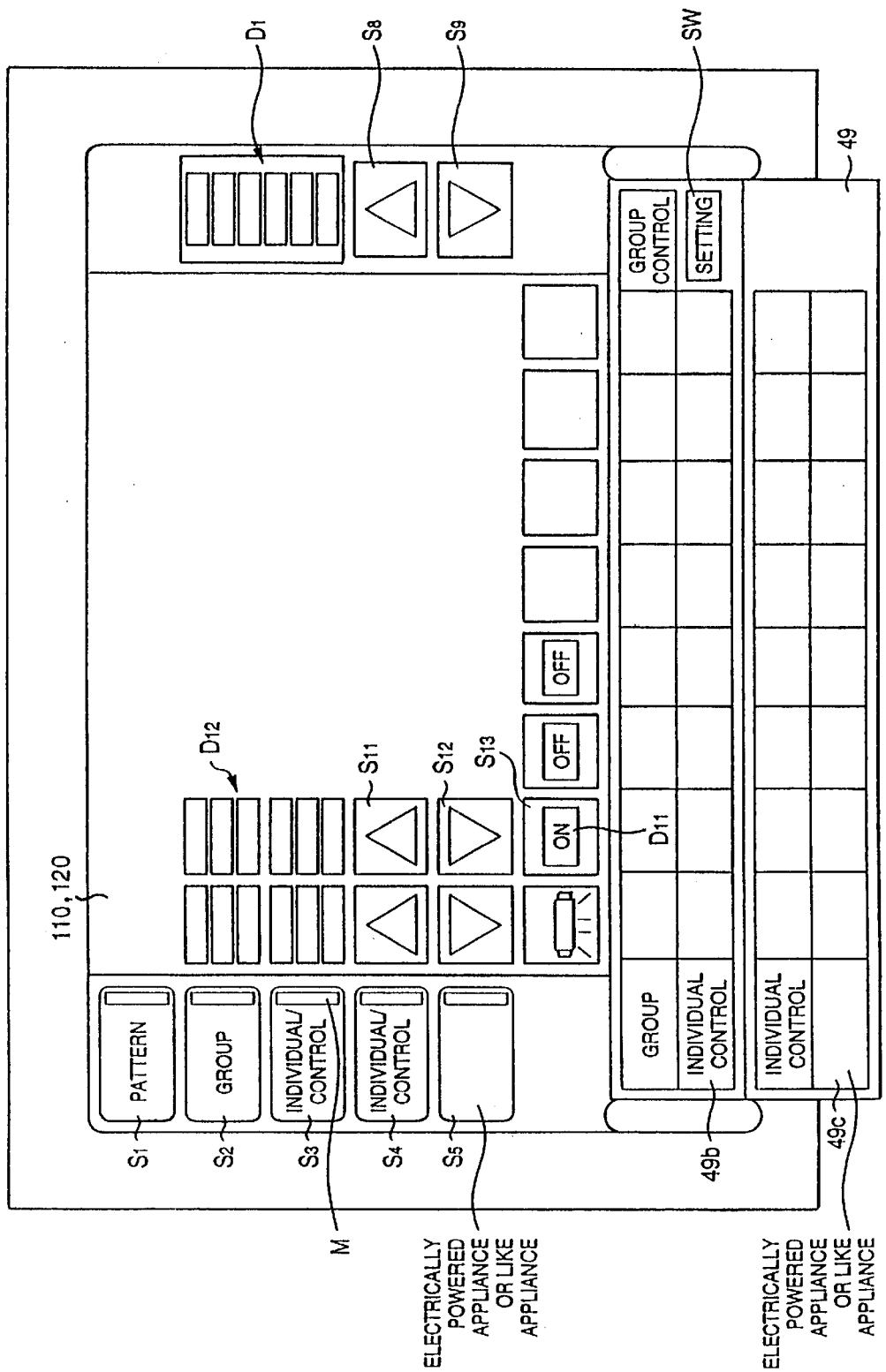
FIG. 34 is a descriptive view for showing an example of a display indicated on the display unit of the remote supervisory control system.

First, a brief explanation will be given of control of loads through use of the foregoing setting operation terminal 1. At the time of control (illumination or extinction) of the luminaires (incandescent lamps or fluorescent lamps), a screen such as that shown in FIG. 34 is displayed. Illumination and extinction of the luminaires can be controlled by means of a single operation section. In contrast, dimming of the luminaires requires, as operation sections, an UP operation section for instructing the luminaires to increase light output, a DOWN operation section for instructing the luminaires to decrease light output, and an ON/OFF operation section for instructing the luminaires to be illuminated or extinguished. Further, a level display section for indicating the level of light output and an illumination/extinction display section for indicating whether the luminaires are illuminated or extinguished are also required. The ON/OFF operation section and the illumination/extinction display section can also be used for solely illuminating or extinguishing the luminaires. In short, the operation and display sections for dimming purposes can also be used as the operation and display sections only for illumination and extinction purposes. For this reason, an UP button $S_{11}$, a DOWN button $S_{12}$, and an ON/OFF button $S_{13}$ are provided for the luminaire operation section. Further, an illumination/extinction display section $D_{11}$ and a bar-indication-type level indicator $D_{12}$ are provided for the display section. The illumination/extinction display section $D_{11}$ is superimposed on the ON/OFF button $S_{13}$. Depending on the status of the luminaires, characters "ON" or "OFF" are selectively indicated. In a case where the user instructs only illumination or extinction of the luminaires, none of the UP button $S_{11}$, the DOWN button $S_{12}$ and the level indicator $D_{12}$ are indicated, but the ON/OFF button 13 and the illumination/extinction indicator $D_{11}$ are displayed. Further, a symbol may be used for the illumination/extinction display section $D_{11}$.

The setting operation terminal 1 can effect group control of the loads. In order to effect group control, it is necessary to designate which of the objects are to be controlled in a collective manner. Further, the setting operation terminal 1 can control the loads through pattern control. In order to effect pattern control, it is necessary to designate which of the objects are to be controlled, as well as the nature of a state in which the objects are to be controlled.

Loads to be subjected to group and pattern control and a state in which the loads are to be controlled will be described later. If group control has already been set, a screen similar to the screen "DIMMER/INDIVIDUAL" shown in FIG. 34 appears in response to the user touching the button $S_2$. If any one of the displayed operation sections on the screen is touched, a plurality of loads are brought into the same controlled state in a collective manner. Therefore, if the user desires to collectively control the activation or deactivation of a plurality of luminaires or an increase or decrease in light output of the luminaires, the luminaires are subjected to group control or group dimming. Further, master faders $S_8$ and $S_9$ are displayed on the screen of the liquid crystal section 11 along with a bar-indication-type level indicator $D_1$. Use of the master faders $S_8$ and $S_9$ enables a group dimming operation, thereby increasing or decreasing the light output of all the luminaires. These master faders $S_8$ and $S_9$ appear even on the "DIMMER/INDIVIDUAL" screen and the "OTHER ELECTRICALLY-POWERED APPLIANCE OR LIKE APPLIANCE" screen.

If pattern control has already been set, the button $S_1$ corresponding to the scenario is touched (since pattern control is selected according to the condition in which the room is used, the nature of pattern control is made so as to correspond to the scenario in which the room is used. In this sense, the term "scenario" is used for signifying pattern control). As shown in FIG. 33, buttons $S_{41}$ to $S_{44}$ appear in a lower portion of the screen of the liquid crystal section 110. These buttons $S_{41}$ to $S_{44}$ correspond to respective scenarios.

When the user touches one of the buttons $S_{41}$ to $S_{44}$ corresponding to a desired scenario, the preset object is controlled to a state corresponding to the scenario.

The indications, such as operation sections (buttons or operation buttons) and symbols, are changed by means of internal processing of the setting operation terminal 1 according to the contents of control data which are returned from the transfer controller 30 after the setting operation terminal 1 has sent instructions to the control terminals 32.

As mentioned above, the setting operation terminal can instruct the nature of control to which a load is subjected. Since the remote supervisory control system can effect group and pattern control, there is a necessity for setting correspondence between a load to be controlled and an operation section, as well as correspondence between loads to be subjected to group or pattern control and a state in which the loads are to be controlled. To this end, the setting operation terminal is equipped with the setting switch SW for instructing the load. The setting switch SW is pressed while any one of the buttons $S_1$ to $S_5$ is selected. If the button $S_1$ is selected, the nature of pattern control can be set. If the button $S_2$ is selected, the nature of group control can be set. If any of the buttons $S_3$ to $S_5$ is selected, correspondence between the load to be controlled and an operation section can be set.

Figure 35:
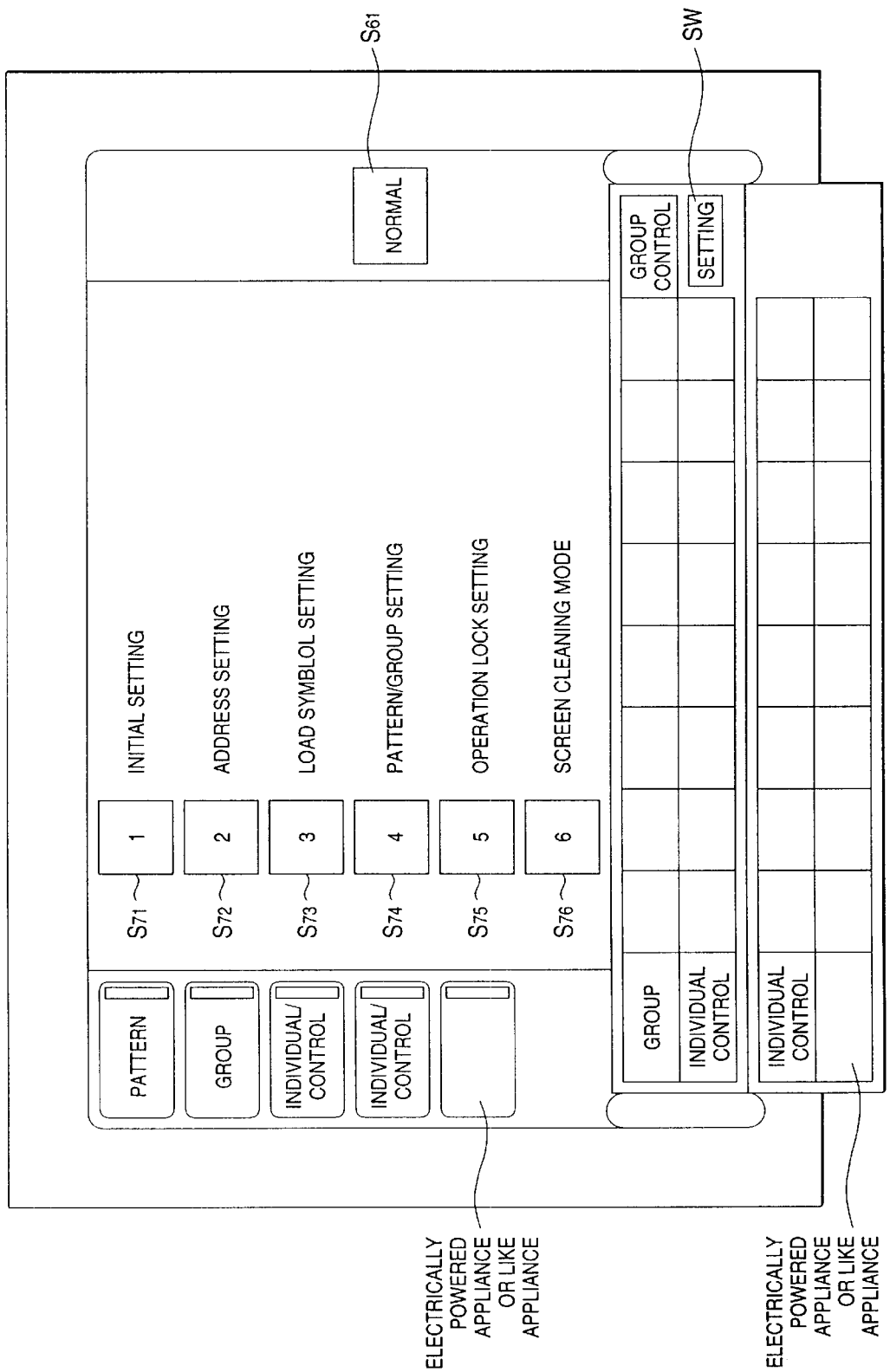
FIG. 35 is a descriptive view for showing an example of a display indicated on the display unit of the remote supervisory control system.

The following explanation applies to operation of the remote supervisory control system when the system enters a setting mode as a result of the user pressing the setting switch SW and holding for three seconds or more. As shown in FIG. 35, an initial screen for setting mode enables the user to select a desired setting operation. In the present embodiment, the user can select a desired one from "INITIAL SETTING," "ADDRESS SETTING," "LOAD SYMBOL SETTING," "PATTERN/GROUP SETTING," "OPERATION LOCK SETTING," and "SCREEN CLEANING MODE." A desired setting operation can be selected by means of the user touching any one of operation sections; i.e., buttons $S_{71}$ to $S_{76}$. As mentioned above, various setting operations are performed through use of the touch panel 120 superimposed on the screen. In connection with the following description of the screen, buttons other than those required for operation are omitted from the drawings, but the screen is substantially the same as those shown in FIG. 33.

When the "INITIAL SETTING" button is selected in the screen shown in FIG. 35, the basic operational parameters of the setting operation terminal 1, such as the brightness of the screen or the volume of the beeper 28, can be set. Specifically, the user can select any one from the "CONTRAST SETTING" operation, the "SETTING OF SCREEN SHUTOFF" operation, the "OPERATION SOUND SETTING" operation, and the "SETTING OF AUTOMATIC SCREEN ILLUMINATION" operation. It is possible to control the contrast of the screen of the liquid crystal section 110, to set a time duration between the instant when an input operation is finished and the instant when the screen is shut off, to determine whether or not operation sound is emitted when a button is pressed, and to determine whether or not a change in the operation status of the load L is displayed at the time a blank screen is displayed.

Figure 15:
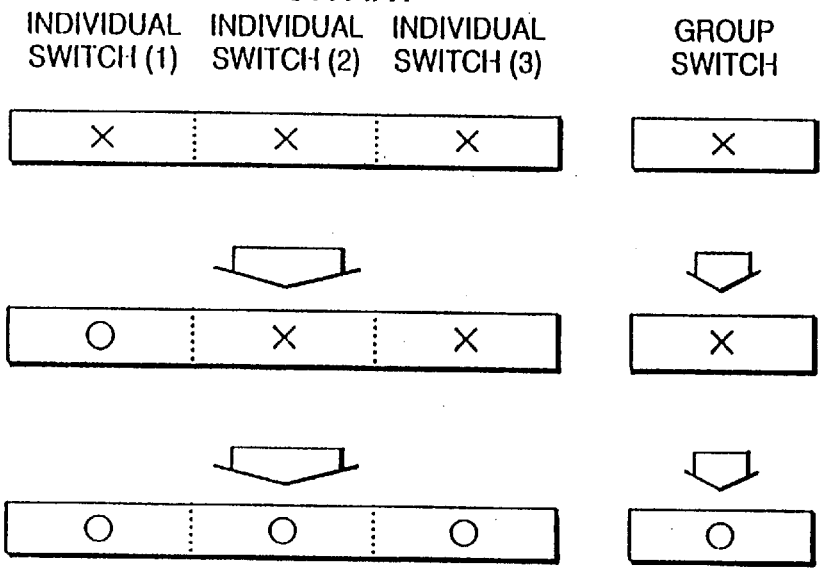
FIG. 15 is a descriptive view for showing an example of a display indicated on the display unit of the remote supervisory control system of FIG. 13.
Figure 16:
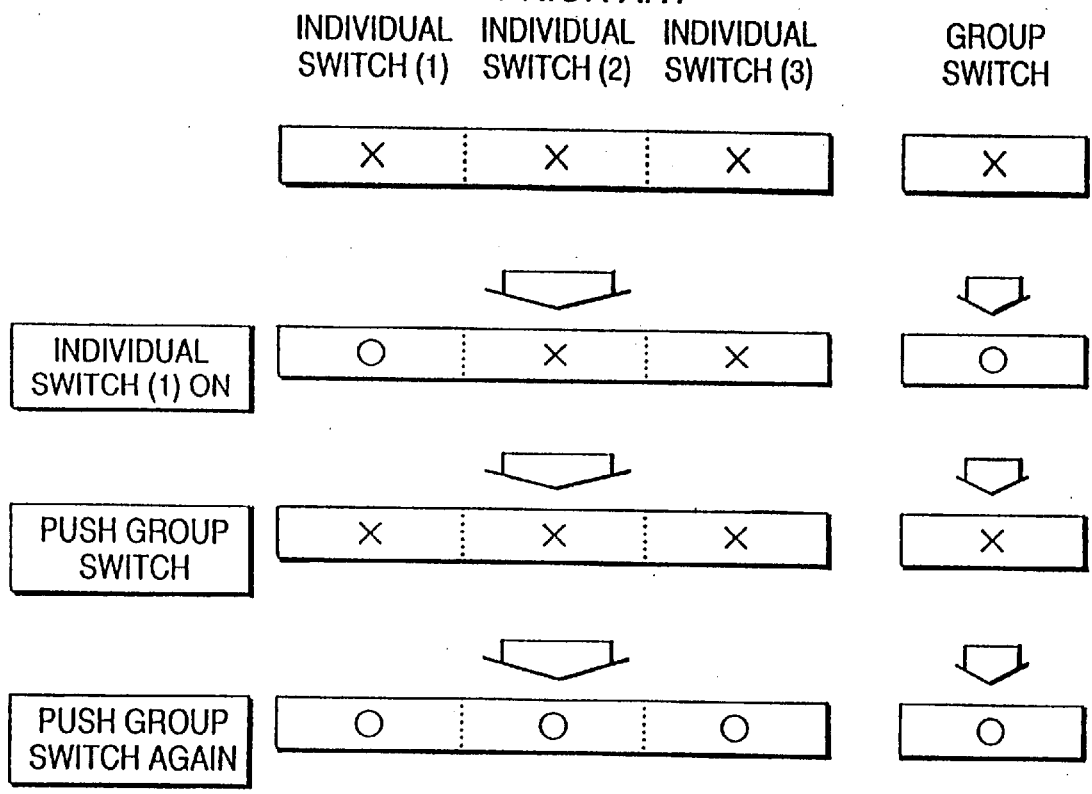
FIG. 16 is a descriptive view for showing an example of a display indicated on the display unit of the remote supervisory control system of FIG. 13.

When the "ADDRESS SETTING" operation is selected on the screen shown in FIG. 35, the address of the terminal can be set and ascertained, as shown in FIG. 15. When a button is selected from the buttons $S_1$ to $S_5$ in this setting mode, only four buttons $S_{41}$ to $S_{44}$ are displayed as active operation sections, such as those shown in FIGS. 37, 39 and 41. Specifically, since four switches are assigned to one channel, the four buttons $S_{41}$ to $S_{44}$ are displayed as effective operation sections.

Figure 36:
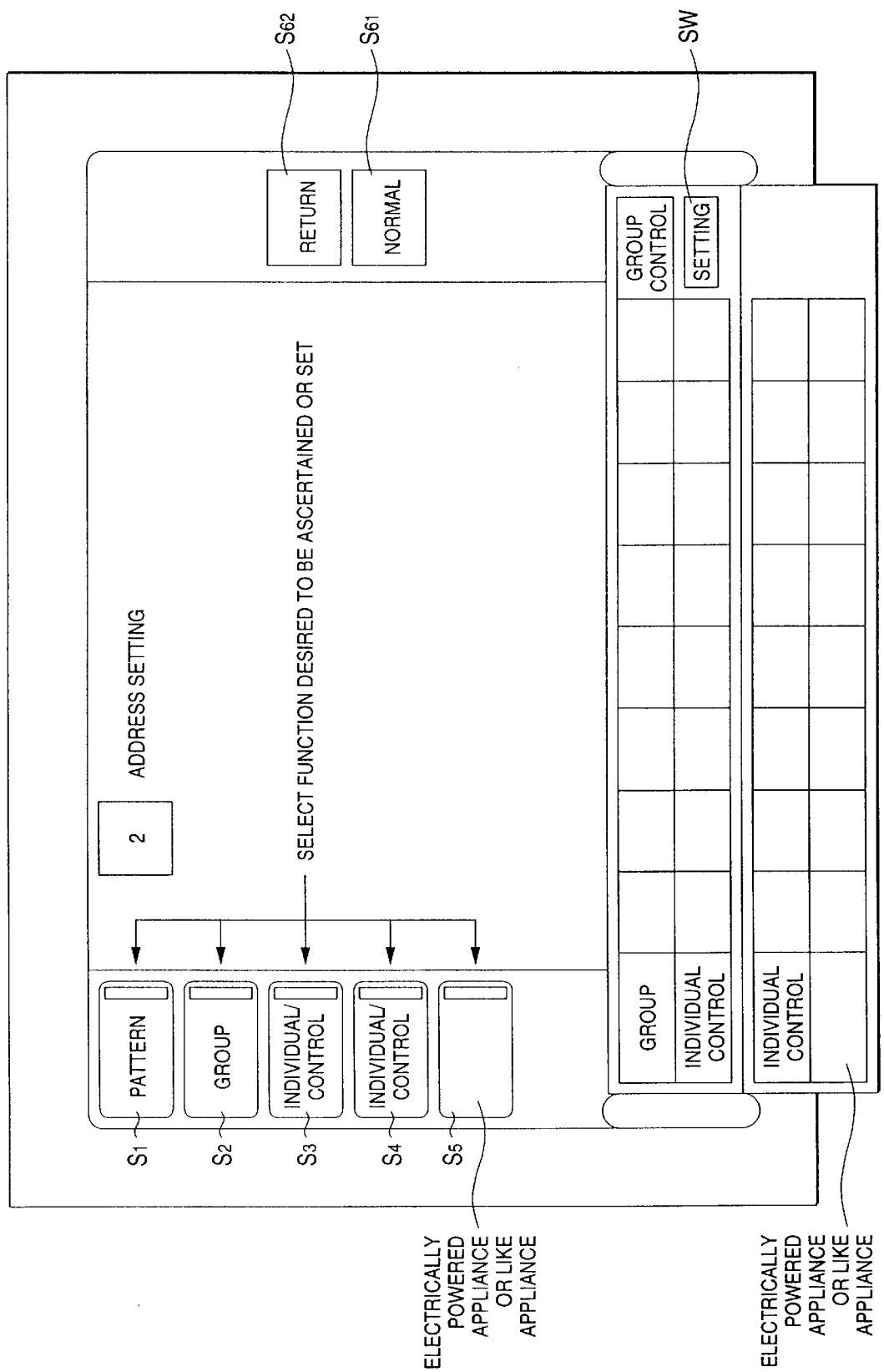
FIG. 36 is a descriptive view for showing an example of a display indicated on the display unit of the remote supervisory control system.
Figure 37:
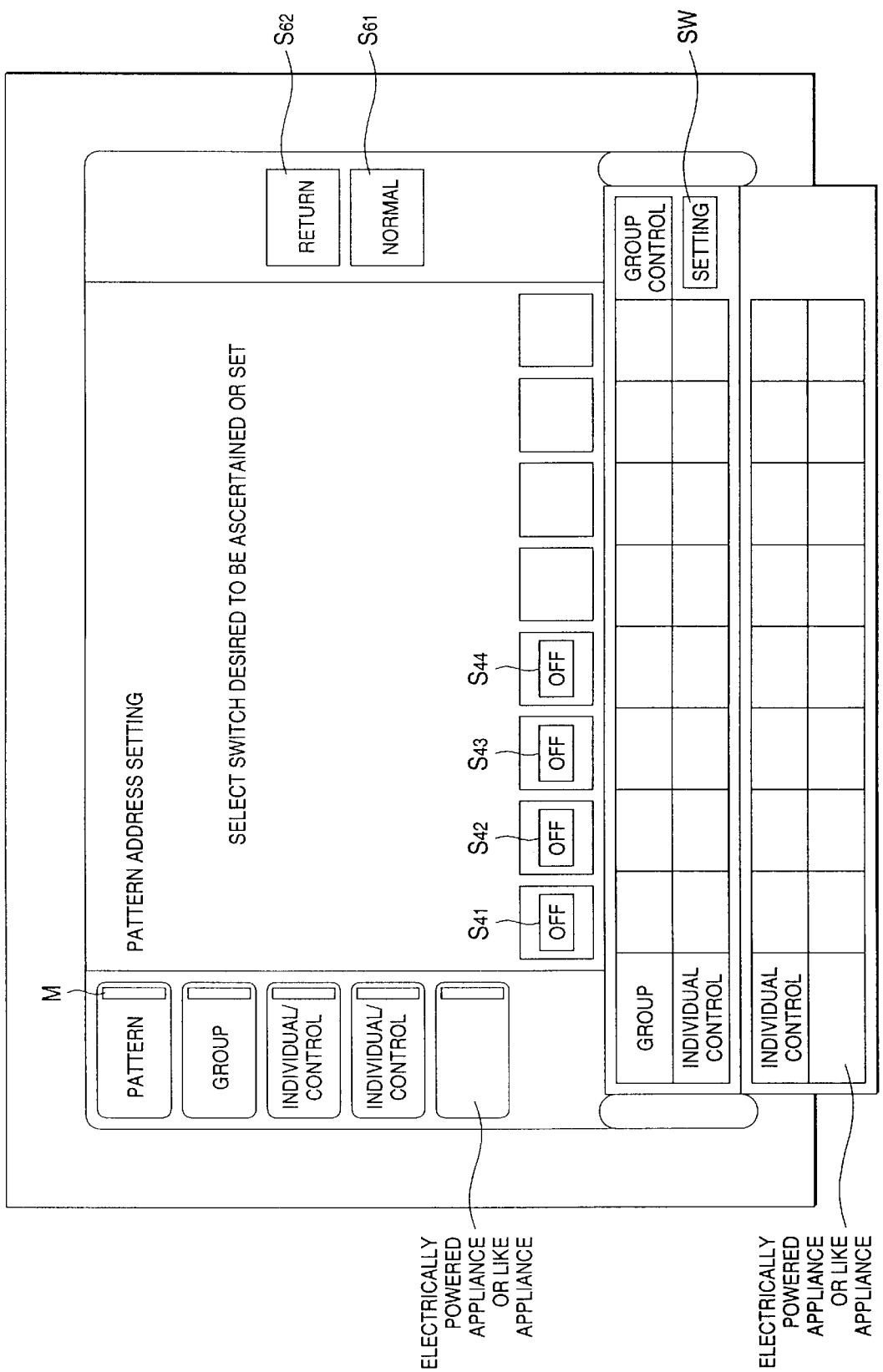
FIG. 37 is a descriptive view for showing a change in the display indicated on the display unit of the remote supervisory control system.
Figure 38:
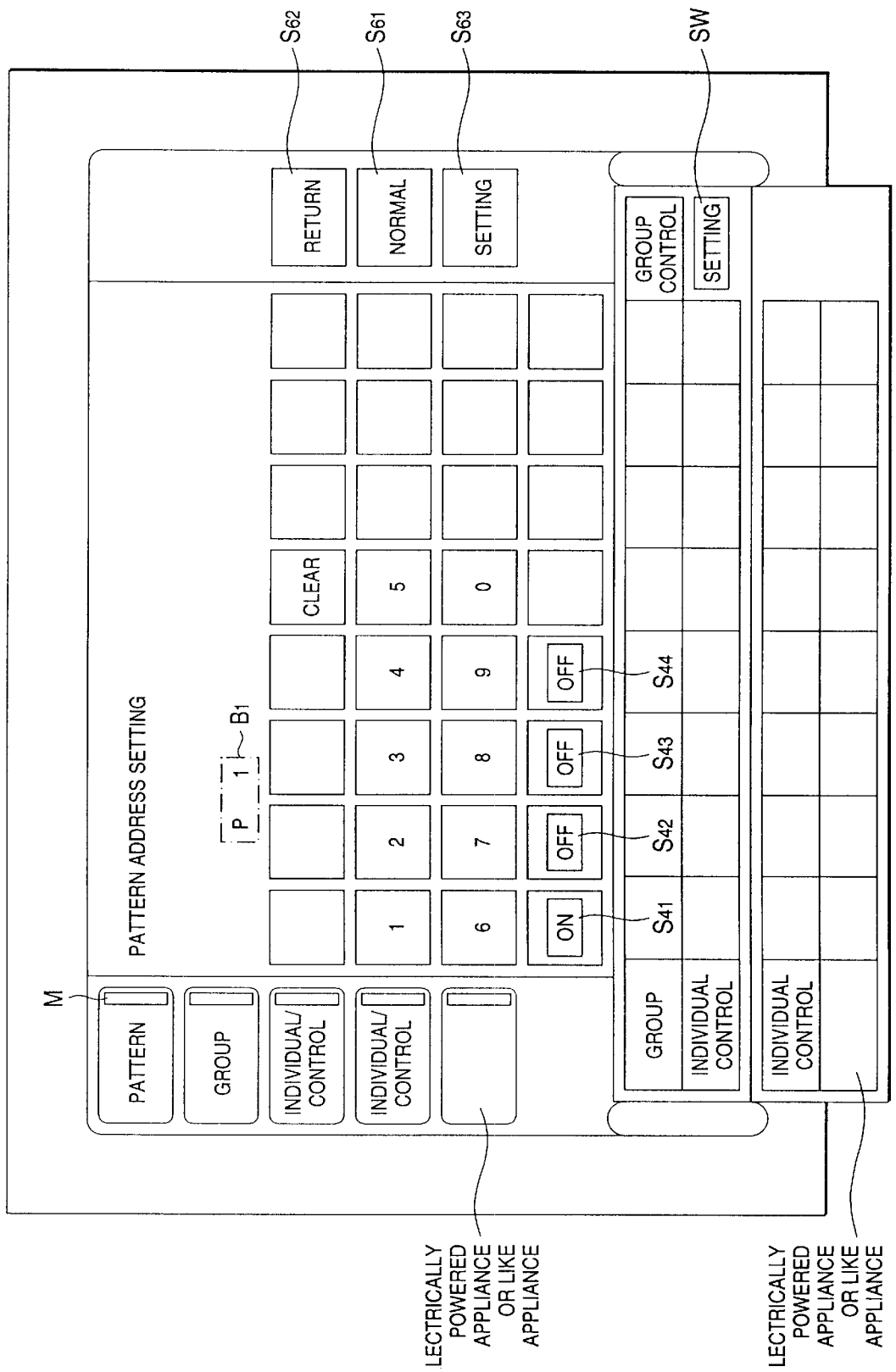
FIG. 38 is a descriptive view for showing an example of a display indicated on the display unit of the remote supervisory control system.

Provided that the "PATTERN" button $S_1$ is pressed in the screen shown in FIG. 35, the screen changes to a screen shown in FIG. 37. In addition to the "NORMAL" button $S_{61}$ indicated on the right-side portion of the screen shown in FIG. 37, a "RETURN" button $S_{62}$ is indicated. If the button $S_{62}$ is touched, the screen changes to the previous screen. If any one of the buttons $S_{41}$ to $S_{44}$ is selected in the screen shown in FIG. 36 or 37, the screen changes to a screen shown in FIG. 38, wherein there are displayed operation sections for setting the address and function of the terminal. As a result, the address or function of the button selected from the buttons $S_{41}$ to $S_{44}$ on the screen shown in FIG. 37 can be set. For example, if the button $S_{41}$ is touched, the display status of the button $S_{41}$ is changed, to thereby show that the button $S_{41}$ is selected. If it is found in this state that an address for pattern control use (i.e., a pattern address) has already been assigned to the button $S_{41}$, the value of the address is indicated in box $B_1$. If a pattern address has not yet been assigned to the button $S_{41}$ the user can set a pattern address through use of a numeric key pad. Alternatively, when the pattern address that has already been assigned is changed, the "CLEAR" button is touched to thereby erase the pattern address, and a new pattern address is entered through use of the numeric key pad. FIG. 38 shows that "P1" is set as the pattern address. A "SETTING" button $S_{63}$ is indicated on the right side portion of the screen shown in FIG. 38. If the button $S_{63}$ is touched after pattern addresses have been assigned to the respective buttons $S_{41}$ to $S_{44}$, the pattern addresses assigned to the buttons $S_{41}$ to $S_{44}$ are determined.

The same also applies to the case of setting of addresses for group control purposes (i.e., group address), addresses for dimmer/individual control purposes (i.e., dimmer/individual control address), and addresses for use in controlling electrically-powered appliances (i.e., electrically-powered appliance or like appliance). In the case of group setting, the screen changes from that shown in FIG. 39 to that shown in FIG. 40. In the case of dimmer/individual setting, the screen changes from that shown in FIG. 41 to that shown in FIG. 42. On the respective screens shown in FIGS. 40 and 42, there are shown setting buttons suitable for group control and dimmer/individual control.

Figure 39:
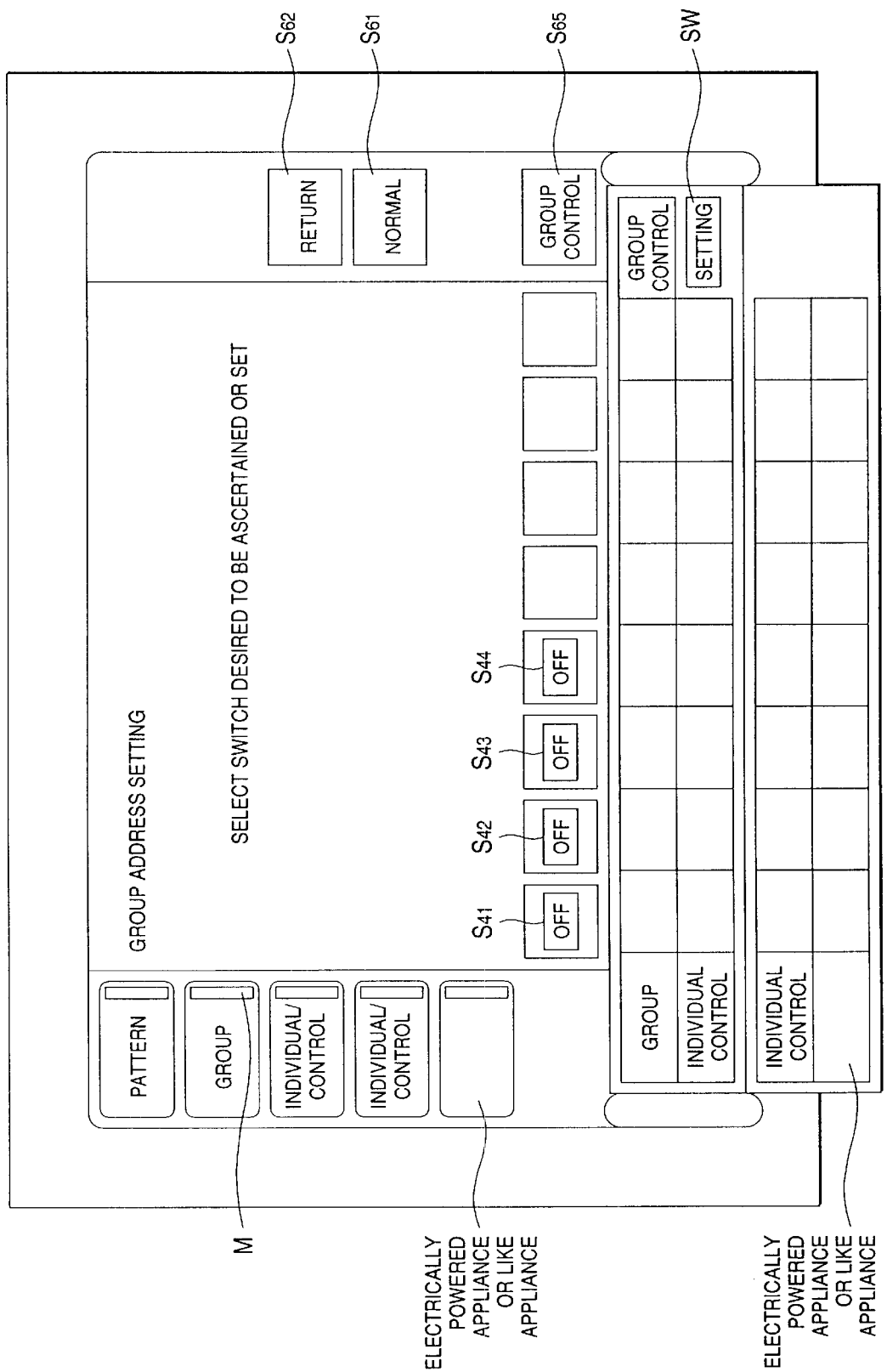
FIG. 39 is a descriptive view for showing an example of a display indicated on the display unit of the remote supervisory control system.
Figure 40:
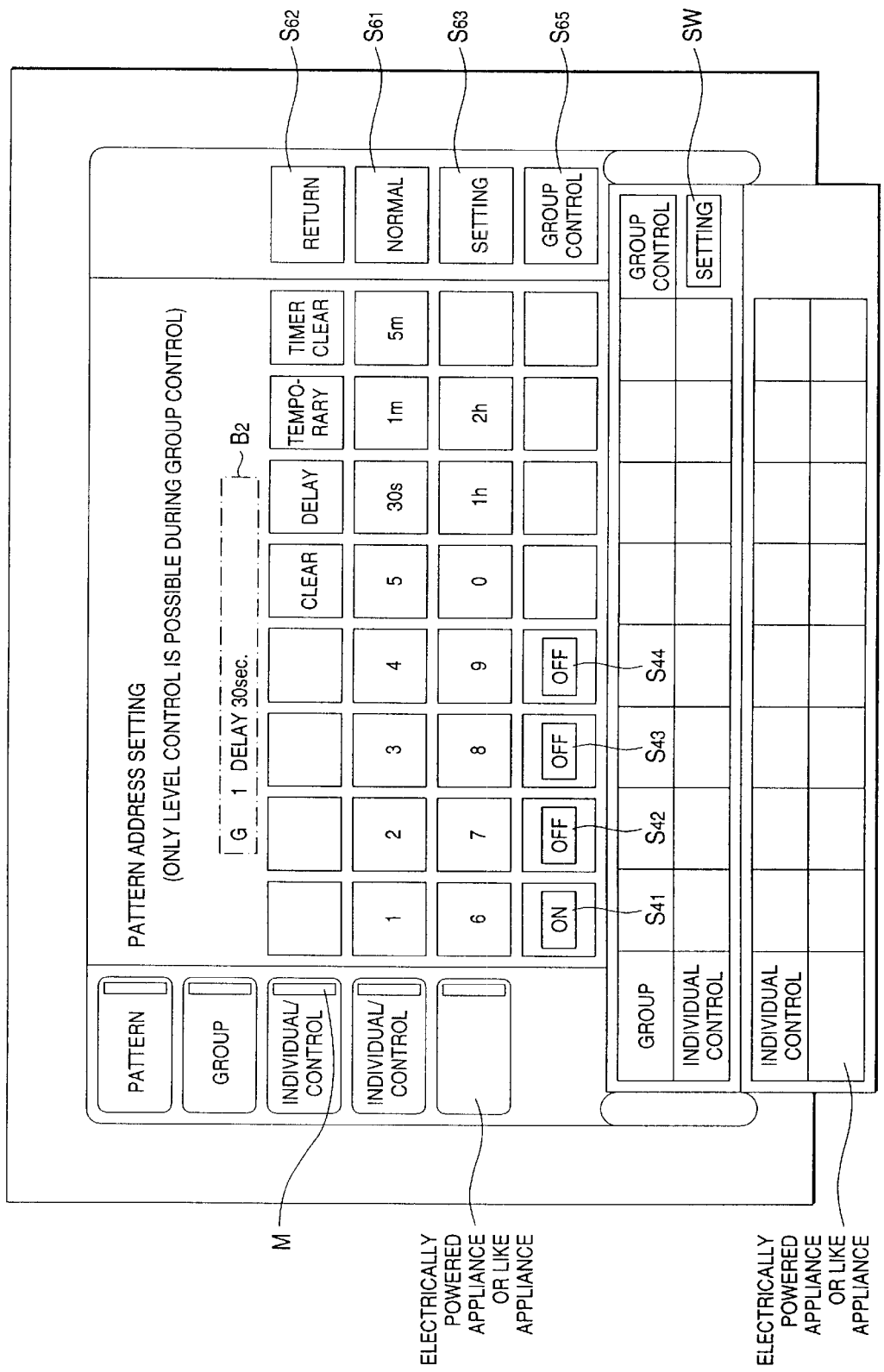
FIG. 40 is a descriptive view for showing an example of a display indicated on the display unit of the remote supervisory control system.

On the screen shown in FIG. 39 for setting group control addresses, a "GROUP DIMMER" button $S_{65}$ for instructing whether or not a dimmer level is controlled in a collective manner is shown on the lower-right portion of the screen in addition to the buttons $S_{61}$ and $S_{63}$. If this button $S_{65}$ is touched, the intensity of light of all the luminaires can be controlled in a collective manner through group control. The operations required after selection of one from the buttons $S_{41}$ to $S_{44}$ are the same as those required in the setting of a pattern address, thereby prompting display of setting buttons suitable for group control such as those shown in FIG. 40. In the screen shown in FIG. 40, the user can select between temporary illumination for activating a load only for a predetermined period of time after completion of an operation for activating the load (in this case, the load usually corresponds to a luminaire), and delayed shutoff for deactivating the load after completion of an operation for deactivating the load. The duration of such control can be set in a plurality of steps. Specifically, the temporary illumination operation can be selectively set in five steps (by means of the "TEMPORARY" button): i.e., 30 seconds, one minute, five minutes, one hour, and two hours. The delayed shutoff operation can be selectively set in three steps (by means of the "DELAYED" button): i.e., 30 seconds, one minute, and five minutes. If any errors are committed in the course of the setting operation, the user touches the "CLEAR" button. In order to cancel timer control such as temporary illumination or delayed shutoff, the user presses the "TIMER CLEAR" button. As shown in FIG. 40, the details of the group address or other settings (including the settings of timer control) are indicated in box $B_2$. The message shown in the box $B_2$ in FIG. 40 expresses that the group address is "G1" and that shutoff is set so as to become delayed 30 seconds. Even on the screens shown in FIGS. 38 and 40, the "SETTING" button $S_{63}$ is indicated. If the button $S_{63}$ is pressed, the group addresses assigned to the buttons $S_{41}$ to $S_{44}$ are determined, and the thus-determined group addresses are transmitted to the transfer controller 30.

Figure 41:
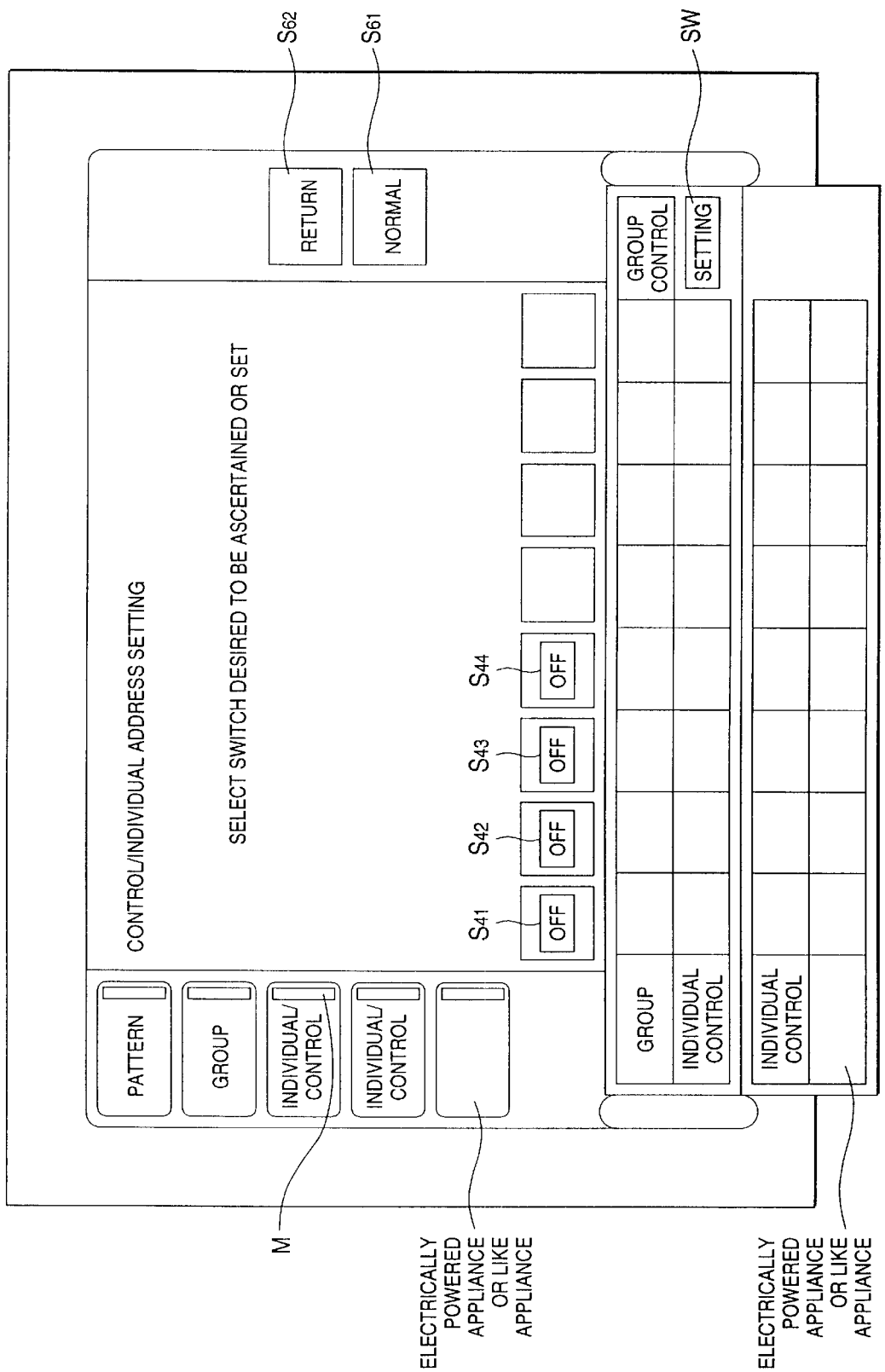
FIG. 41 is a descriptive view for showing a change in the display indicated on the display unit of the remote supervisory control system.
Figure 42:
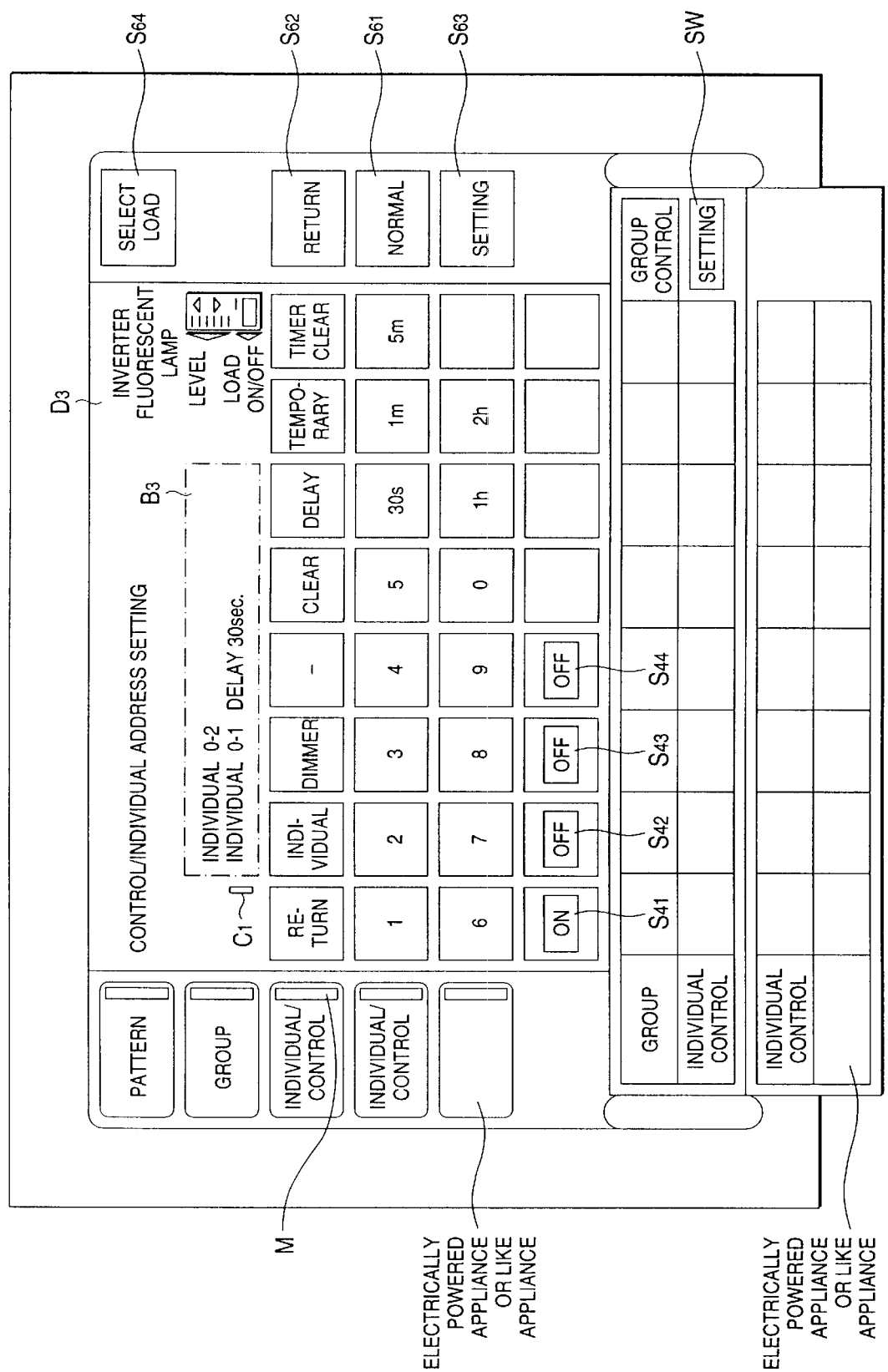
FIG. 42 is a descriptive view for showing an example of a display indicated on the display unit of the remote supervisory control system.
Figure 43:
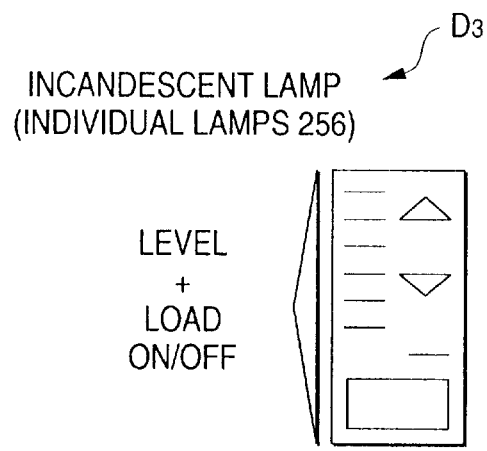
FIGS. 43A to 43C are descriptive views for showing an example of a display indicated on the display unit of the remote supervisory control system.
Figure 43:
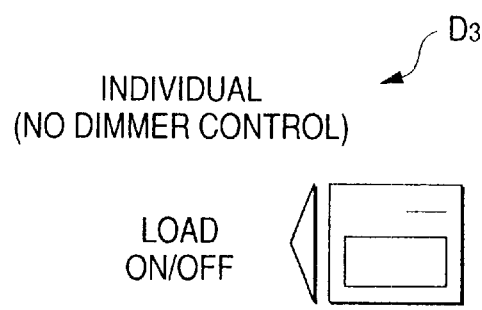
Figure 43:
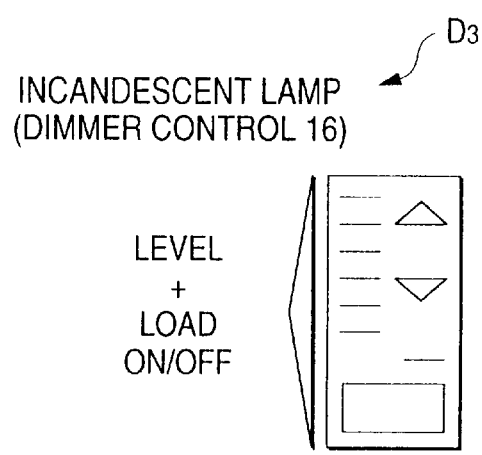

The buttons $S_{41}$ to $S_{44}$ which are objects of setting of individual or dimmer addresses are indicated on the screen shown in FIG. 41. If any one of the buttons $S_{41}$ to $S_{44}$ is selectively touched on this screen, the screen shown in FIG. 42 appears. As in the case of group control, individual control and dimmer control enable timer control. Further, the timer control can be set stepwise. By selection of "INDIVIDUAL" or "DIMMER" on the screen shown in FIG. 42, activation or deactivation of only the luminaire or dimming of the luminaire can be selected. A load to be checked can be selected from the loads indicated within a box $B_3$ by means of the user touching the "RETURN" button. Specifically, descriptions of a plurality of loads are displayed in rows within the box $B_3$. Cursor C1 provided outside the box $B_3$ is vertically moved by touching the "RETURN" button, thereby designating one of the rows provided within the box $B_3$. The "RETURN" button is used for selecting a row sequentially and cyclically. In the screen shown in FIG. 42, a "LOAD SELECTION" button $S_{64}$ is indicated on the upper right portion of the screen. This button is used for selecting the type of a load and changes a description displayed in an indication section $D_3$ provided in the upper right section of the screen according to the type of the selected load. As shown in FIGS. 43(a) to (c), there can be sequentially, cyclically selected a desired one from a case where incandescent lamps are objects of dimming operation and up to 256 incandescent lamps are controlled (FIG. 43(a)); a case where dimming operation is not carried out (FIG. 43(b)); a case where incandescent lamps are objects of dimming operation and up to 16 incandescent lamps are controlled (FIG. 43(c)); and a case where inverter fluorescent lamps are objects of dimming operation (FIG. 42). If the "SETTING" button $S_{63}$ is pressed on the screen shown in FIG. 42, the details of the screen shown in FIG. 42 are set.

According to the present invention, the control terminals assigned the same simultaneous control address substantially simultaneously receive the same transfer signal, thus enabling control of the intensity of the illumination loads at substantially the same time. Thus, the remote supervisory control system according to the present invention yields the advantage of having the ability to change the intensity of a plurality of grouped illumination loads without involvement of a time lag. Further, use of the individual address enables individual control of the illumination loads. Although the illumination loads are controlled individually, the intensity of the illumination loads is changed simultaneously when the illumination loads are grouped, thus preventing occurrence of a time lag, which the user would consider strange.

According to the present invention, a display method can be selected according to the purpose of use of the operation terminal, and system configuration is facilitated.

The present invention has an advantage of providing the ability to operate a plurality of grouped loads without involvement of a time lag. Further, if the individual address is used, the loads can be individually controlled. Therefore, if individual loads are desired to be grouped while being controlled, they are controlled simultaneously, to thereby prevent occurrence of a time lag, which the user would consider strange.

According to the present invention, a remote supervisory control system requires a comparatively small occupation space and which uses a multifunction setting operation terminal capable of offering various functions required for setting, control, and management, to thereby achieve multifunctional performance and improve cost effectiveness.

What is claimed is:

1. A remote supervisory control system comprising:
   a plurality of operation terminals which are each assigned addresses, an operation section provided in each of the operation terminals;
   a plurality of control terminals connected to loads respectively assigned unique addresses, each of the control terminals provided with a terminal processing section;
   a signal line to which the operation terminals and the control terminals are connected through multidrop connection;
   a transfer controller connected to the signal line, said transfer controller exchanging a transfer signal among the transfer controller and each of the operation and control terminals, and said transfer signal, including data corresponding to operation of the operation section of each of the operation terminals, being transmitted to the control terminal specified in accordance with a correspondence between addresses set in the transfer controller to control the load connected to the control terminal, the correspondence includes an individual control relationship for associating one operation section with one load and a simultaneous control relationship for associating one operation section with a plurality of loads;
   an individual address setting section for setting a unique individual address to each of the plurality of control terminals, and a simultaneous control address setting section for setting a simultaneous control address which is commonly assigned to a plurality of control terminals, the individual address setting section and the simultaneous control address setting section being provided with the control terminal,
   wherein a terminal processing section controls the intensity of the load to a control level instructed by the operation section of the operation terminal under one of condition that
   when the terminal processing section is instructed to use the individual address by the transfer signal and the address data included in the transfer signal match the individual address set in the individual address setting section; and
   when the terminal processing section is instructed to use the simultaneous control address by means of the transfer signal, and the address data included in the transfer signal match the simultaneous control address set in the simultaneous control address setting section.

2. The remote supervisory control system as defined in claim 1, wherein the simultaneous control address setting section sets a plurality of simultaneous control addresses.

3. The remote supervisory control system as defined in claim 1, wherein the transfer controller sets a simultaneous control address in the simultaneous control address setting section of each of the control terminals by way of the signal line.

4. The remote supervisory control system as defined in claim 3, wherein in a case where the individual address of any one of the control terminal is changed, the transfer controller sets a new simultaneous control address obtained on the basis of the after-change individual address into the simultaneous control address setting section of the control terminal.

5. The remote supervisory control system as defined in claim 3, wherein the transfer controller includes:
   checking means for checking whether or not the simultaneous control address transmitted to the control terminal matches the simultaneous control address which is set in the simultaneous control address setting section of the control terminal and which is returned from the control terminal by means of the transfer signal.

6. The remote supervisory control system as defined in claim 3, wherein the transfer controller includes:
   setting means for checking the simultaneous control address set in the simultaneous control address setting section of each of the control terminals when the system is activated, and for setting a correct simultaneous control address into the control terminal whose simultaneous control address differs from the simultaneous control to be originally set.

7. The remote supervisory control system as defined in claim 1, wherein each of the plurality of control terminals includes:
   a display section for indicating the load level of the load, and
   wherein the transfer controller sequentially polls all the operation and control terminals to cause each of the control terminals to return monitoring data pertaining to the actual load level; updates the load level to be indicated on the display section of the operation terminal on the basis of the thus-returned monitoring data; and polls the respective control terminals, which are associated with the operation section of the operation terminal by simultaneous control when the transfer controller receives the transfer signal from the operation terminal, in preference to the other control terminals which are not associated with the operation section by simultaneous control.

8. The remote supervisory control system as defined in claim 1, wherein the transfer controller transmits a fade time for fading the load to the control terminals assigned by an identical simultaneous control address, and when receiving fade start control data by the transfer signal including the simultaneous control address, the terminal processing section of each of the control terminals fades the load level within the fade time.

9. The remote supervisory control system as defined in claim 8, wherein the transfer controller transmits the fade time which varies according to the simultaneous control address.

10. The remote supervisory control system as defined in claim 1, wherein the transfer controller transmits fade start control data to the control terminal by the transfer signal, after having transmitted, to the control terminal, data pertaining to a target load level and a time required to fade the target load level, and the terminal processing section of each of the control terminals calculates the adjusting rate for fading the load level to the target load level within the fade time and fades the load level to the target load level according to the adjusting rate when receiving the fade start control data.

11. The remote supervisory control system as defined in claim 10, wherein the transfer controller can transmit the fade time which varies according to each control terminal.

12. The remote supervisory control system as defined in claim 10, the transfer controller transmits, to the plurality of control terminals assigned by a simultaneous control address, data pertaining to a target load level and a time required for fading the target load level and transmits fade start control data to the respective control terminals by the transfer signal which includes the address data as the simultaneous control address, and wherein the terminal processing section of each of the control terminals calculates the adjusting rate for fading the target load level within the fade time and fades the load to the target load level according to the adjusting rate when the terminal processing section is instructed to use the simultaneous control address by the transfer signal, when the address data included in the transfer signal match the simultaneous control address set in the simultaneous control address setting section, and when the terminal processing section receives the fade start control data.

13. The remote supervisory control system as defined in claim 12, wherein the transfer controller can transmit the fade time which varies according to each control terminal.

14. The remote supervisory control system as claimed in claim 1, wherein the operation terminal includes a display section for indicating the operation status of the associated load, and wherein the transfer controller transmits control data for switching an indication on the display section of the operation terminal according to the operation state of the load acquired from the control terminal; and the transfer controller includes display method switching means f or selectively switching the display method of the display section provided for each operation section of the operation terminal.

15. The remote supervisory control system as claimed in claim 14, wherein the transfer controller exchanges with an external device a signal for setting and checking a display method for the display section.

16. The remote supervisory control system as claimed in claim 1, further comprising:

control method switching means for selectively switching a load control method according to the operation of the operation section of each of the plurality of operation terminals.

17. The remote supervisory control system as claimed in claim 16, wherein the control method includes an ON-prioritized control method wherein, if loads are shared between operation sections and a load is activated by at least one of the operation section, deactivation of a load by another operation sections is invalidated, and a later-operation-prioritized control method for controlling a load by prioritizing a operation section which is actuated later, and the loads shared between the plurality of the operation sections assigned by the ON-prioritized control method are only excluded from deactivating action of another switch.

18. The remote supervisory control system as claimed in claim 16, wherein the transfer controller exchanges with an external device a signal for setting and checking a display method for a display section.

19. The remote supervisory control system as claimed in claim 1, wherein a plurality of said control and operation terminals includes address setting memory in which bit positions are associated with single addresses, and an address flag is set in any of the bit positions of the address setting memory, and the address corresponding to the bit position is used as the address of the operation terminal.

20. The remote supervisory control system as claimed in claim 1, wherein the load is an illumination load, and upon receipt of data corresponding to the actuation of an operation section related to group control, the transfer controller sequentially transmits a transfer signal including a target luminance level of each of the illumination loads associated with group control and an individual address, and the transfer controller subsequently transmits a transfer signal including a simultaneous control address and control.data for instructing the illumination load to start performing a control operation.

21. The remote supervisory control system as claimed in claim 1, wherein a terminal processing section of the operation terminal prohibits transmission of a transfer signal including the data corresponding to the actuation of the operation section when the address data included in the transfer signal match the simultaneous control address.

22. The remote supervisory control system as claimed in claim 1, wherein the operation terminal contains a setting operation terminal which is connected to the signal line and which includes the operation section and a display section, the setting operation terminal comprising:

a display capable of indicating characters and graphics, a transparent touch panel superimposed on a screen of the display, and a control section selecting between a setting mode in which there is set processing corresponding to the operation of an operation section assigned to the touch panel in association with contents of the display, and an operation mode in which the processing is performed in response to the operation of the touch panel operation section, and the processing of the control section includes at least a processing of using the touch panel operation section as a switch, a processing of setting a portion of the correspondence, and a processing of ascertaining the correspondence.

23. The remote supervisory control system as claimed in claim 22, wherein the setting operation terminal includes a mount piece having a mount section whose mount pitches are the same as those of a mount frame to which there can be attached a wiring accessory equal in size to an integral multiple of the dimensions of a large-square string wiring accessory and at least a box mount hole, as an attachment section, into which there can be inserted a box screw capable of being screwed into a switch box of the wiring accessory.

24. The remote supervisory control system as claimed in claim 22, wherein the control section assigns, in the setting mode, to the operation section of the operation terminal an individual address equivalent to the address of the operation section of the operation terminal corresponding to the address of the load in a one-to-one correspondence, and activates/deactivates the load in the operation mode by operating the operation section of the operation terminal assigned the individual address.

25. The remote supervisory control system as claimed in claim 22, wherein the control section assigns, in the setting mode, to the operation section of the operation terminal a group address equivalent to the addresses of the operation section of the operation terminal corresponding to the addresses of the plurality of loads in a one-to-many correspondence, and activated/deactivated, in the operation mode by means of the user operating the operation section of the operation terminal assigned the group address to bring the plurality of loads into the same state.

* * * * *